US011403834B2

(12) United States Patent
Ishiyama

(10) Patent No.: US 11,403,834 B2
(45) Date of Patent: Aug. 2, 2022

(54) SOUND RECORDING DEVICE, RECORDING MEDIUM, AND IMAGE RECORDING DEVICE

(71) Applicant: NEC CORPORATION, Tokyo (JP)

(72) Inventor: Rui Ishiyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 196 days.

(21) Appl. No.: 16/651,776

(22) PCT Filed: Sep. 18, 2018

(86) PCT No.: PCT/JP2018/034357
§ 371 (c)(1),
(2) Date: Mar. 27, 2020

(87) PCT Pub. No.: WO2019/065345
PCT Pub. Date: Apr. 4, 2019

(65) Prior Publication Data
US 2020/0257189 A1  Aug. 13, 2020

(30) Foreign Application Priority Data
Sep. 28, 2017 (JP) .............................. JP2017-187492

(51) Int. Cl.
*G06F 3/033* (2013.01)
*G06V 10/10* (2022.01)
*G11B 20/10* (2006.01)
*G11B 20/12* (2006.01)
*G10L 21/10* (2013.01)
(Continued)

(52) U.S. Cl.
CPC ............. *G06V 10/17* (2022.01); *G06K 1/121* (2013.01); *G10L 19/00* (2013.01); *G10L 21/10* (2013.01); *G11B 20/10527* (2013.01); *G11B 20/12* (2013.01); *G03B 31/06* (2013.01)

(58) Field of Classification Search
CPC .......... G03B 31/06; G06K 1/121; G06K 9/22; G10L 19/00; G10L 21/10; G11B 20/10527; G11B 20/12; G11B 27/329; G11B 27/34
See application file for complete search history.

(56) References Cited

U.S. PATENT DOCUMENTS 6,229,964 B1   5/2001  Bell
2004/0155898 A1*  8/2004  Taguchi ............. H04N 21/8153
715/723

FOREIGN PATENT DOCUMENTS

JP  06-176079 A   6/1994
JP  2004-080750 A  3/2004
(Continued)

OTHER PUBLICATIONS

Satoshi Kajita, et al., "Prototype e-mail system with scenario control," Technical Report of the Institute of Image Information and Television Engineers, Feb. 12, 1997, pp. 7 to 14, vol. 21, No. 9.
(Continued)

*Primary Examiner* — Insa Sadio
(74) *Attorney, Agent, or Firm* — Sughrue Mion, PLLC

(57) ABSTRACT

A sound recording device includes at least one memory configured to store instructions; and at least one processor configured to execute the instructions to: record a voice; capture an image being an index for indexing the recorded voice; and assign the captured image to the recorded voice as an index during recording.

12 Claims, 49 Drawing Sheets

(51) Int. Cl.
    *G10L 19/00*     (2013.01)
    *G06K 1/12*     (2006.01)
    *G03B 31/06*     (2021.01)

(56) References Cited

FOREIGN PATENT DOCUMENTS

| | | |
|---|---|---|
| JP | 2008-048204 A | 2/2008 |
| JP | 2010-008938 A | 1/2010 |
| JP | 2011-197477 A | 10/2011 |
| JP | 2016-157225 A | 9/2016 |
| WO | 2011/093456 A2 | 8/2011 |
| WO | 2017/038432 A1 | 3/2017 |

OTHER PUBLICATIONS

International Search Report for PCT/JP2018/034357 dated Dec. 4, 2018 [PCT/ISA/210].
Written Opinion for PCT/JP2018/034357 dated Dec. 4, 2018 [PCT/ISA/237].
Japanese Office Communication for JP Application No. 2019-544973 dated May 24, 2022 with English Translation.

* cited by examiner

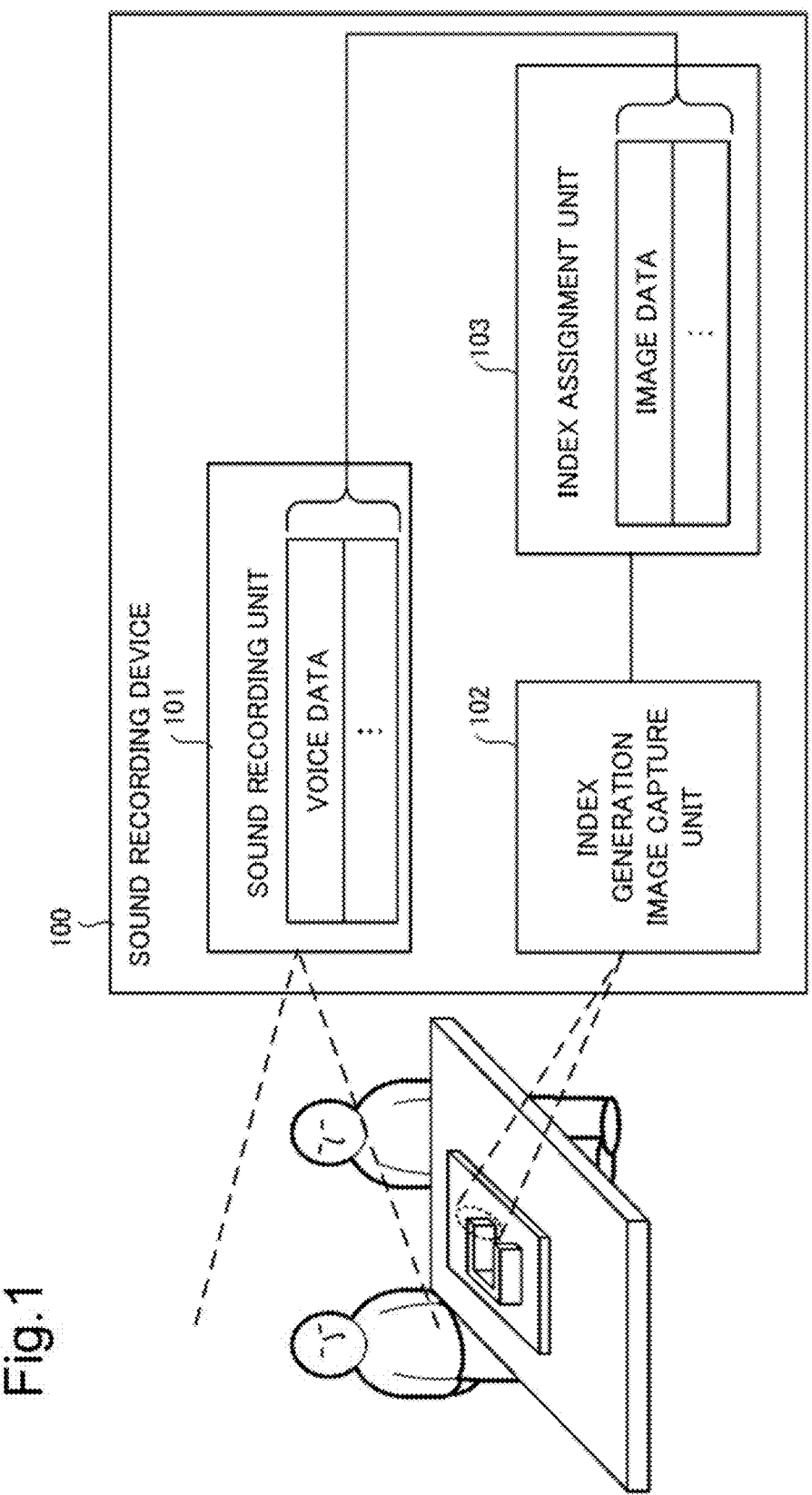

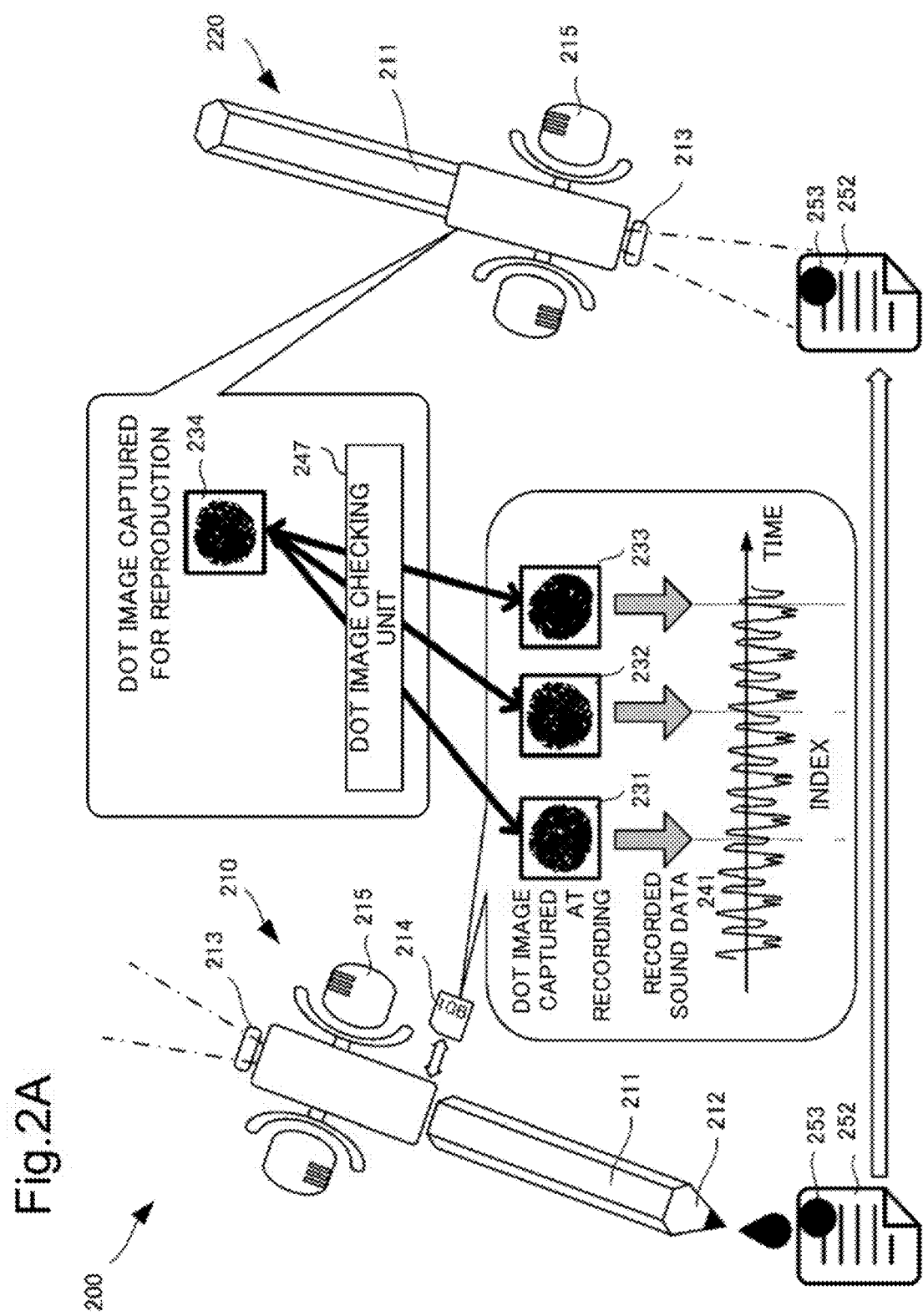

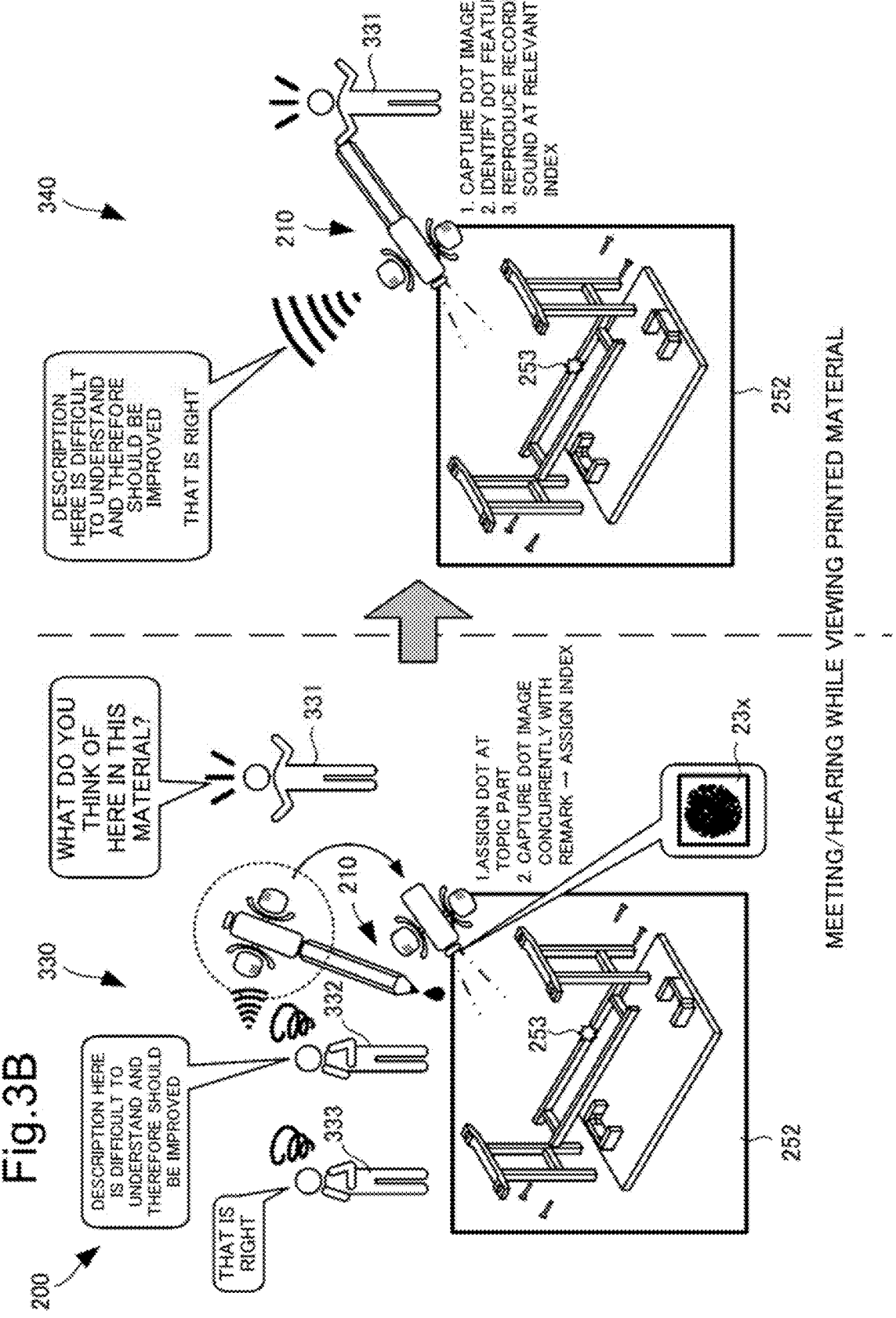

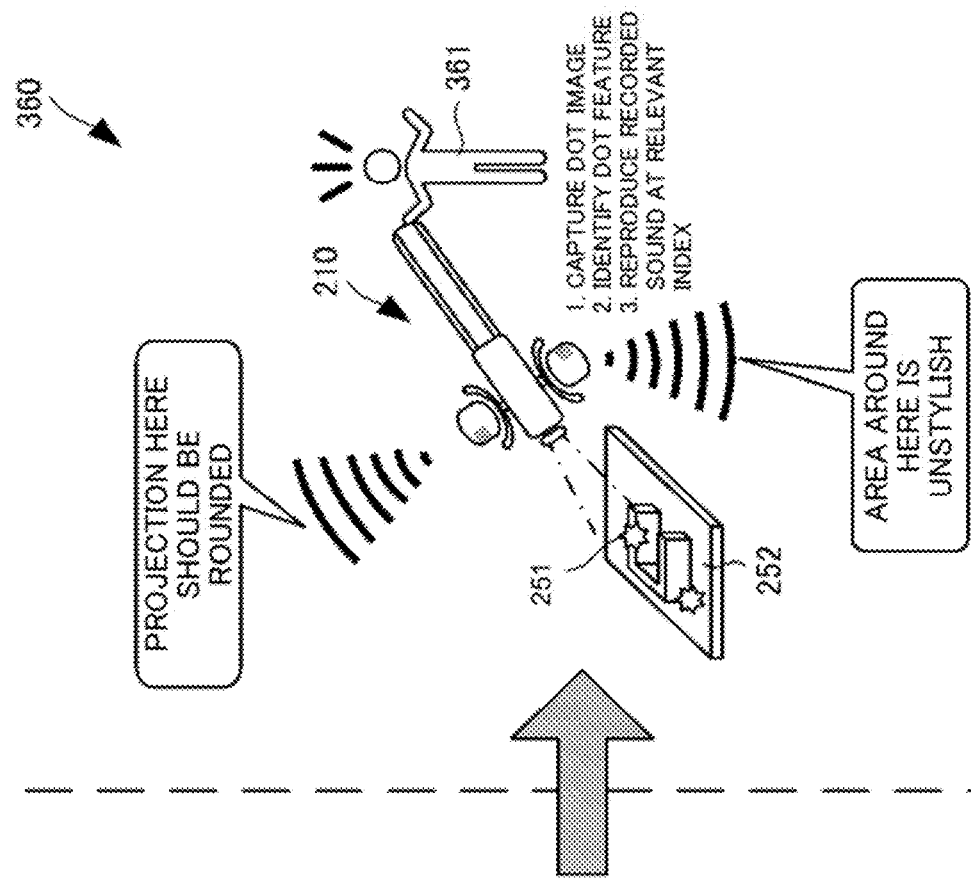
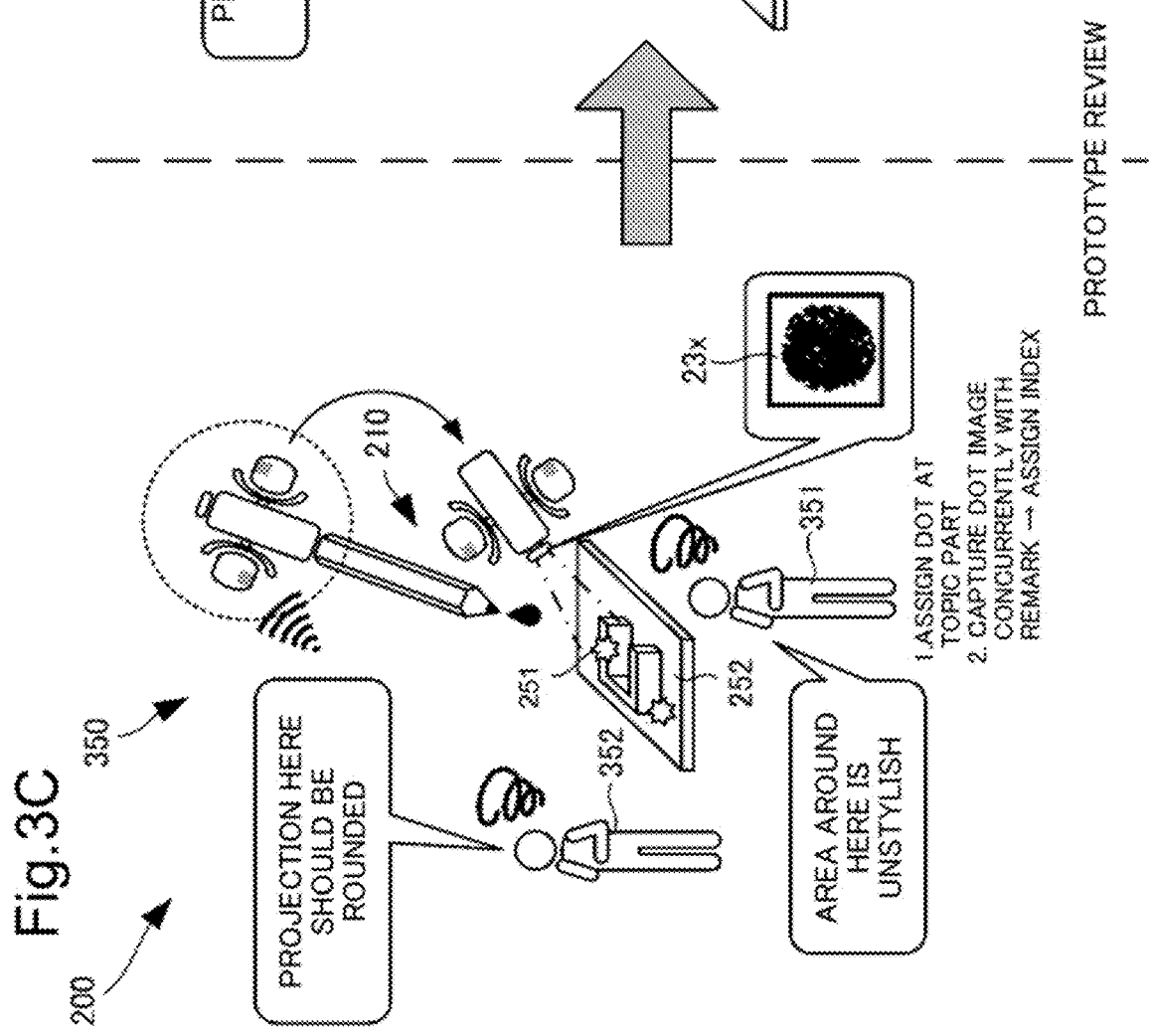
Fig. 3C

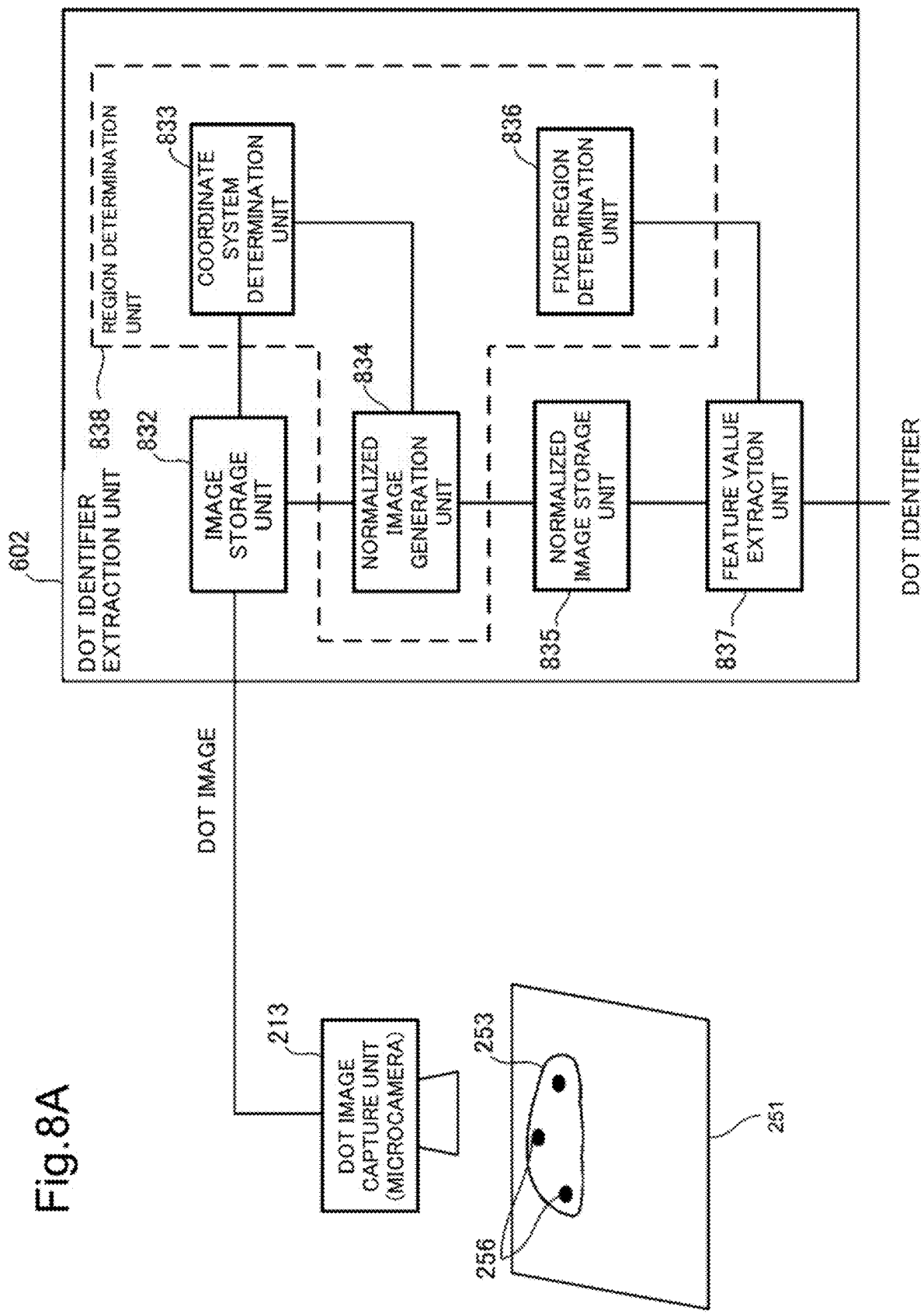

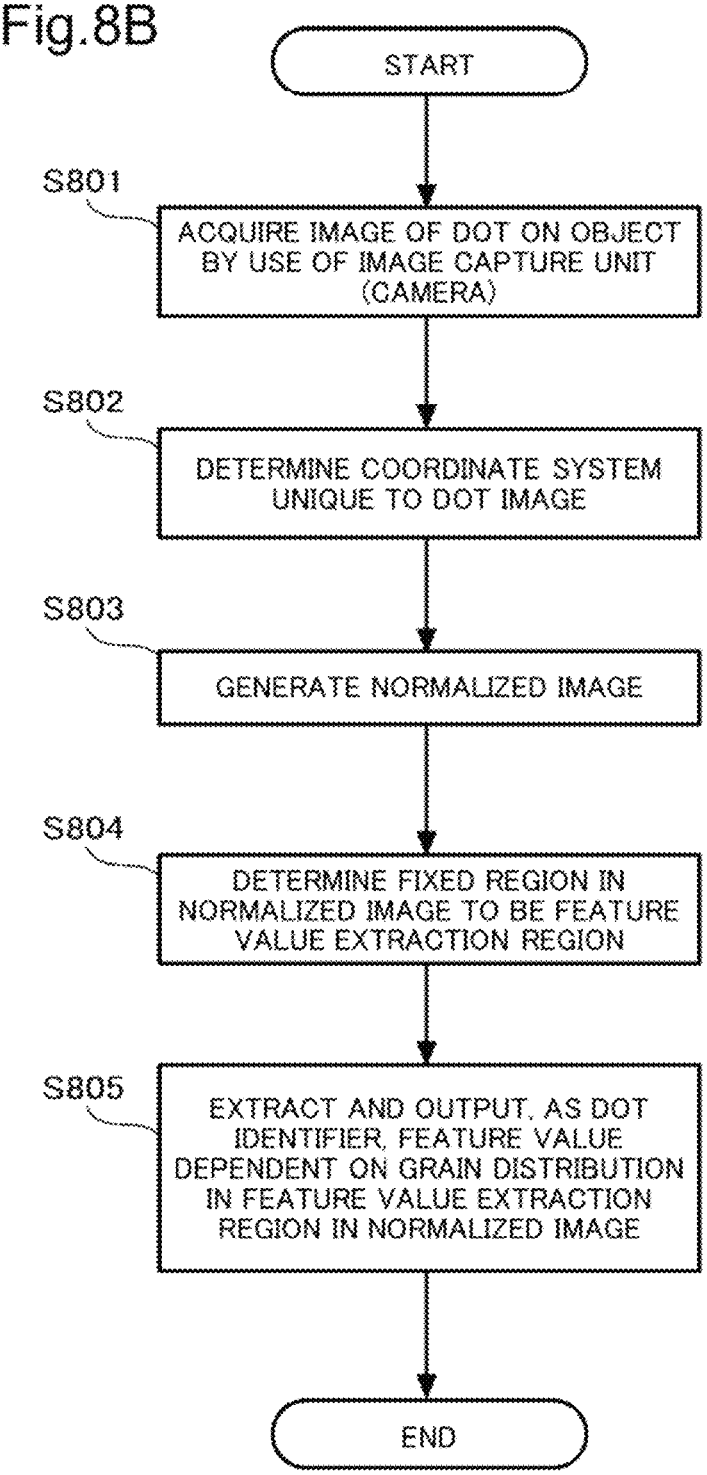

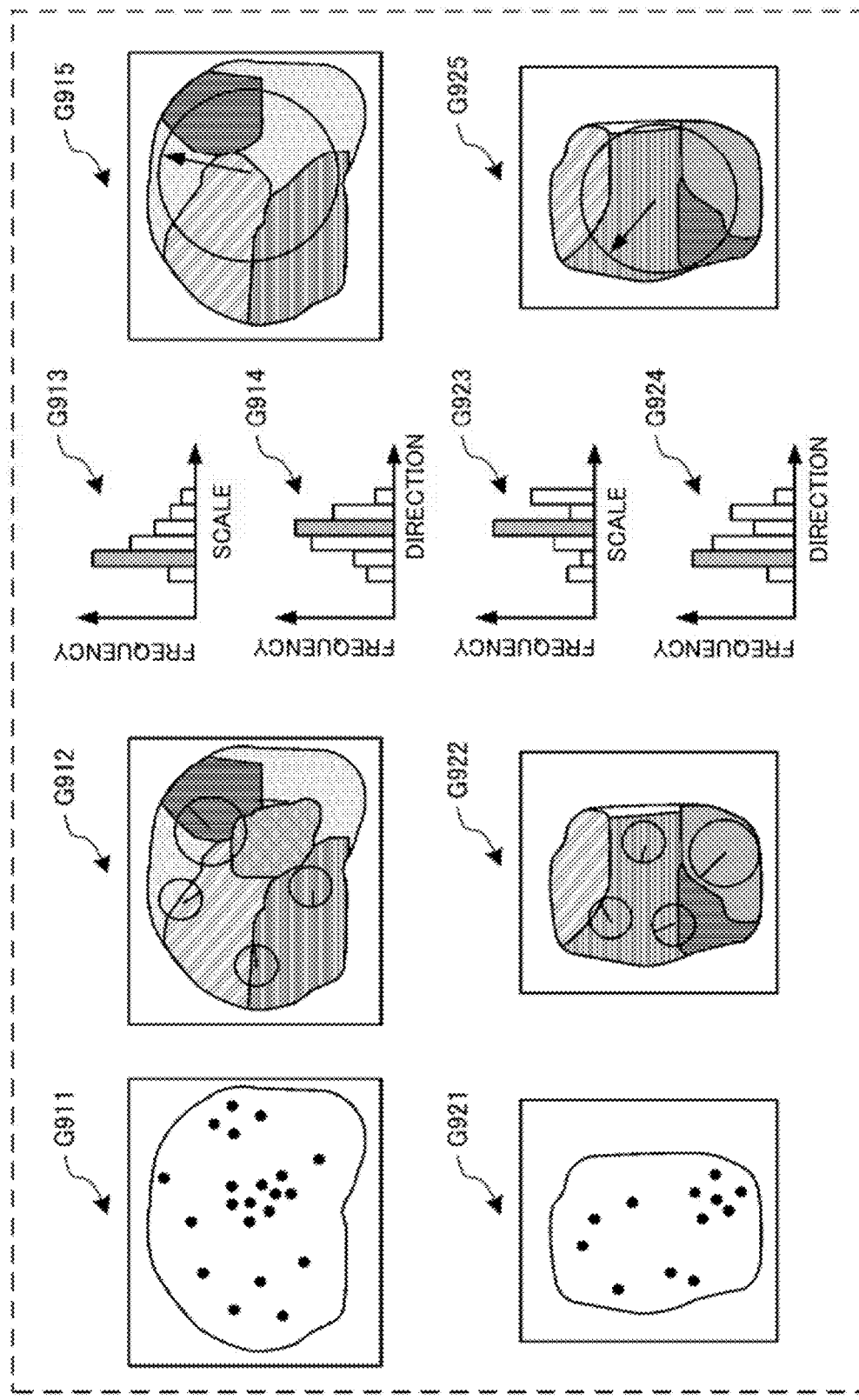

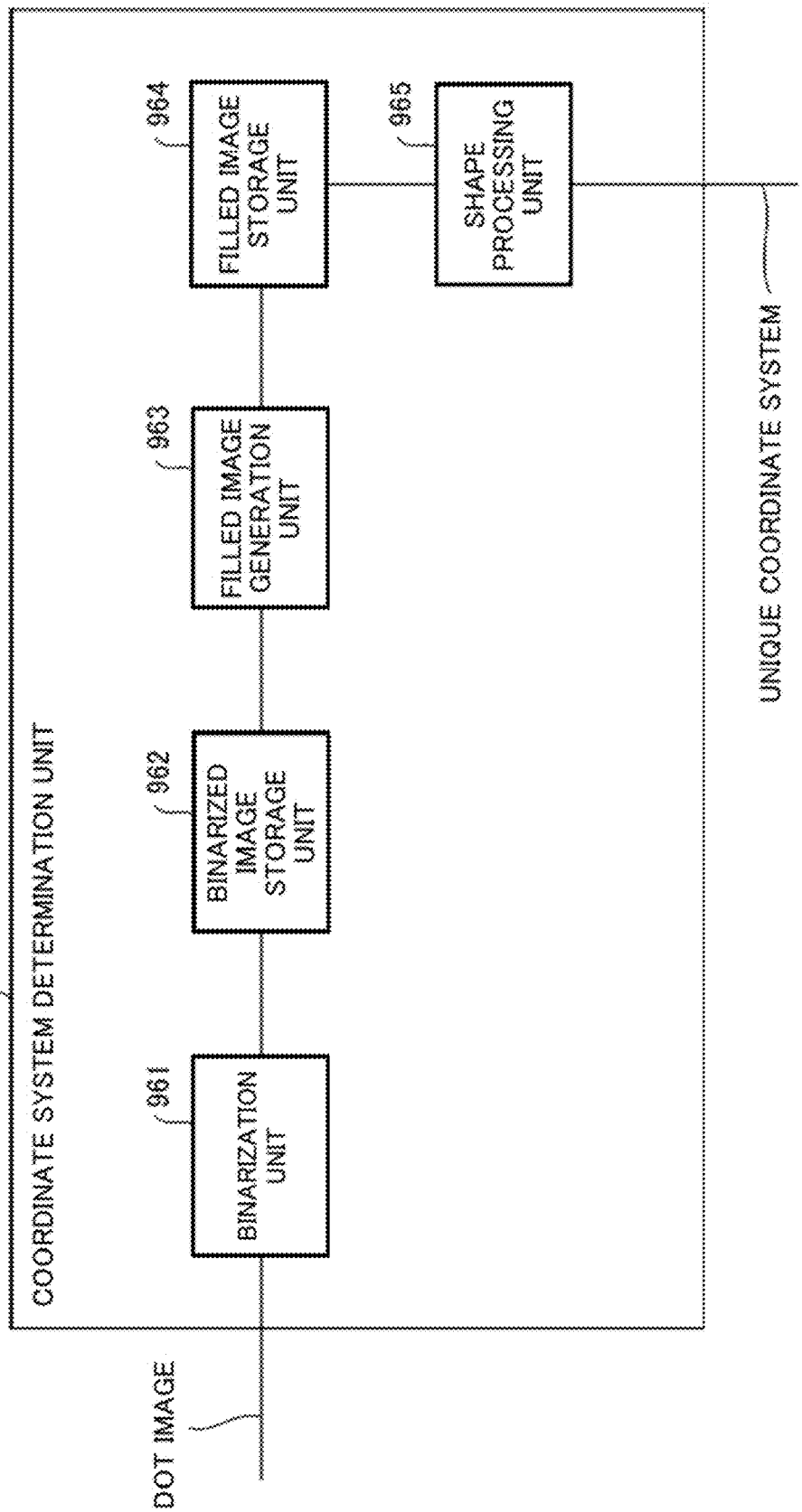

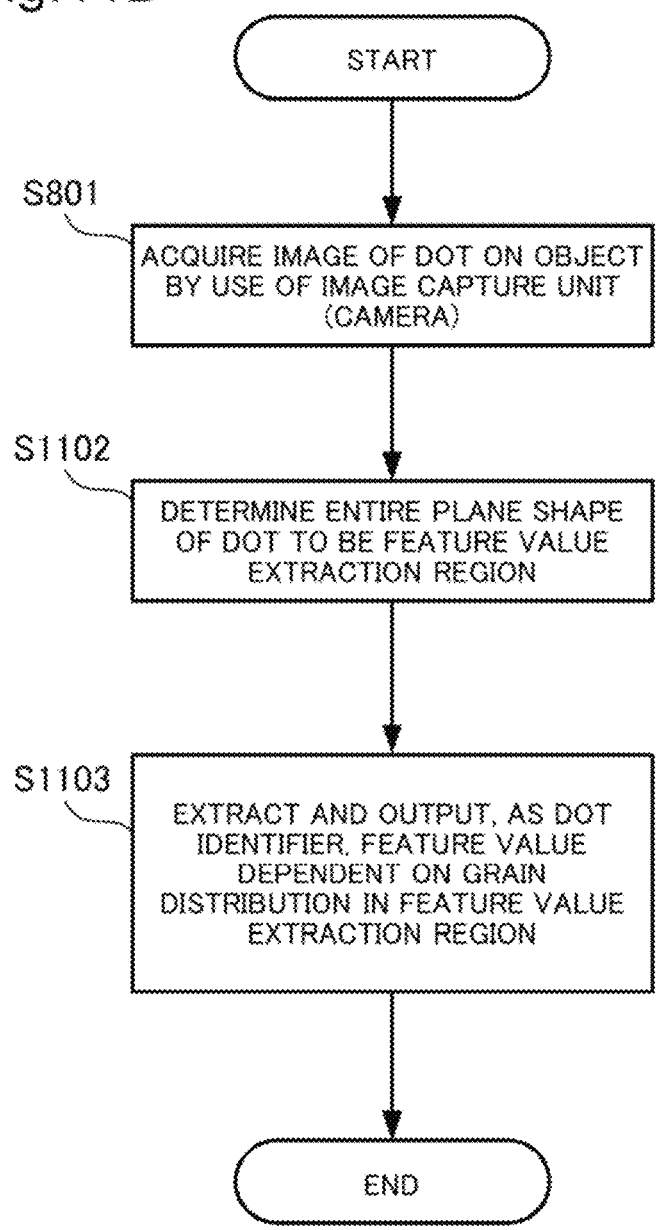

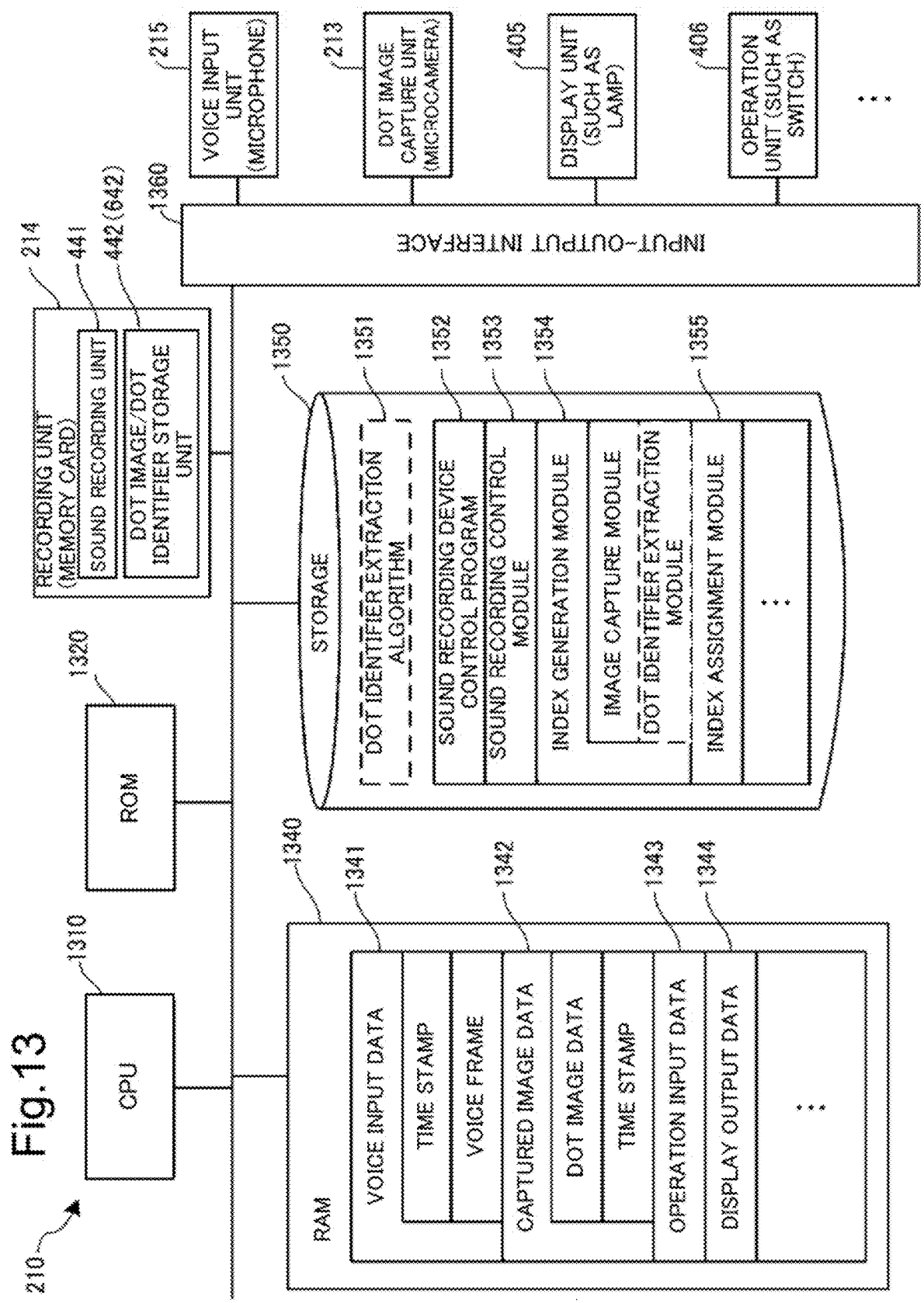

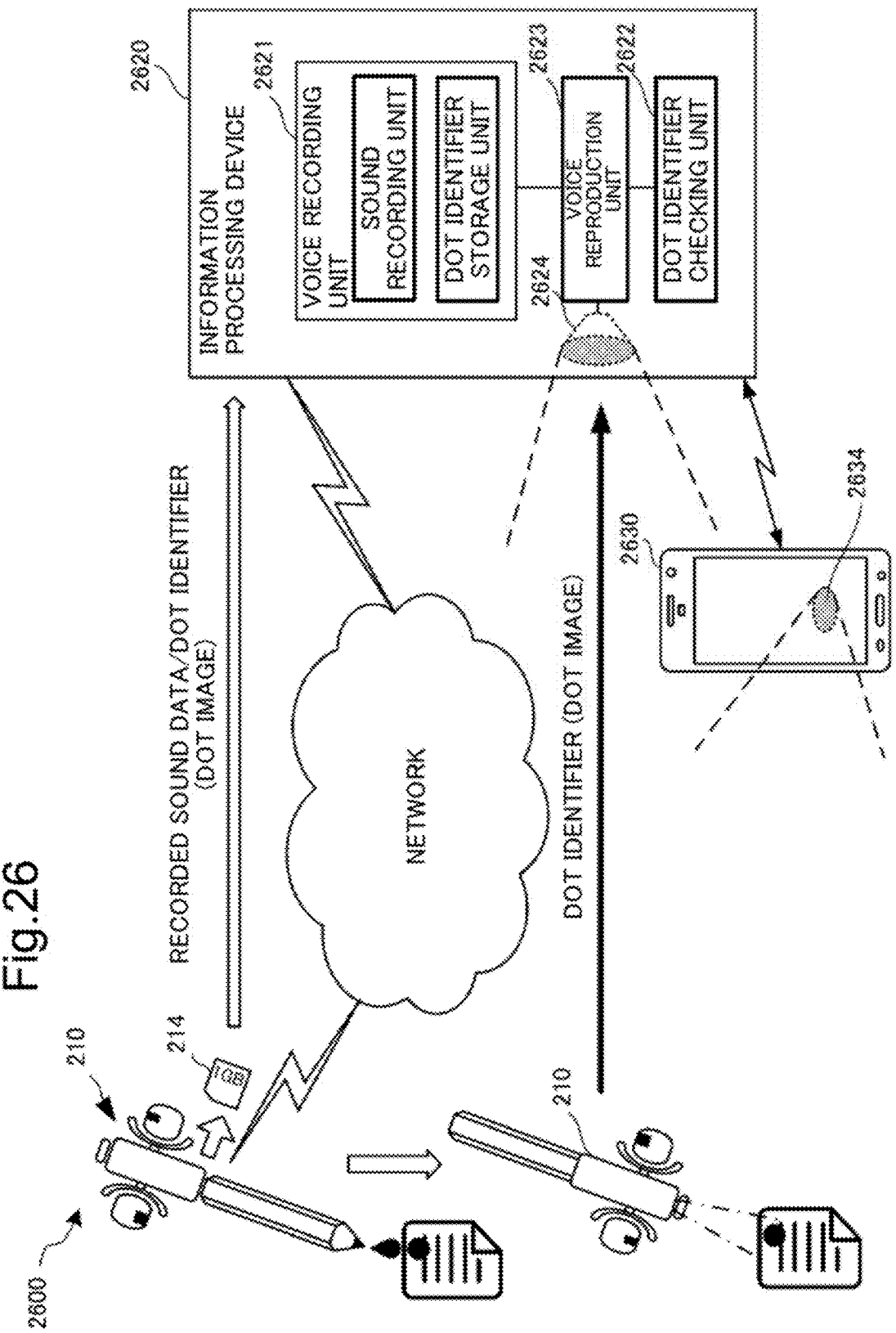

Fig.34

| 3401 | 3402 | 3403 | 3404 | 3405 | 3406 |
|---|---|---|---|---|---|
| MATCHING DOT IDENTIFIER GROUP | REFERENCE COUNT (DEGREE OF INTEREST) | TIME STAMP (CHRONOLOGICALLY SORTED) | DOT IDENTIFIER | VOICE FRAME | TARGET EVALUATION/ ANALYSIS |
| | | ... | | | |
| | | ... | | | |
| | | ... | | | |
| ... | | | | | |

3400

SOUND RECORDING DEVICE, RECORDING MEDIUM, AND IMAGE RECORDING DEVICE

CROSS REFERENCE TO RELATED APPLICATIONS

This application is a National Stage of International Application No. PCT/JP2018/034357 filed Sep. 18, 2018, claiming priority based on Japanese Patent Application No. 2017-187492 filed Sep. 28, 2017, the disclosure of which is incorporated herein in its entirety by reference.

TECHNICAL FIELD

The present disclosure relates to a sound recording/reproduction system, a sound recording/reproduction method, and the like.

BACKGROUND ART

In aforementioned Technical Field, a technology of recognizing a voice to be recorded, dividing a speech at a conjunction that exists in the voice and changes a topic, and recording a speech between conjunctions as a reproduction unit is disclosed in PTL 1. Further, a technology of searching recorded sound data for a search word and assigning a mark at a position where a voice in a candidate section is generated is disclosed in PTL 2.

CITATION LIST

Patent Literature

PTL 1: Japanese Unexamined Patent Application Publication No.
2010-008938
PTL 2: Japanese Unexamined Patent Application Publication No. 2016-157225
PTL 3: International Application Publication No. WO 2017/038432

SUMMARY OF INVENTION

Technical Problem

However, in the technologies described in the aforementioned literatures, a mark as an index can be assigned when a predetermined condition for voice is satisfied, and also an input of or a search for a keyword by voice recognition processing is required for achieving cueing at reproduction. Consequently, a cueing index used at reproduction cannot be assigned to recorded data by a simple operation at any timing preferred by a user during recording.

An object of the present disclosure is to provide a technology resolving the problem described above.

Solution to Problem

In order to achieve the aforementioned object, a sound recording device according to the present disclosure includes: a sound recording means for recording a voice; an index generation image capture means for capturing an image being an index for indexing the recorded voice; and an index assignment means for assigning the captured image to the recorded voice as an index during recording.

In order to achieve the aforementioned object, a sound recording control program stored on a recording medium according to the present disclosure causes a computer to execute: sound recording processing of recording a voice; index generation image capture processing of capturing a dot image being an index for indexing the recorded voice by an index generation image capture means and being described with a writing tool; dot identifier extraction processing of extracting a dot feature value from the dot image and setting the dot feature value as a dot identifier; and index assignment processing of assigning the dot identifier to the recorded voice as an index during recording.

In order to achieve the aforementioned object, an image recording device according to the present disclosure includes: an image recording means for recording a dynamic image; an index generation image capture means for capturing an image being an index for indexing the recorded dynamic image; and an index assignment means for assigning the captured image to the recorded dynamic image as an index during recording.

In order to achieve the aforementioned object, a recording-reproduction system according to the present disclosure includes: a recording means for recording a recorded voice or a recorded dynamic image; an index generation image capture means for capturing a first image being an index for indexing the recorded voice or the recorded dynamic image; an index assignment means for assigning the captured first image to the recorded voice or the recorded dynamic image as an index during recording; a reproduction means for reproducing a voice or a dynamic image recorded in the recording means; an acquisition means for acquiring, at reproduction, a second image captured by the index generation image capture means as an index for a start of reproduction; a checking means for checking the second image against the first image; and a reproduction control means for, when a check result by the checking means indicates that the second image matches the first image, controlling the reproduction means in such a way as to perform reproduction, with the first image as an index, from a voice or a dynamic image recorded in the recording means.

In order to achieve the aforementioned object, a recording-reproduction method according to the present disclosure includes: recording a recorded voice or a recorded dynamic image into a recording means; capturing a first image being an index for indexing the recorded voice or the recorded dynamic image by an index generation image capture means; assigning the captured first image to the recorded voice or the recorded dynamic image as an index during recording; acquiring, at reproduction, a second image captured by the index generation image capture means as an index for a start of reproduction; checking the second image against the first image; and, when a check result indicates that the second image matches the first image, performing reproduction, with the first image as an index, from a voice or a dynamic image recorded in the recording means.

Advantageous Effects of Invention

The present disclosure enables on-site assignment of a cueing index used at reproduction to recorded data by a simple operation at any timing preferred by a user during recording.

BRIEF DESCRIPTION OF DRAWINGS

FIG. 1 is a block diagram illustrating a configuration of a sound recording device according to a first example embodiment.

FIG. 2A is a diagram illustrating an outline of a recording-reproduction system including a sound recording device according to a second example embodiment.

FIG. 3B is a diagram illustrating another application of the recording-reproduction system including the sound recording device according to the second example embodiment.

FIG. 3C is a diagram illustrating yet another application of the recording-reproduction system including the sound recording device according to the second example embodiment.

FIG. 8A is a block diagram illustrating an example of a functional configuration of a dot identifier extraction unit according to the second example embodiment.

FIG. 8B is a flowchart illustrating a procedure of an example of dot identifier extraction processing according to the second example embodiment.

FIG. 9B is a schematic diagram for illustrating an operation of the coordinate system determination unit according to the second example embodiment.

FIG. 9C is a block diagram illustrating another example of the functional configuration of the coordinate system determination unit according to the second example embodiment.

FIG. 11B is a flowchart illustrating a procedure of another example of the dot identifier extraction processing according to the second example embodiment.

FIG. 13 is a block diagram illustrating a hardware configuration of the sound recording device according to the second example embodiment.

FIG. 26 is a diagram illustrating an outline of a recording-reproduction system including a sound recording device according to a sixth example embodiment.

FIG. 34 is a diagram illustrating a structure of a recorded sound data analysis table for statistical processing based on a dot according to another example embodiment.

EXAMPLE EMBODIMENT

Figure 2B:
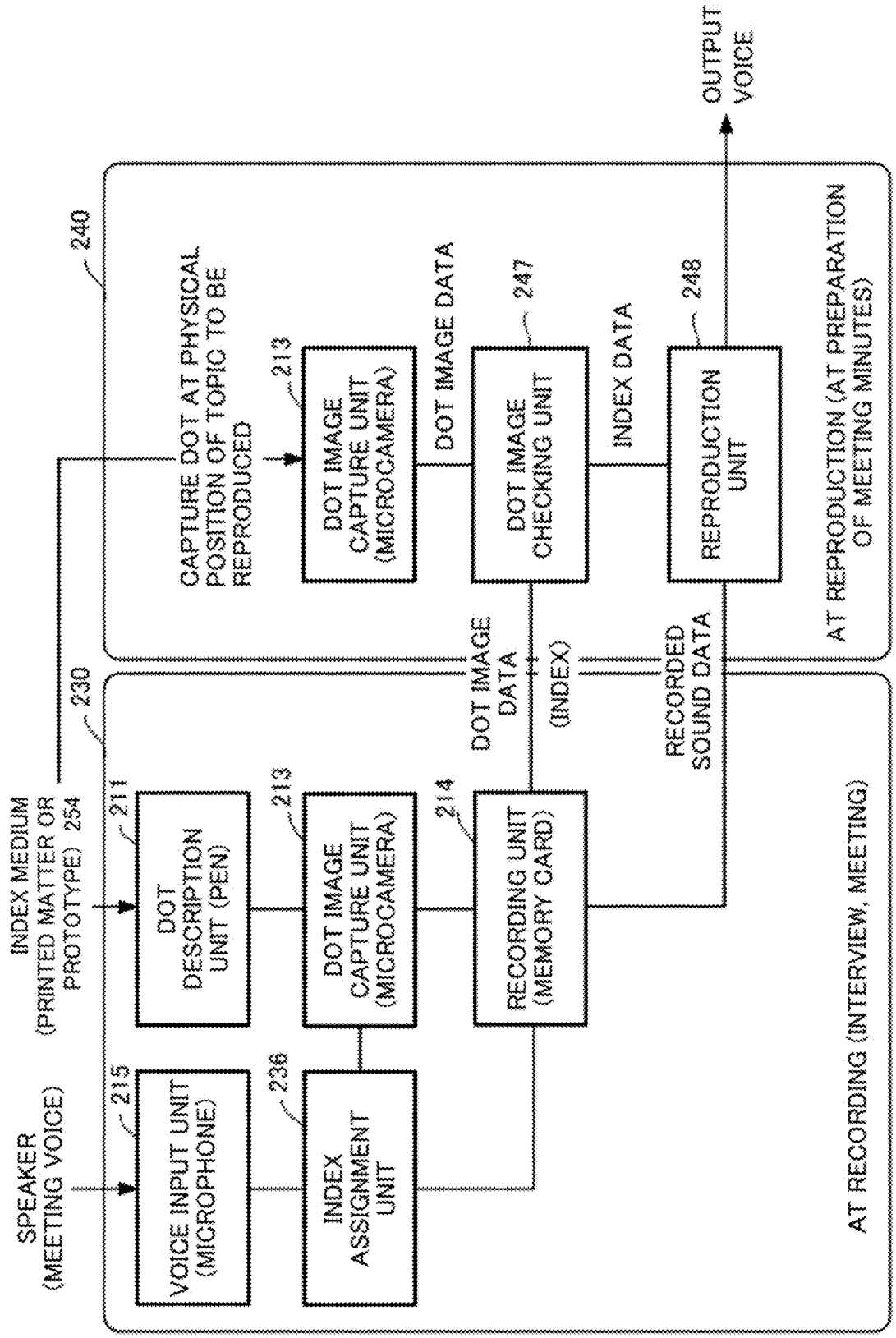
FIG. 2B is a diagram illustrating a functional configuration of the recording-reproduction system including the sound recording device according to the second example embodiment.

Referring to drawings, example embodiments of the present disclosure will be exemplarily described in detail below. Note that components described in the following example embodiments are merely exemplifications and are not intended to limit the technical scope of the present disclosure to the components.

First Example Embodiment

A sound recording device 100 according to a first example embodiment will be described with reference to FIG. 1. The sound recording device 100 is a sound recording device capable of assigning a cueing index used at reproduction to recorded sound data.

As illustrated in FIG. 1, the sound recording device 100 includes a sound recording unit 101, an index generation image capture unit 102, and an index assignment unit 103. The sound recording unit 101 records a voice. The index generation image capture unit 102 captures an image being an index for indexing a voice recorded by the sound recording unit 101. The index assignment unit 103 assigns a captured image to recorded voice data as an index during recording.

According to the present example embodiment, a captured image is assigned, as an index, to a voice being recorded, and therefore a cueing index used at reproduction can be assigned on site to recorded sound data by a simple operation at any timing preferred by a user during recording.

Second Example Embodiment

Next, a sound recording device according to a second example embodiment will be described. The sound recording device according to the present example embodiment describes a dot on a text in a printed matter, a drawing, a part of an object, or the like being a target of a topic or a subject, during recording of a voice input to a microphone. The sound recording device captures an image of the described dot and assigns, as a cueing index, the dot image or a dot identifier extracted from the dot image. When cueing and reproducing recorded sound data, the sound recording device captures an image of a dot on the same printed matter, drawing, or object and extracts a dot identifier from the dot image. Then, the sound recording device checks the extracted dot identifier against the dot identifier assigned as a cueing index at recording and reproduces recorded sound data from a position indexed by a matching dot identifier.

Consequently, a voice associated with a text in a printed matter, a part in a drawing, a part of an object, or the like can be reproduced. In a case of reproducing a recorded sound of an interview or a meeting recorded on the road in particular, cueing from a recorded position preferred by a reproducer can be achieved. It is desirable that the sound recording device according to the present example embodiment have a stationery shape such as a pen type in terms of user friendliness. With regard to a determination of a match between dot identifiers, the dot identifiers may be determined to match when the difference between the two is equal to or less than a predetermined threshold value.

Recording-Reproduction System

A configuration and an operation of a recording-reproduction system including the sound recording device according to the present example embodiment will be described below with reference to FIG. 2A to FIG. 2C and FIG. 3A to FIG. 3C.

System Outline

FIG. 2A is a diagram illustrating an outline of a recording-reproduction system 200 including a sound recording device 210 according to the present example embodiment.

A sound recording device 210 illustrated on the left side in FIG. 2A describes a dot 253 with ink at a position on a printed matter 252 being a target of a voice being recorded and assigns, as an index, a dot image or a dot identifier extracted from the dot image. The sound recording device 210 includes a dot description unit (pen) 211 including a nib 212, a dot image capture unit (for example, a microcamera) 213 enlarging and capturing an image of a described dot, a recording unit (for example, a memory card) 214 recording recorded sound data and an index, and a voice input unit (for example, a microphone) 215. Although not illustrated in FIG. 2A, the sound recording device 210 also includes an operation unit (such as a switch) and a display unit (such as a lamp). The dot image capture unit 213 may be another high-resolution camera capable of capturing an image of a dot image allowing extraction of a dot identifier from a described dot. A structure of a reproduction function in the sound recording device 210 will be described later.

When assigning an index to a voice being recorded, a user describes a dot 253 on a topic target position on a printed matter 252 with the nib 212 on the sound recording device 210. An image of the described dot 253 is captured by the dot image capture unit 213, and dot images or dot identifiers 231 to 233 are assigned as indices at desired positions (times) in recorded sound data 241 and are recorded into the recording unit 214. The recorded sound data 241 and the dot images or the dot identifiers 231 to 233 being the indices may be individually recorded while associating recorded sound data with a dot image or a dot identifier, or may be collectively recorded in association with each other.

A sound recording device 220 illustrated on the right side in FIG. 2A illustrates an example of reproducing recorded sound data 241 associated with a dot 253 described with ink at a position on the printed matter 252 being the target of the recorded voice. When a dot image capture unit 213 in the sound recording device 220 captures an image of the dot 253 on the printed matter 252 associated with a recorded sound reproduction of which is preferred by a user, the dot image checking unit 247 checks the captured dot image or a dot identifier 234 against the dot images or the dot identifiers 231 to 233 recorded in the recording unit 214 as indices. Then, when the dot images or the dot identifiers match, a reproduction unit (unillustrated) reproduces recorded sound data 241 associated with the position where the dot 253 is described. With regard to a match between dot images or dot identifiers, the dot images or the dot identifiers may be determined to match when the difference between the two is equal to or less than a predetermined threshold value.

System Functional Configuration

FIG. 2B is a diagram illustrating a functional configuration of the recording-reproduction system 200 including the sound recording device 210 according to the present example embodiment. In FIG. 2B, a component similar to that in FIG. 2A is given the same reference numeral.

In FIG. 2B, the voice input unit (microphone) 215, the dot description unit (pen) 211, the dot image capture unit (microcamera) 213, an index assignment unit 236, and the recording unit (memory card) 214 are used at recording 230. An image of a dot described on an index medium 254 by the dot description unit (pen) 211 with respect to a voice of a speaker input from the voice input unit (microphone) 215 is captured by the dot image capture unit (microcamera) 213, and the dot image or a dot identifier is assigned as an index and is recorded in the recording unit (memory card) 214.

In FIG. 2B, the dot image capture unit (microcamera) 213, the dot image checking unit 247, and a reproduction unit 248 are used at reproduction 240. When an image of a dot described on the index medium 254 is captured by the dot image capture unit (microcamera) 213, the captured dot image is checked against a dot image stored in the recording unit 214 as an index by the dot image checking unit 247. Then, when the dot images match, the reproduction unit 248 reproduces and outputs recorded sound data in the recording unit 214 with the dot image as an index. It is desirable that checking by the dot image checking unit 247 be performed with a dot identifier extracted from a dot image.

Dot Identifier

Figure 2C:
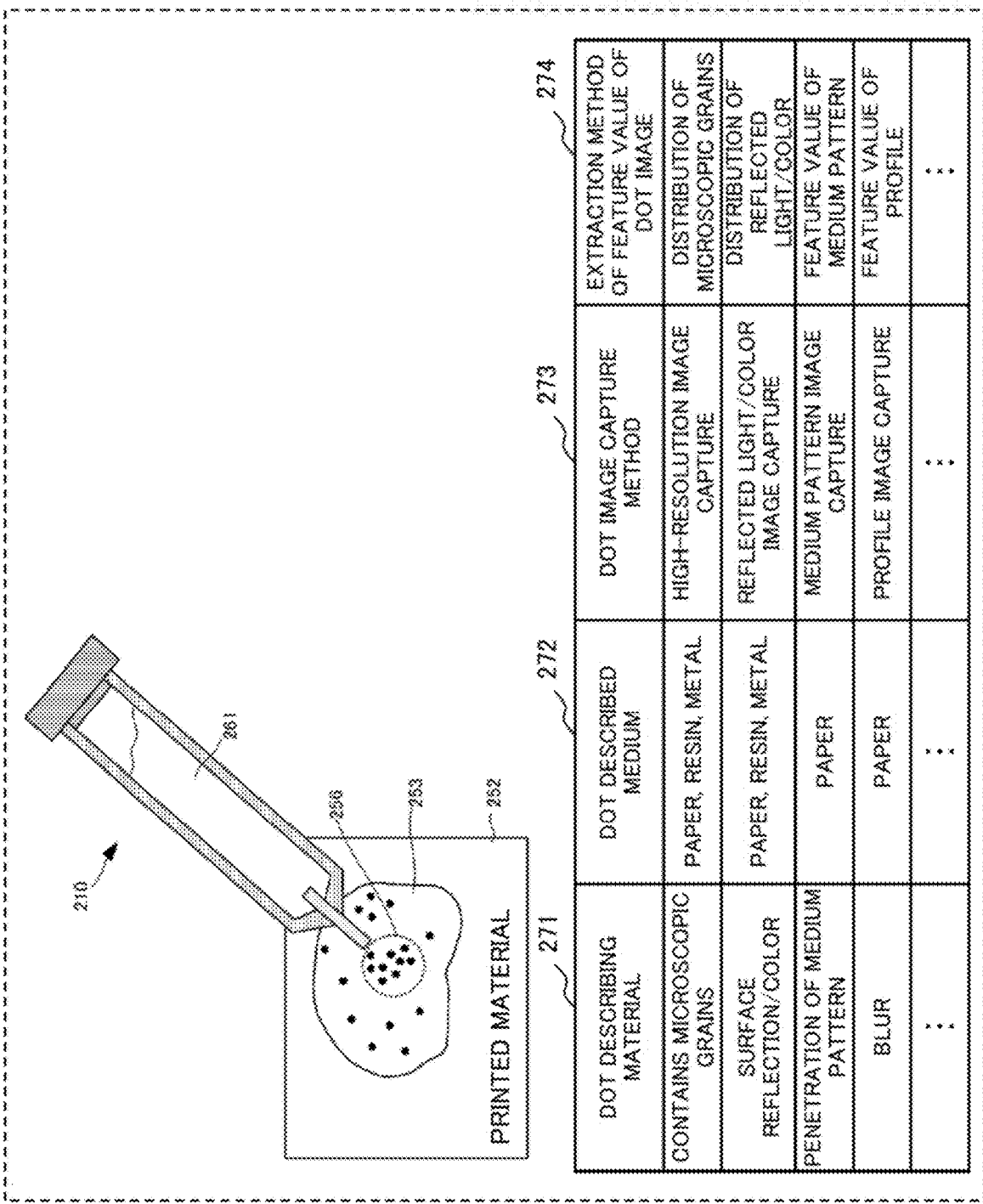
FIG. 2C is a diagram illustrating a generation method of a dot allowing extraction of a dot feature value being a dot identifier according to the second example embodiment.

FIG. 2C is a diagram illustrating a generation method of a dot allowing extraction of a dot feature value being a dot identifier according to the present example embodiment.

The upper diagram in FIG. 2C is a schematic diagram of a state in which a dot is described on a printed matter (printed material) 252 with a pen-type sound recording device 210 according to the present example embodiment. Note that a dimensional relation between elements is not accurate. A dot 253 containing microscopic grains 256 is described by the sound recording device 210 at a surface position of the printed matter (printed material) 252 associated with a recorded voice. A dot description unit (pen) 211 in the sound recording device 210 is filled with ink 261 containing microscopic grains 256. A dot description medium is not limited to ink. The medium may be solid pencil lead, India ink, or the like.

The dot 253 described at the surface position on the printed matter (printed material) 252 associated with the recorded voice contains the microscopic grains 256 in random positions. Fine particles such as metal powder or glass powder, or taggants may be used as the microscopic grains 256. It is desirable that the microscopic grain 256 be a grain having a reflection characteristic different from a material constituting the dot 253 (excluding the microscopic grain 256). Further, it is desirable that the microscopic grain 256 be unevenly contained in the dot 253. In other words, it is desirable that a distribution of the microscopic grains 256 in the dot 253 be uneven. Further, a plane shape of the dot 253 is an indeterminate shape. The plane shape of the dot 253 refers to a shape of the dot 253 viewed from the top. For example, such a dot 253 can be formed by dropping only one drop of printing ink, paint, or the like in which the microscopic grains 256 are mixed on a surface of an object by use of a writing tool 260 such as a pen, and then solidifying the drop. However, without being limited to such a method, the formation method of the dot 253 may use any other method such as applying printing ink, paint, or the like in which the microscopic grains 256 are mixed, with a brush or the like.

The lower diagram in FIG. 2C is a diagram illustrating an example of a description method of a dot allowing extraction of a dot identifier on a printed matter (printed material) 252 with the pen-type sound recording device 210 and an extraction method of a dot identifier, according to the present example embodiment. The description method of a dot allowing extraction of a dot identifier is not limited to FIG. 2C.

Dot describing materials 271 include a material containing microscopic grains, a material having characteristic surface reflection and/or color pattern, a material through which a pattern of a medium (paper) penetrates, and a material on which a blur on a medium (paper) appears. Each restriction on a dot described medium 272, each of differences between dot image capture methods 273, and each extraction method 274 of a feature value of a dot image as a dot identifier are as illustrated in the diagram. A material containing microscopic grains will be hereinafter used in the present example embodiment as a material allowing description of a dot allowing extraction of a dot identifier on a wide range of media, allowing an image capture unit to be portable and to provide a stable captured image, and easily allowing extraction of an identifiable dot identifier. However, the dot material, the dot description method, the dot image capture method, and the dot identifier extraction method are not limited to the above, and may be the methods illustrated in FIG. 2C or different methods.

Another Dot Description Structure

Figure 2D:
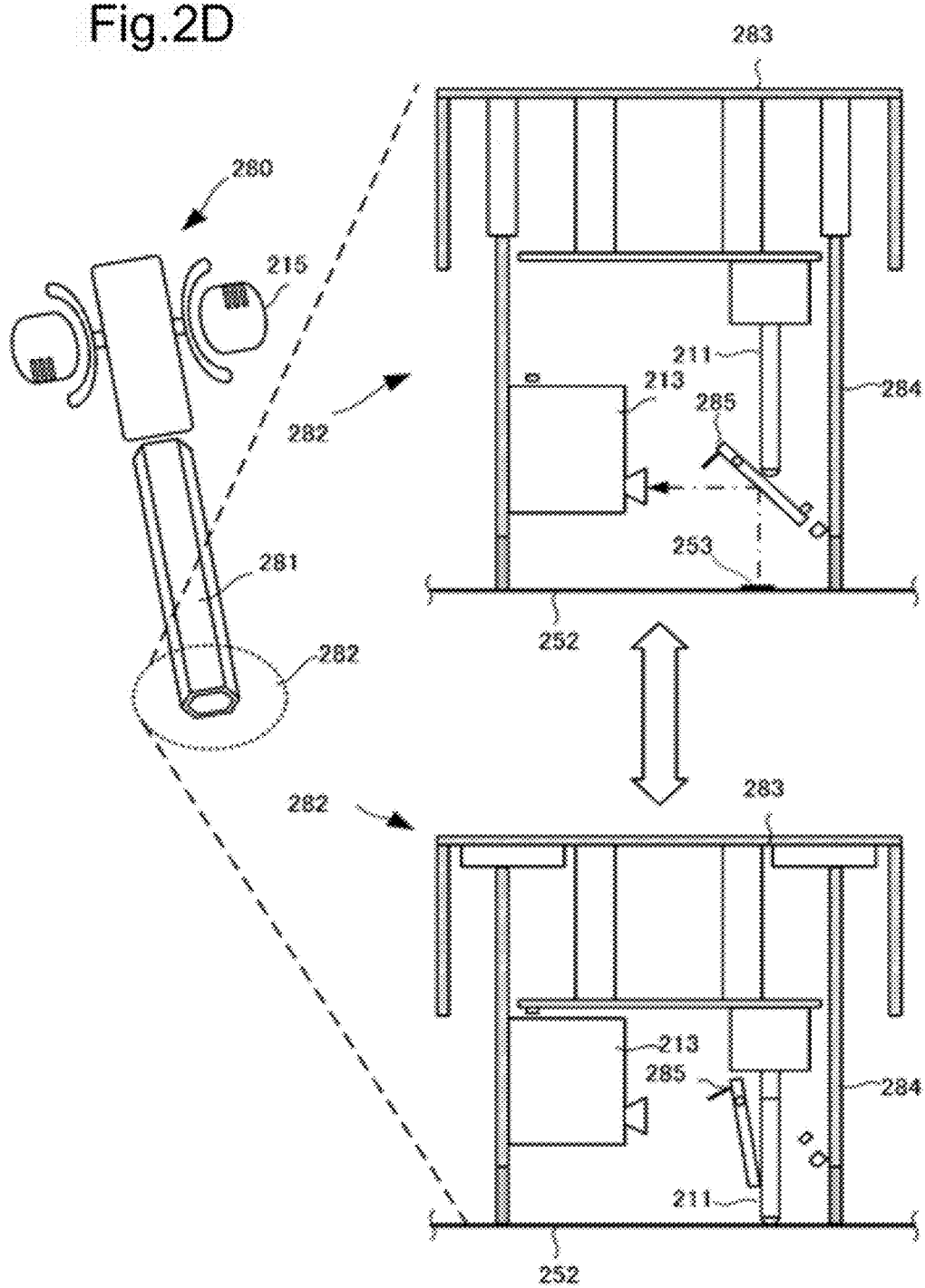
FIG. 2D is a diagram illustrating a dot description structure of another sound recording device according to the second example embodiment.

FIG. 2D is a diagram illustrating a dot description structure of another sound recording device 280 according to the present example embodiment. The sound recording device 280 includes a stamp-style pen 281 achieving dot description and dot image capture in a ganged operation, unlike the sound recording device 210 separately including the dot description unit (pen) 211 and the dot image capture unit (microcamera) 213. In FIG. 2D, a component similar to that in the sound recording device 210 in FIG. 2A is given the same reference numeral, and redundant description is omitted. In FIG. 2D, a configuration and an operation of a tip part 282 being characteristic of the stamp-style pen 281 will be described.

The tip part 282 includes a lid part 283 and a container 284 movable in the lid 283 in an axial direction of the pen 281. A dot description unit (pen) 211, a dot image capture unit (microcamera) 213, and a movable mirror 285 are provided in the container 284. The movable mirror 285 is urged counterclockwise by a tension spring. The dot image capture unit (microcamera) 213 and the movable mirror 285 are fixed to the container 284, and the dot description unit (pen) 211 is linked and fixed to the lid 283.

The tip part 282 changes between a state of up to an end of the container 284 being housed in the lid part 283 and a state of up to the half of the container 284 being housed in the lid part 283. Consequently, the dot description unit (pen) 211 moves to a position in contact with a printed matter 252 as the container 284 is housed.

As illustrated in FIG. 2D, in the state of up to the end of the container 284 being housed in the lid part 283, the dot description unit (pen) 211 does not move the movable mirror 285 clockwise. Consequently, an image of the printed matter 252 in contact with the bottom of the container 284 is reflected by the movable mirror 285 and is input to the dot image capture unit (microcamera) 213.

On the other hand, when pressed against the printed matter 252, the tip part 282 turns to the state of up to the half of the container 284 being housed in the lid part 283. The dot description unit (pen) 211 describes a dot on the printed matter 252 in contact with the bottom of the container 284. At this time, the dot description unit (pen) 211 moves the movable mirror 285 clockwise, and the image of the printed matter 252 is no longer input to the dot image capture unit (microcamera) 213.

When returning to the state of being up to the end of the container 284 housed in the lid part 283, the dot description unit (pen) 211 no longer presses out the movable mirror 285, and the movable mirror 285 is urged counterclockwise by the tension spring. At this time, an image of the dot 253 described on the printed matter 252 in contact with the bottom of the container 284 is reflected by the movable mirror 285 and is input to the dot image capture unit (microcamera) 213.

Thus, a single operation can achieve dot description and dot image capture. Such a stamp style is not limited to the structure in FIG. 2D. See PTL 3 for details.

System Application

Figure 3A:
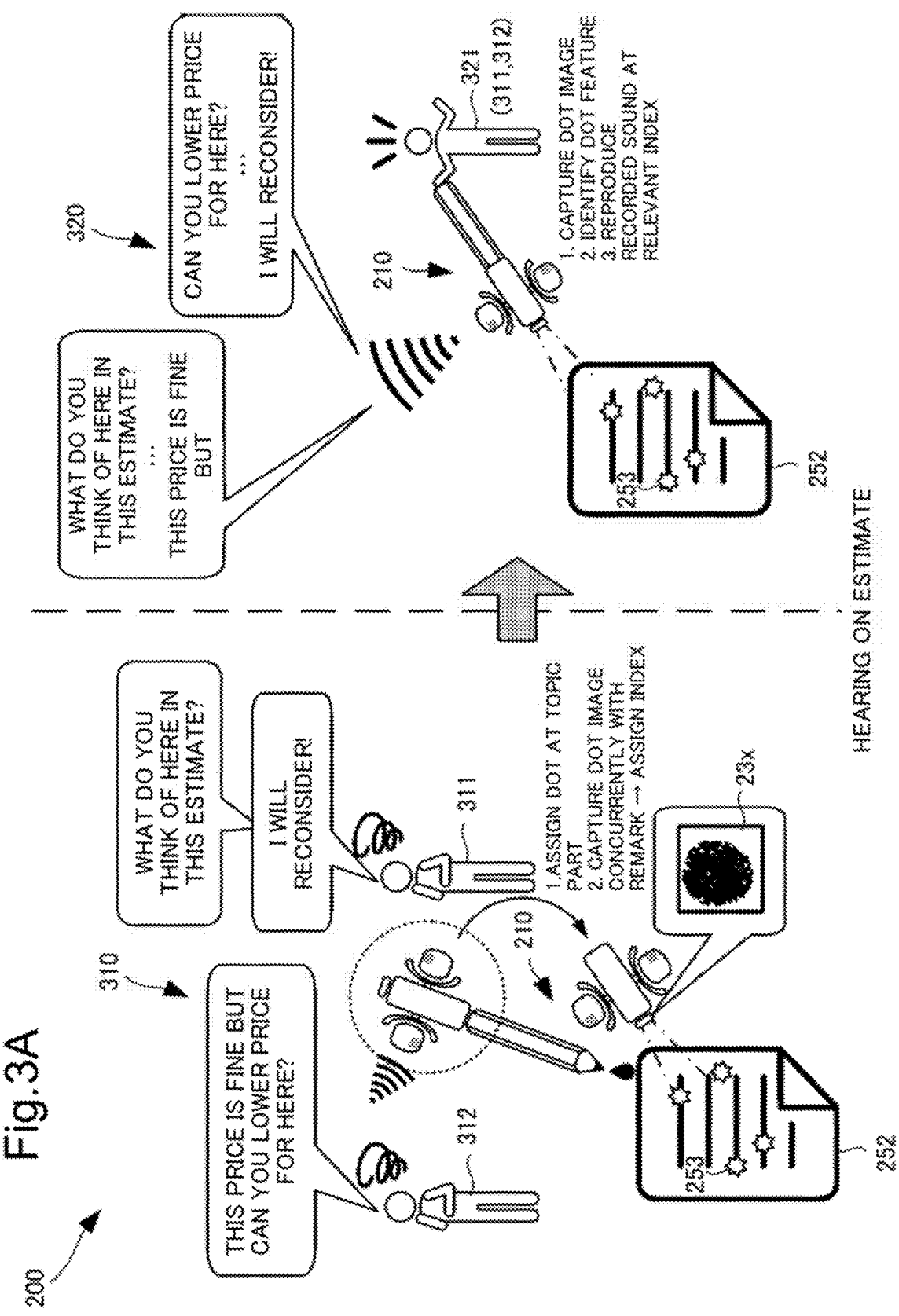
FIG. 3A is a diagram illustrating an application of the recording-reproduction system including the sound recording device according to the second example embodiment.

FIG. 3A is a diagram illustrating an application of the recording-reproduction system 200 including the sound recording device 210 according to the present example embodiment. FIG. 3A illustrates a case of applying the present example embodiment to a price negotiation while viewing an estimate as a printed matter 252.

At recording 310 in FIG. 3A, an estimate creator 311 asks a customer 312 "What do you think of here in this estimate?" while describing a first dot near an estimate content with the sound recording device 210 and capturing an image of the dot with a microcamera. Then, a dot image or a dot identifier of the first dot is assigned as a cueing index in association with the voice of the creator 311 "What do you think of here in this estimate?" After responding "This price is fine but" in response to the question, the customer 312 requests "can you lower the price for here?" while describing a second dot near another estimate content and capturing an image of the dot with the microcamera. Then, the voice of the customer 312 "This price is fine but" is recorded following the preceding question by the creator 311 and then a dot image or a dot identifier of the newly described second dot is assigned as an index in association with the voice of the customer 312 "can you lower the price for here?" A following voice of the creator 311 "I will reconsider!" is recorded following the index for the second dot by the customer 312. A dot image 23x is recorded in association with recorded sound data as an index.

At reproduction 320 in FIG. 3A, the estimate creator 311, the customer 312, or a third person 321 reproduces the recorded sound data at a later date. At that time, when an image of the first dot on the estimate as the printed matter 252 is captured with a microcamera, "What do you think of here in this estimate? . . . . This price is fine but . . . " is reproduced and output with the dot image of the first dot as an index. When an image of the second dot is captured with the microcamera, "can you lower the price here? . . . . I will reconsider!" is reproduced and output with the dot image of the second dot as an index.

In FIG. 3A, recorded sound data associated with a target object that cannot be specified by a voice, such as a pronoun (in Japanese grammar) "here" or an attribute (in Japanese grammar) "this," can be cued, and therefore specification of a reproduction position of recorded sound data and understanding of a reproduced content are easily achieved by a simple operation. Further, cueing index assignment can be performed by a simple operation at a site where an estimate is discussed, and therefore a cueing operation can be easily performed.

FIG. 3B is a diagram illustrating another application of the recording-reproduction system 200 including the sound recording device 210 according to the present example embodiment. FIG. 3B illustrates a case of applying the present example embodiment to product development while viewing a design drawing as a printed matter 252.

At recording 330 in FIG. 3B, a creator 331 of a design drawing asks "What do you think of here in this material?" to other developers 332 and 333 while describing a third dot near a target part with the sound recording device 210 and capturing an image of the dot with a microcamera. Then, a dot image or a dot identifier of the third dot is assigned as a cueing index in association with the voice of the creator 331 "What do you think of here in this material?" In response to the question, the developer 332 responds "The description here is difficult to understand and therefore should be improved" while describing a fourth dot at a position of interest in a target part and capturing an image of the dot with the microcamera. A dot image or a dot identifier of the newly described fourth dot is assigned as an index in association with the voice of the developer 332 "The description here is difficult to understand and therefore should be improved." In response to the response by the developer 332, the developer 333 chimes in "That is right" and the voice is recorded.

At reproduction 340 in FIG. 3B, the creator 331 reproduces the recorded sound data at a later date for a design change or the like. At that time, when an image of the fourth dot in the design drawing as the printed matter 252 is captured with a microcamera, "The description here is difficult to understand and therefore should be improved . . . . That is right" is reproduced and output with the dot image of the fourth dot as an index.

In FIG. 3B, recorded sound data associated with a target object that cannot be specified by a voice, such as a pronoun (in Japanese grammar) "here" can also be cued, and therefore specification of a reproduction position of recorded sound data and understanding of a reproduced content are easily achieved by a simple operation. Further, cueing index assignment can be performed by a simple operation at a site where a design drawing is examined, and therefore a cueing operation can be easily performed.

FIG. 3C is a diagram illustrating yet another application of the recording-reproduction system 200 including the sound recording device 210 according to the present example embodiment. FIG. 3C illustrates a case of applying the present example embodiment to product development while viewing a prototype 251.

At recording 350 in FIG. 3C, a salesperson 351 gives an impression about the prototype 251 "The area around here is unstylish" while describing a fifth dot near a target part with the sound recording device 210 and capturing an image of the dot with a microcamera. Then, a dot image or a dot identifier of the fifth dot is assigned as a cueing index in association with the voice of the salesperson 351 "The area around here is unstylish." In response to the impression, a salesperson 352 points out an improvement plan "This projection should be rounded" while describing a sixth dot at a specific position in a target part and capturing an image of the dot with the microcamera. A dot image or a dot identifier of the newly described sixth dot is assigned as an index in association with the voice of the salesperson 352 "This projection should be rounded."

At reproduction 360 in FIG. 3C, a designer 361 of the prototype 251 reproduces the recorded sound data at a later date for a design change or the like. At that time, when an image of the fifth dot on the prototype 251 is captured with a microcamera, "The area around here is unstylish" is reproduced and output with the dot image of the fifth dot as an index. When an image of the sixth dot on the prototype 251 is captured with the microcamera, "This projection should be rounded" is reproduced and output with the dot image of the sixth dot as an index.

In FIG. 3C, recorded sound data associated with a target object that cannot be specified by a voice such as a pronoun (in Japanese grammar) "here" can also be cued, and therefore specification of a reproduction position of recorded sound data and understanding of a reproduced content are easily achieved by a simple operation. Further, cueing index assignment can be performed by a simple operation at a site where a prototype is evaluated, and therefore a cueing operation can be easily performed.

Functional Configuration of Sound Recording Device

Figure 4:
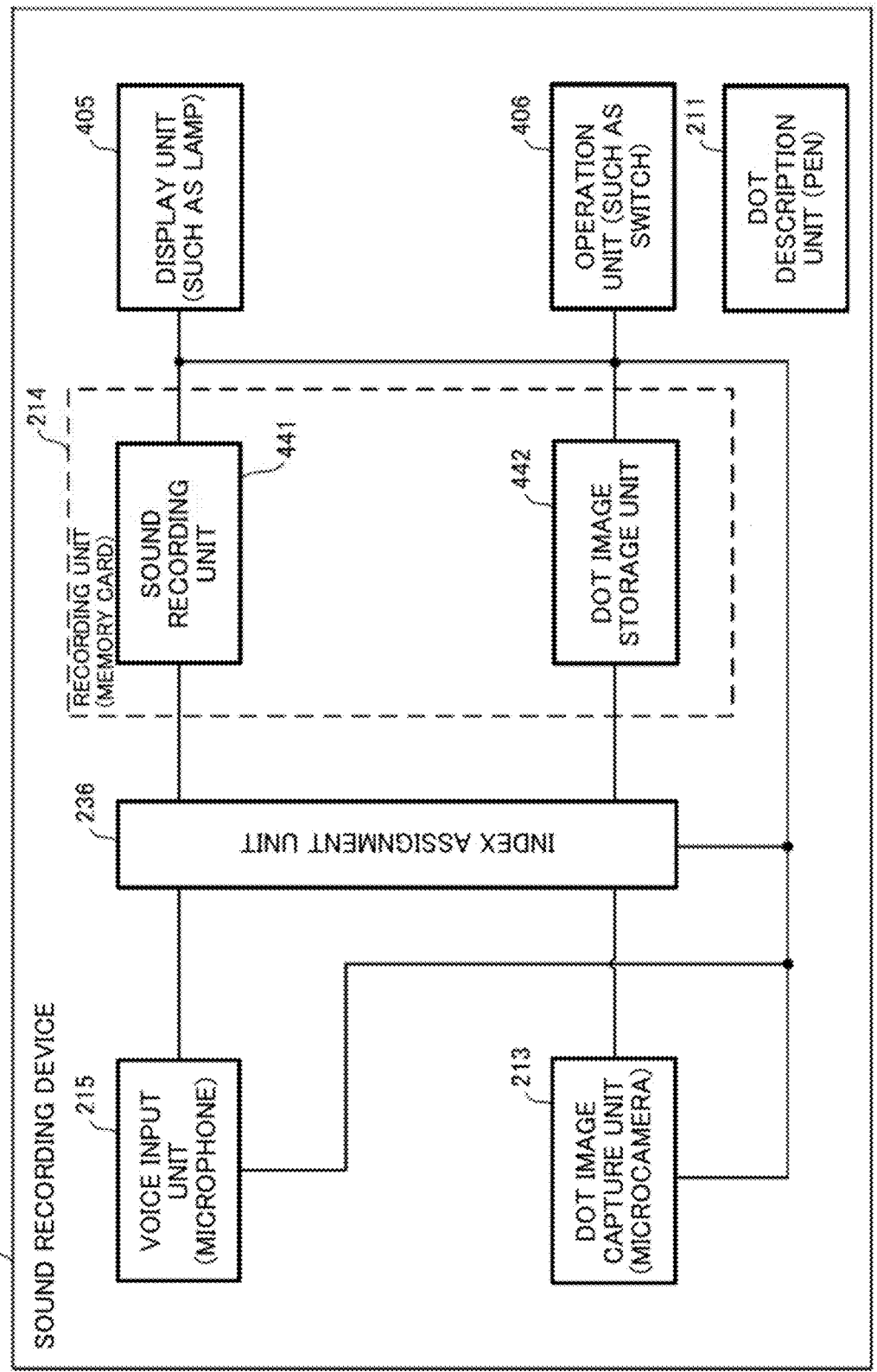
FIG. 4 is a block diagram illustrating a functional configuration of the sound recording device according to the second example embodiment.

FIG. 4 is a block diagram illustrating a functional configuration of the sound recording device 210 according to the present example embodiment. The sound recording device 210 in FIG. 4 does not have a function of extracting a dot identifier from a dot image. In other words, the figure illustrates a configuration example of leaving a load-intensive dot identifier extraction to outside. In FIG. 4, a component similar to that in FIG. 2A or FIG. 2B is given the same reference numeral.

The sound recording device 210 includes a dot description unit (pen) 211, a voice input unit (microphone) 215, a dot image capture unit (microcamera) 213, an index assignment unit 236, a recording unit (memory card) 214, a display unit (such as a lamp) 405, and an operation unit (such as a switch) 406.

As illustrated in FIG. 2C, the dot description unit (pen) 211 describes a dot at a position of interest on a printed matter, a prototype, or the like, the position being associated with a recorded voice. The voice input unit (microphone) 215 inputs a voice in a conversation referring to the printed matter, the prototype, or the like. The dot image capture unit (microcamera) 213 captures an enlarged image of a dot described by the dot description unit (pen) 211. The index assignment unit 236 assigns, as an index, a dot image described at a position of interest of a speaker to a voice in a conversation input to the voice input unit (microphone) 215, in association with the voice. The recording unit (memory card) 214 includes a sound recording unit 441 storing recorded sound data of a conversation and a dot image storage unit 442 storing a dot image as an index in association with the recorded sound data. The recording unit 214 may be a non-removable fixed memory such as a memory card when recorded sound data and an index are output or transmitted, or when the sound recording device 210 has a reproduction function.

For example, the display unit (such as a lamp) 405 is a power lamp, a recording lamp, an index assignment operation lamp, or the like, and notifies a user of a state of the sound recording device 210. For example, the operation unit (such as a switch) 406 is a power ON/OFF switch, a sound recording start/end switch, an index assignment switch, or the like, and operates the sound recording device 210.

Recording Unit

Figure 5:
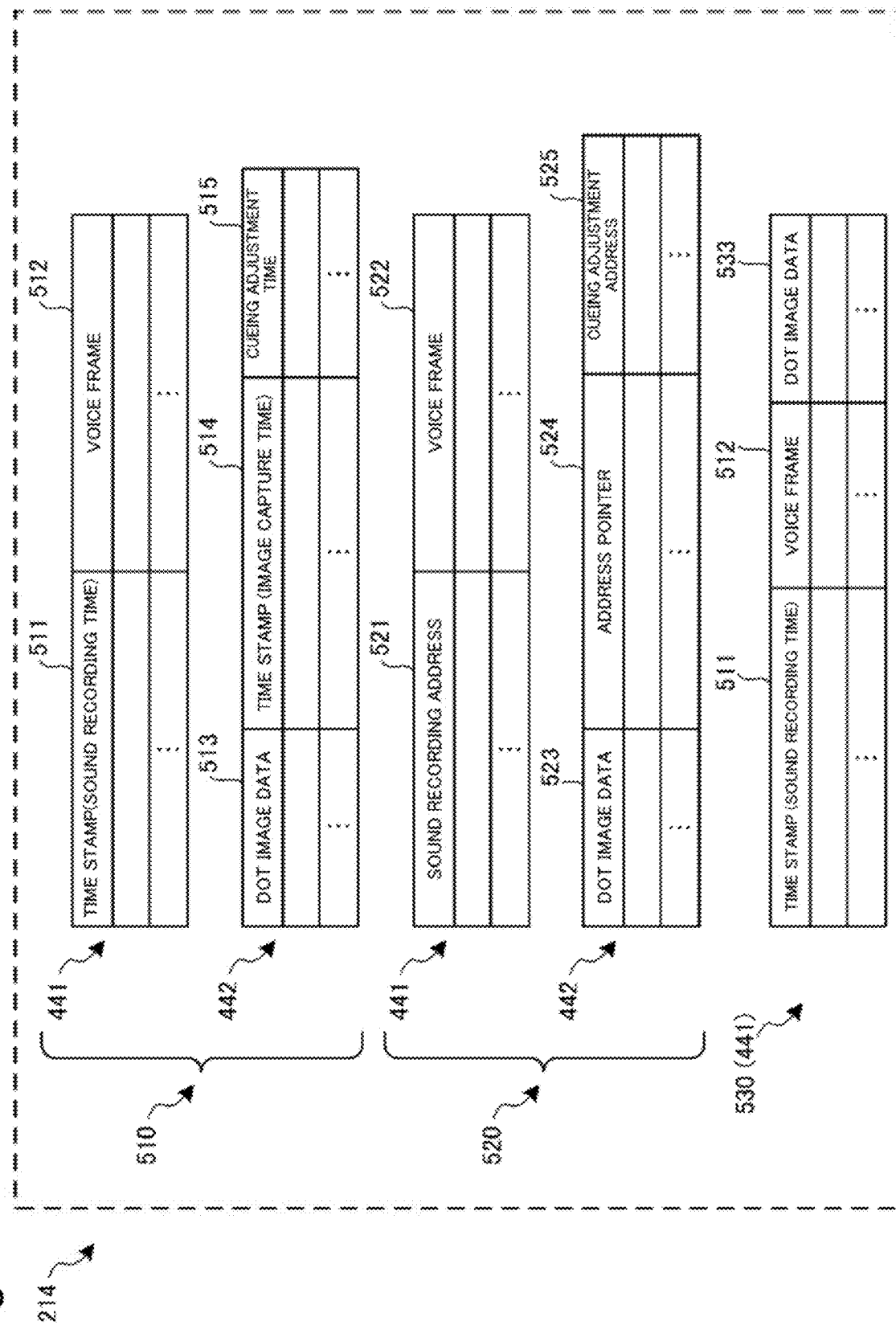
FIG. 5 is a diagram illustrating a configuration of a recording unit according to the second example embodiment.

FIG. 5 is a diagram illustrating configuration data stored in the recording unit 214 according to the present example embodiment. The recording unit 214 in FIG. 5 stores a dot image as an index. The recording unit 214 illustrated in FIG. 5 stores three types of configuration data 510, 520, and 530. The structure of the recording unit 214 is not limited to the configuration data in FIG. 5. Any recording structure allowing indexing of recorded sound data by a dot image may be used.

In the configuration data 510, a time stamp (a sound recording time or a dot image capture time), and recorded sound data or a dot image are associated with each other. For example, a sound recording unit 441 in the configuration data 510 stores a voice frame 512 of recorded sound data in association with a time stamp 511 indicating a sound recording time. A dot image storage unit 442 in the configuration data 510 stores a time stamp 514 indicating an image capture time and a cueing adjustment time 515, in association with dot image data 513. The cueing adjustment time 515 is optional. Since an image capture time is delayed behind recorded sound data by a dot describing time and an image capturing time, a cueing adjustment time 515 is set in order to adjust the delay. The cueing adjustment may be performed either at recording or at reproduction.

In the configuration data 520, a sound recording position is associated with recorded sound data, and a dot storage position is associated with a dot image. For example, a sound recording unit 441 in the configuration data 520 stores a voice frame 522 of recorded sound data in association with a sound recording address 521 indicating a sound recording position. A dot image storage unit 442 in the configuration data 520 stores an address pointer 524 pointing a sound recording address at dot image capture and a cueing adjustment address 525, in association with dot image data 523. The cueing adjustment address 525 is optional. Since an address at image capture differs from an address of recorded sound data by a dot describing time and an image capturing time, the cueing adjustment address 525 is set for adjustment. The cueing adjustment may be performed either at recording or at reproduction.

In the configuration data 530, a dot image as an index is recorded in association with recorded sound data. For example, a sound recording unit 441 in the configuration data 530 stores, at recording, a voice frame 512 of recorded sound data and a dot image 533 as an index, in association with a time stamp 511 indicating a sound recording time.

Another Functional Configuration of Sound Recording Device

Figure 6:
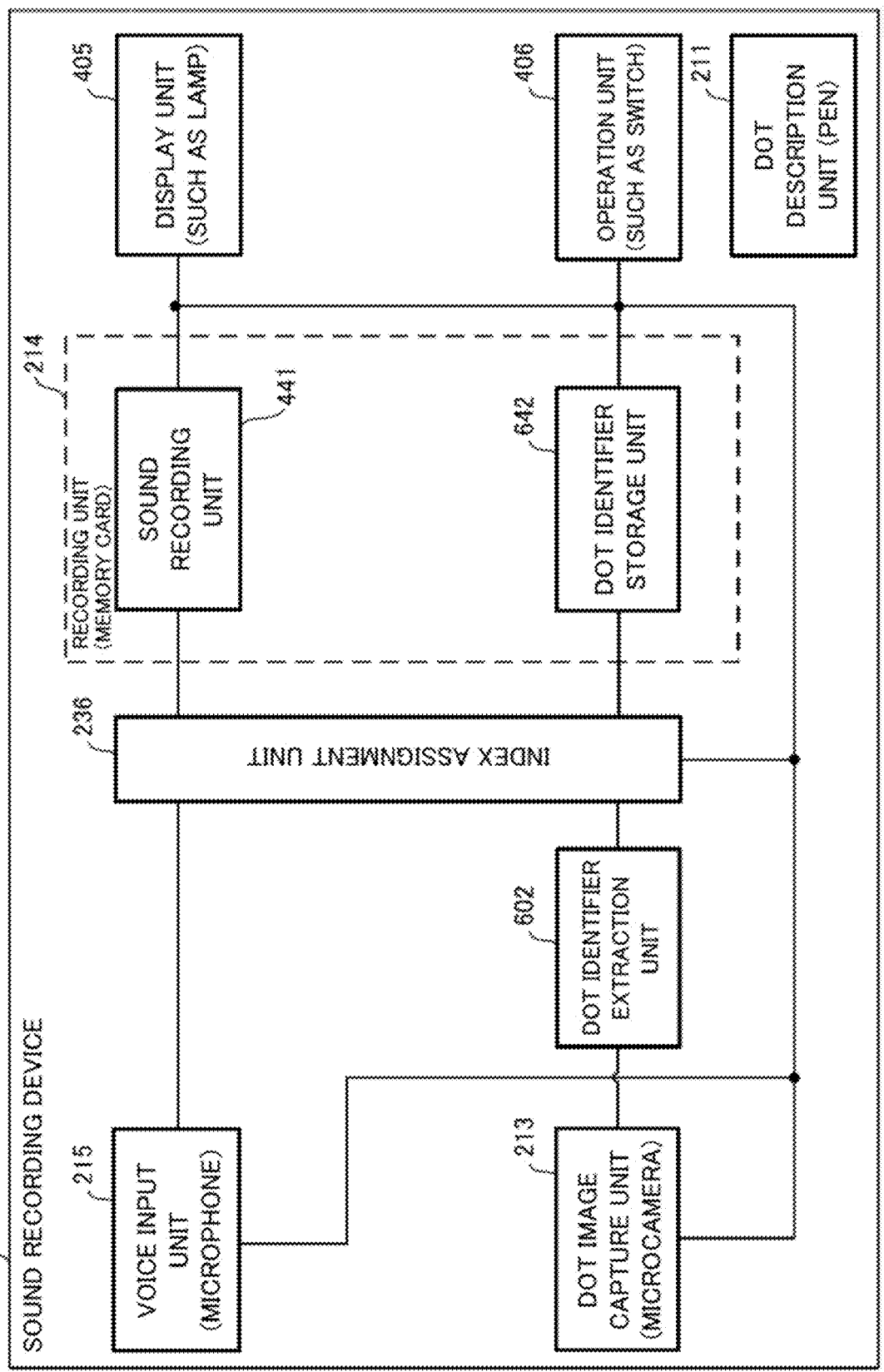
FIG. 6 is a block diagram illustrating another functional configuration of the sound recording device according to the second example embodiment.

FIG. 6 is a block diagram illustrating another functional configuration of the sound recording device 210 according to the present example embodiment. The sound recording device 210 in FIG. 6 has a function of extracting a dot identifier from a dot image. In other words, the device provides a dot identifier to outside and therefore can reduce a recording capacity and a communication capacity. In FIG. 6, a component similar to that in FIG. 2A, FIG. 2B, or FIG. 4 is given the same reference numeral, and redundant description is omitted.

A dot identifier extraction unit 602 extracts a dot identifier from a dot image captured by a dot image capture unit 213. Then, a recording unit (memory card) 214 includes a sound recording unit 441 storing recorded sound data of a conversation and a dot identifier storage unit 642 storing a dot identifier as an index in association with the recorded sound data. The recording unit 214 may be a non-removable fixed memory such as a memory card when recorded sound data and an index are output or transmitted, or when the sound recording device 210 has a reproduction function.

Recording Unit

Figure 7:
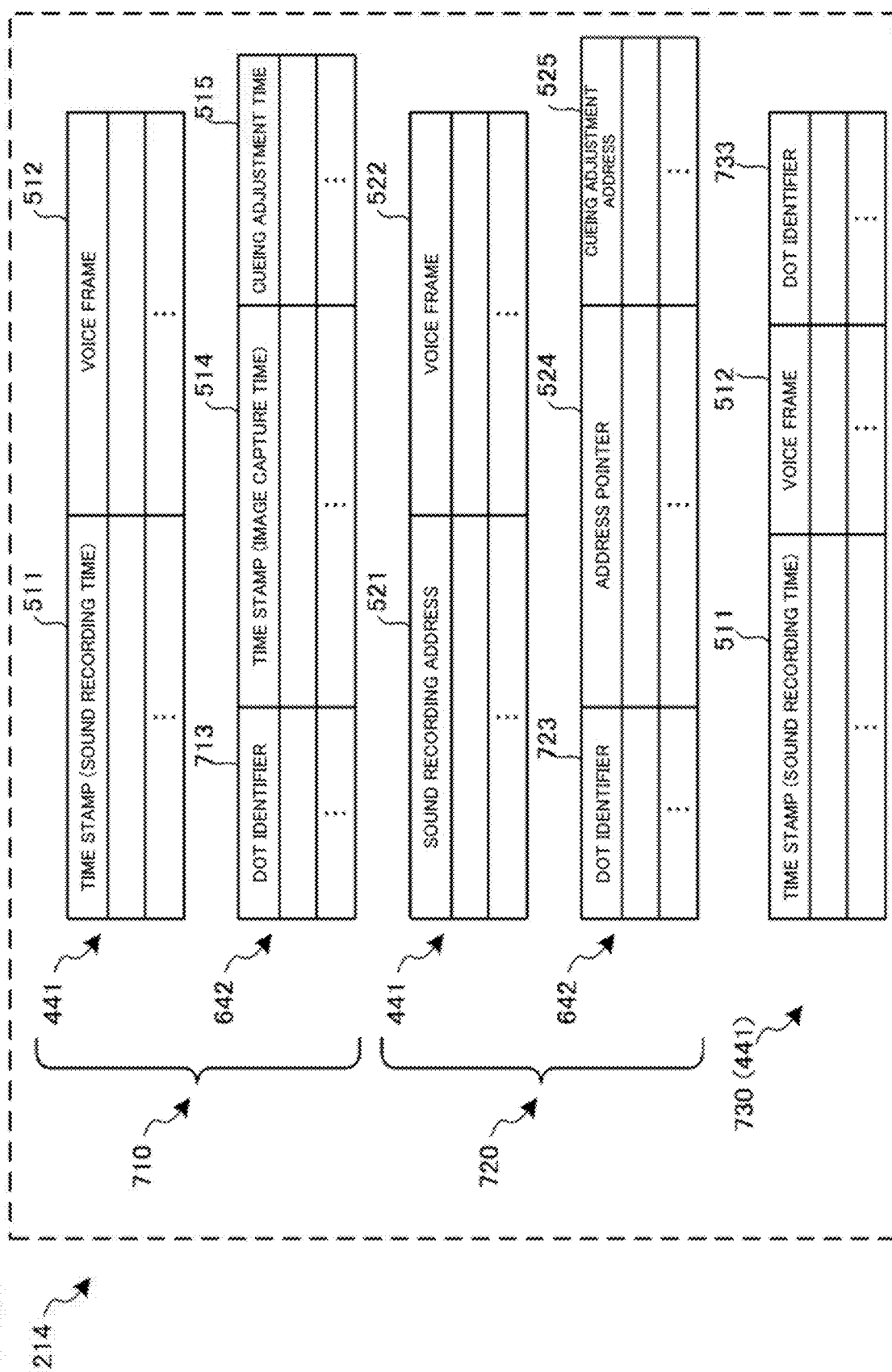
FIG. 7 is a block diagram illustrating another recording unit according to the second example embodiment.

FIG. 7 is a diagram illustrating configuration data stored in the another recording unit 214 according to the present another example embodiment. The recording unit 214 in FIG. 7 stores a dot identifier as an index. The recording unit 214 in FIG. 7 stores three types of configuration data 710, 720, and 730. The configuration data in the recording unit 214 are not limited to the configuration data in FIG. 7. Any recording structure allowing indexing of recorded sound data by a dot identifier may be used. In FIG. 7, a component similar to that in FIG. 5 is given the same reference numeral, and redundant description is omitted.

In the configuration data 710, a time stamp (a sound recording time or a dot image capture time) is associated with recorded sound data or a dot identifier. A dot identifier storage unit 642 in the configuration data 710 stores a time stamp 514 indicating an image capture time and a cueing adjustment time 515, in association with a dot identifier 713.

In the configuration data 720, a sound recording position is associated with recorded sound data, and a dot storage position is associated with a dot identifier. For example, a dot identifier storage unit 642 in the configuration data 720 stores an address pointer 524 pointing a sound recording address at dot image capture and a cueing adjustment address 525, in association with a dot identifier 723.

In the configuration data 730, recorded sound data are associated with a dot identifier as an index. For example, a sound recording unit 441 in the configuration data 730 stores, at recording, a voice frame 512 of recorded sound data and a dot identifier 733 as an index, in association with a time stamp 511 indicating a sound recording time.

Example of Dot Identifier Extraction Unit

FIG. 8A is a block diagram illustrating an example of a functional configuration of the dot identifier extraction unit 602 according to the present example embodiment. FIG. 8A illustrates part of the sound recording device 210 including the dot identifier extraction unit 602. Referring to FIG. 8A, the dot identifier extraction unit 602 according to the present example embodiment has a function of extracting a dot identifier from a dot image on a printed matter or a prototype 251. It is assumed that every dot identifier extraction unit herein extracts a dot identifier by processing the same as or similar to that in the dot identifier extraction unit 602.

The printed matter or the prototype 251, a dot 253 being formed thereon and being described with a writing tool, and microscopic grains 256 contained in the dot 253 in FIG. 8A are the same as the printed matter or the prototype 251, the dot 253, and the microscopic grains 256 described with reference to FIG. 2C.

The dot image capture unit (microcamera) 213 has a function of optically acquiring an image of the dot 253 on the printed matter or the prototype 251, that is, an image capture function. For example, a camera using a charge coupled device (CCD) image sensor or a complementary metal oxide semiconductor (CMOS) image sensor may be used as the dot image capture unit (microcamera) 213.

The dot identifier extraction unit 602 has a function of extracting a dot identifier from a dot image. The dot identifier extraction unit 602 includes an image storage unit 832, a coordinate system determination unit 833, a normalized image generation unit 834, a normalized image storage unit 835, a fixed region determination unit 836, and a feature value extraction unit 837 as main function units.

For example, the dot identifier extraction unit 602 may be provided by an information processing unit and a program, the information processing unit including an arithmetic processing unit, such as one or more microprocessors, and a storage unit used as the image storage unit 832, the normalized image storage unit 835, and the like, such as a memory and/or a hard disk. The program is read into the memory from an external computer-readable recording medium at startup of the information processing unit or the like, and provides, on the arithmetic processing unit, function configuration units, such as the coordinate system determination unit 833, the normalized image generation unit 834, the fixed region determination unit 836, and the feature value extraction unit 837, by controlling an operation of the arithmetic processing unit.

The coordinate system determination unit 833 has a function of determining a coordinate system unique to an image of the dot 253 from an entire image of the dot 253 stored in the image storage unit 832. The coordinate system unique to an image of the dot 253 is defined by three parameters being a position of the origin, a direction of an axis, and a scale. The coordinate system unique to an image of the dot 253 is determined from the entire image of the dot 253 and therefore is dependent on a plane shape of the dot 253.

The normalized image generation unit 834 has a function of normalizing an image of the dot 253 stored in the image storage unit 832 to a normalized coordinate system and saving the normalized image into the normalized image storage unit 835. The normalized coordinate system is defined by three parameters being a position of the origin, a direction of an axis, and a scale.

The fixed region determination unit 836 has a function of determining a predetermined region in a normalized image of the dot 253 stored in the normalized image storage unit 835 to be a feature value extraction region. The predetermined region may be any fixed region with any shape, any size, and any number of regions. As described above, the coordinate system unique to an image of the dot 253 is dependent on the plane shape of the dot 253, and therefore the normalized image and the feature value extraction region being a fixed region therein are regions dependent on the plane shape of the dot 253.

The coordinate system determination unit 833, the normalized image generation unit 834, and the fixed region determination unit 836 constitute a region determination unit 838 determining a region dependent on a plane shape of a layer from an image of the dot 253.

The feature value extraction unit 837 has a function of extracting and outputting, as a dot identifier, a feature value dependent on a distribution of the grains 256 in the aforementioned feature value extraction region in the normalized image of the dot 253 stored in the normalized image storage unit 835.

Dot Identifier Extraction Processing

FIG. 8B is a flowchart illustrating a procedure of an example of dot identifier extraction processing according to the present example embodiment. An operation of the dot identifier extraction unit 602 will be described below with reference to FIG. 8A and FIG. 8B.

The dot identifier extraction unit 602 acquires an image of a dot 253 on a printed matter or a prototype 251 by use of the dot image capture unit (microcamera) 213 and saves the dot image into the image storage unit 832 (Step S801).

Next, the coordinate system determination unit 833 in the dot identifier extraction unit 602 inputs the image of the dot 253 from the image storage unit 832 and analyzes the image, determines a coordinate system unique to an image of the dot 253, and conveys a position of the origin, a direction of an axis and a scale of the unique coordinate system to the normalized image generation unit 834 (Step S802).

Next, based on the coordinate system being unique to an image of the dot 253 and being determined by the coordinate system determination unit 833, and a normalized coordinate system, the normalized image generation unit 834 in the dot identifier extraction unit 602 normalizes the image of the dot 253 stored in the image storage unit 832 and saves the normalized image into the normalized image storage unit 835 (Step S803).

Next, the fixed region determination unit 836 in the dot identifier extraction unit 602 determines a predetermined fixed region in the normalized image stored in the normalized image storage unit 835 to be a feature value extraction region and conveys the region to the feature value extraction unit 837 (Step S804).

Next, the feature value extraction unit 837 in the dot identifier extraction unit 602 extracts and outputs, as a dot identifier, a feature value dependent on a distribution of the grains 256 in the aforementioned feature value extraction region in the normalized image of the dot 253 stored in the normalized image storage unit 835 (Step S805).

Example of Coordinate System Determination Unit

Figure 9A:
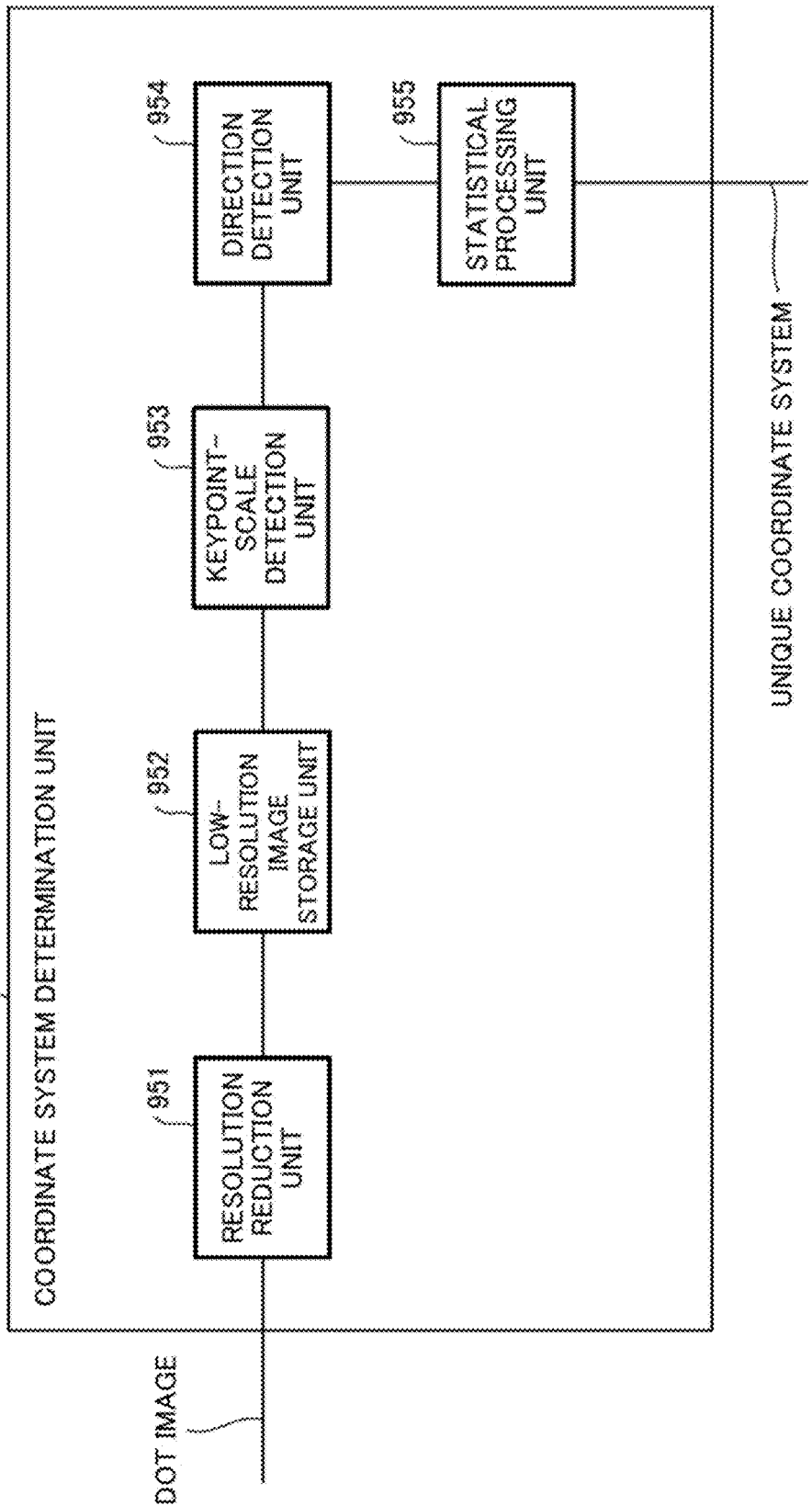
FIG. 9A is a block diagram illustrating an example of a functional configuration of a coordinate system determination unit according to the second example embodiment.

FIG. 9A is a block diagram illustrating an example of a functional configuration of the coordinate system determination unit 833 according to the present example embodiment.

The coordinate system determination unit 833 in this example includes a resolution reduction unit 951, a low-resolution image storage unit 952, a keypoint-scale detection unit 953, a direction detection unit 954, and a statistical processing unit 955.

The resolution reduction unit 951 has a function of reducing resolution of an image of the dot 253 stored in the image storage unit 832, in accordance with a predetermined criterion, and saving the resulting image into the low-resolution image storage unit 952. When the grains 256 are unevenly contained in the dot 253 and a reflection characteristic of the grain 256 is different from other materials of the dot 253, a gradation pattern according to a density of the grains 256 appears when resolution of the image of the dot 253 is reduced. The resolution reduction unit 951 is a function configuration unit for generating a gradation pattern according to the density of the grains 256 from the image of the dot 253.

The keypoint-scale detection unit 953 has a function of detecting a keypoint and a scale from an image having a gradation pattern stored in the low-resolution image storage unit 952. The keypoint means a dot or a region characteristically appearing on an image even when a scale changes, and the detected scale means an optimum scale most insusceptible to a scale change. Detection of a keypoint and a scale by the keypoint-scale detection unit 953 corresponds to detection of a keypoint and a scale performed in a process of generating a scale-invariant feature transform (SIFT) descriptor. While the SIFT is generally not suited for an image in which microscopic grains 256 are interspersed, a keypoint and a scale can be stably extracted from a gradation pattern generated by resolution reduction as described above.

The direction detection unit 954 has a function of, for each keypoint detected by the keypoint-scale detection unit 953, determining a "direction" characterizing the keypoint. Detection of a direction by the direction detection unit 954 corresponds to detection of an orientation performed in the process of generating a SIFT descriptor.

The statistical processing unit 955 has a function of determining the origin, an axis, and a scale of a unique coordinate system, based on a keypoint and a scale detected by the keypoint-scale detection unit 953 and a direction for each keypoint detected by the direction detection unit 954. For example, the statistical processing unit 955 determines the origin of the unique coordinate system, based on a distribution of a plurality of keypoints. Specifically, the statistical processing unit 955 determines the barycenter of the plurality of detected keypoints to be the origin of the unique coordinate system. The statistical processing unit 955 determines the scale and the axis of the unique coordinate system, based on distributions of scales and directions of the plurality of keypoints. Specifically, the statistical processing unit 955 determines the centers of the distributions of scales and directions of the plurality of keypoints to be the scale and the axis of the unique coordinate system, respectively. In other words, the center of the distribution of scales of the plurality of keypoints is determined to be the scale of the unique coordinate system, and the center of the distribution of directions of the plurality of keypoints is determined to be the axis of the unique coordinate system. For example, a mode may be used as the center of a distribution. However, without being limited to a mode, an average or a median may be used.

FIG. 9B is a schematic diagram for illustrating an operation of the coordinate system determination unit 833 according to the present example embodiment.

An image G911 in FIG. 9B illustrates an image of the dot 253 stored in the image storage unit 832. From the image G911, the resolution reduction unit 951 generates an image having a gradation pattern dependent on a density of the grains 256 in the dot 253, as illustrated in an image G912. For convenience, different gradations are represented by different hatching types in FIG. 9B. Next, the keypoint-scale detection unit 953 detects a keypoint and a scale from the image G912. A circle described on the image G912 represents a scale, and the center of the circle represents a keypoint. Next, the direction detection unit 954 detects a direction for each keypoint. A segment in a circle described on the image G912 represents a direction.

Next, in order to determine the scale and the axis of the unique coordinate system, based on distributions of scales and directions of the detected keypoints, the statistical processing unit 955 generates a histogram in which the horizontal axis represents a scale and the vertical axis represents a frequency, as illustrated in a histogram G913, and a histogram in which the horizontal axis represents a direction and the vertical axis represents a frequency, as illustrated in a histogram G914. Next, the statistical processing unit 955 determines a scale giving the mode from the histogram G913 and determines the scale to be the scale of the unique coordinate system. The statistical processing unit 955 determines a direction giving the mode from the histogram G914 and determines the direction to be the direction of the axis of the unique coordinate system. The statistical processing unit 955 determines the barycenter of the detected keypoints and determines the barycenter to be the origin of the unique coordinate system. In FIG. 9B, a circle described in an image G915 represents the scale of the unique coordinate system, the center of the circle represents the origin of the unique coordinate system, and an arrow in the circle represents the direction of the axis of the unique coordinate system.

FIG. 9B illustrates another image G921 differing in a plane shape of a dot and a distribution of grains in the dot compared with the image G911, a low-resolution image G922 generated from the image G921, detected keypoints and scales, generated histograms G923 and G924, and an image G925 describing a determined unique coordinate system. Thus, a unique coordinate system often becomes different as a plane shape of a layer and a distribution of grains in the layer become different.

Another Example of Coordinate System Determination Unit

FIG. 9C is a block diagram illustrating another example of the functional configuration of the coordinate system determination unit 833 according to the present example embodiment.

The coordinate system determination unit 833 in this example includes a binarization unit 961, a binarized image storage unit 962, a filled image generation unit 963, a filled image storage unit 964, and a shape processing unit 965.

The binarization unit 961 has a function of binarizing an image of a dot 253 stored in the image storage unit 832 and saving the resulting image into the binarized image storage unit 962. Consequently, a binarized image in which most of pixels in a background region are white pixels (value 0), and white pixels (value 0) and black pixels (value 1) coexist in a dot 253 region according to a distribution of the grains 256 is acquired.

The filled image generation unit 963 has a function of generating an image (filled image) having the same shape as the plane shape of the dot 253 and being completely filled with black pixels, from a binarized image stored in the binarized image storage unit 962, and saving the image into the filled image storage unit 964. Any method may be used as the method of generating a filled image from a binarized image. For example, the filled image generation unit 963 may generate a filled image by performing a morphological operation on a binarized image stored in the binarized image storage unit 962. Denoting a predetermined pixel length as n, the filled image generation unit 963 may generate a filled image from a binarized image by executing n-pixel expansion processing and n-pixel contraction processing. The n-pixel expansion processing means processing of, when a value of a pixel of interest is "1," performing an operation of setting a value of every pixel existing within an n pixel length from the pixel of interest to "1" with every pixel in the binarized image assumed as a pixel of interest. The n-pixel contraction processing means processing of, when a value of a pixel of interest is "0," performing an operation of setting a value of every pixel existing within the n pixel length from the pixel of interest to "0" on the binarized image after undergoing the n-pixel expansion processing with every pixel in the binarized image assumed as a pixel of interest.

The shape processing unit 965 has a function of determining a unique coordinate system from a feature of a filled image stored in the filled image storage unit 964. For example, the shape processing unit 965 determines the barycenter of the filled image to be the origin of the unique coordinate system. For example, the shape processing unit 965 determines an axis passing the aforementioned barycenter, being parallel to an image plane, and minimizing or maximizing a secondary moment around the axis to be the axis of the unique coordinate system. For example, the shape processing unit 965 determines an area of the aforementioned filled image to be the scale of the unique coordinate system.

Figure 9D:
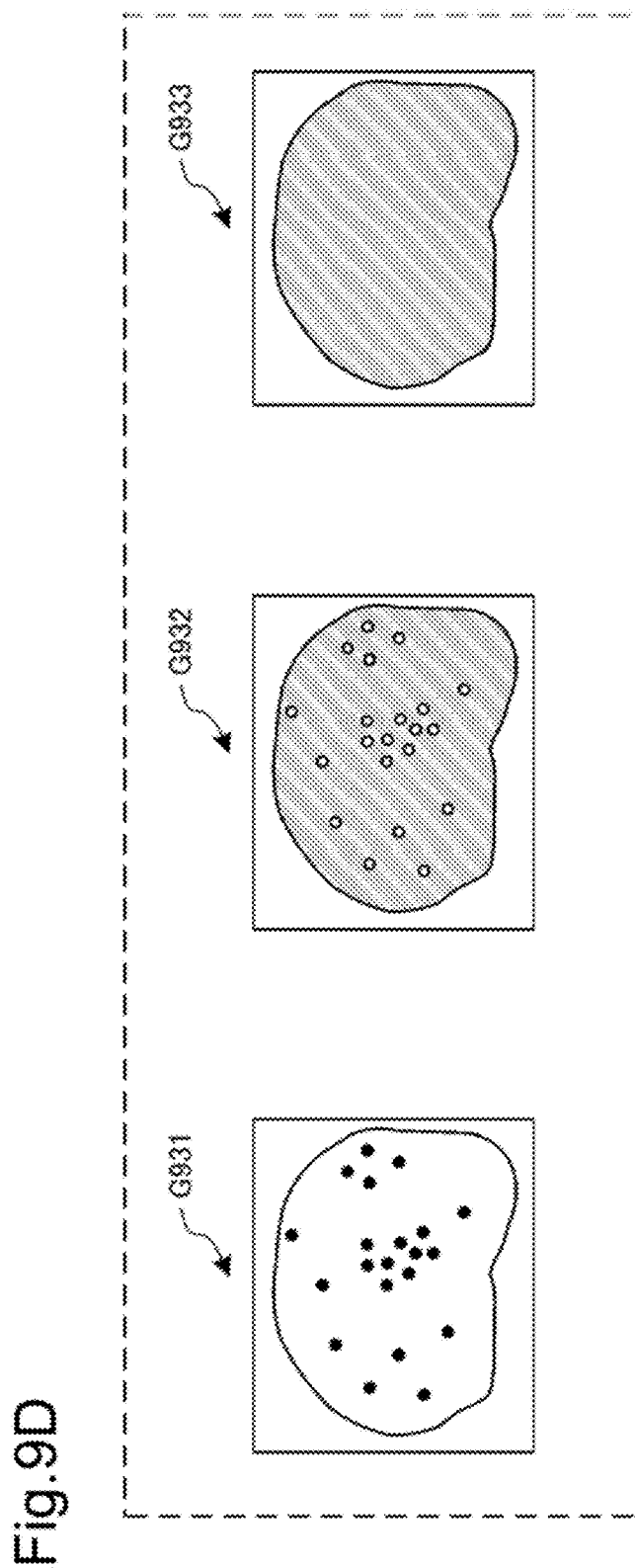
FIG. 9D is a schematic diagram for illustrating an operation of the coordinate system determination unit according to the second example embodiment.

FIG. 9D is a schematic diagram for illustrating an operation of the coordinate system determination unit according to the present example embodiment.

In FIG. 9D, an image G931 represents an image of the dot 253 stored in the image storage unit 832. The binarization unit 961 generates a binarized image G932 from the image G931. For convenience, black pixels are represented by hatching, and white pixels are represented by white circles in FIG. 9D. Next, the filled image generation unit 963 generates a filled image G933 filled with black pixels from the binarized image G932. Next, the shape processing unit 965 extracts the barycenter, the moment, and the area of the filled image G933, and determines the above to be the origin, the axis, and the scale of the unique coordinate system, respectively.

Normalized Image Generation Unit

The normalized image generation unit 834 assumes the origin of the coordinate system unique to an image of the dot 253 determined by the coordinate system determination unit 833 to be the origin of a normalized coordinate system. The normalized image generation unit 834 rotates the image of the dot 253 around the origin in such a way that the axis of the unique coordinate system matches the axis of the normalized coordinate system. The normalized image generation unit 834 enlarges or reduces the image of the dot 253 in such a way that the scale of the unique coordinate system matches the scale of the normalized coordinate system. In other words, the normalized image generation unit 834 generates a normalized image by performing coordinate transformation having the unique coordinate system as a coordinate system before transformation and the normalized coordinate system as a coordinate system after transformation on the image of the dot 253.

Figure 10A:
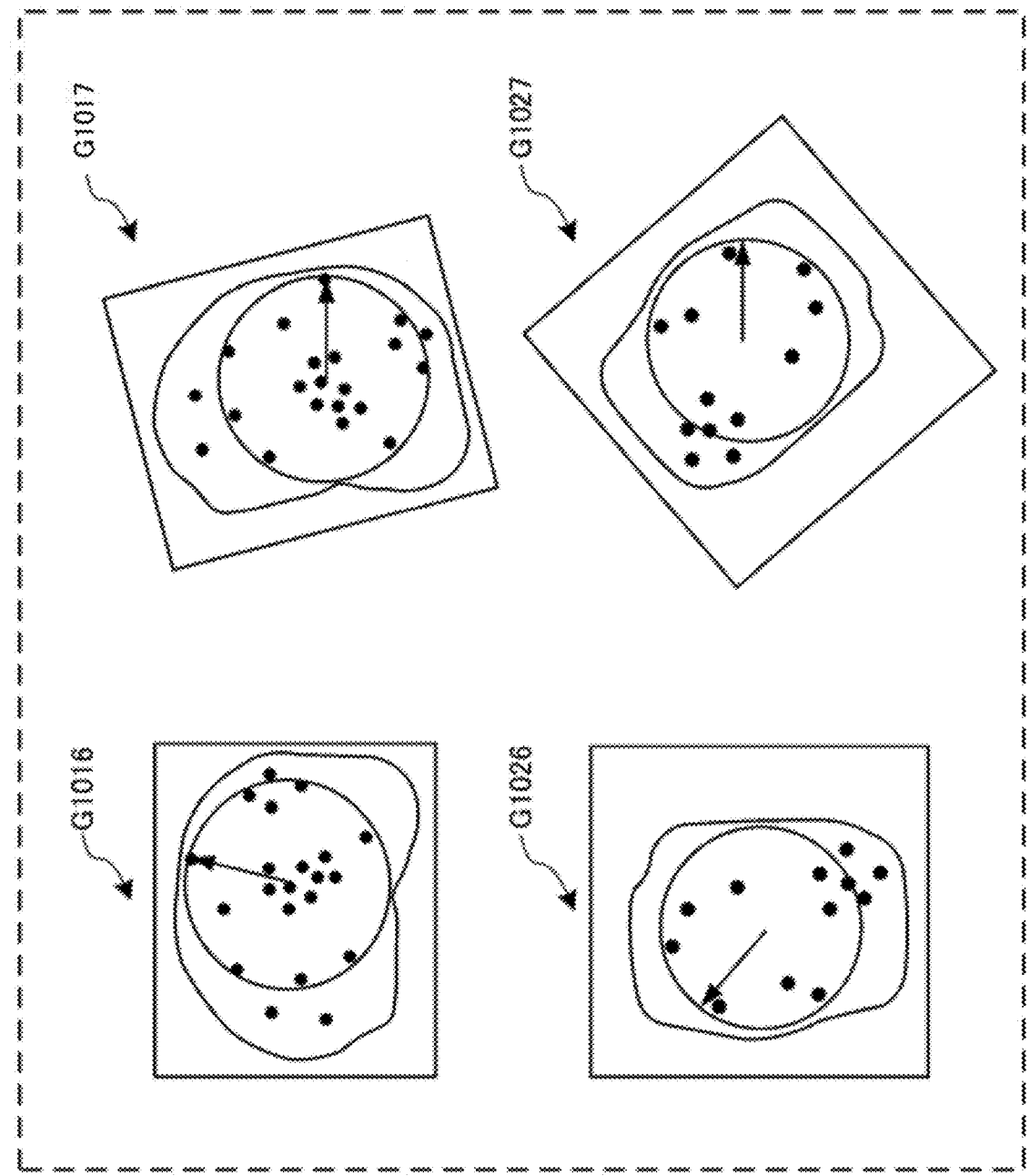
FIG. 10A is a schematic diagram for illustrating an operation of a normalized image generation unit according to the second example embodiment.

FIG. 10A is a schematic diagram for illustrating an operation of the normalized image generation unit 834 according to the present example embodiment. In FIG. 10A, images G1016 and G1026 are images acquired by drawing a unique coordinate system on each of the images G911 and G921 illustrated in FIG. 9B. Specifically, a circle described in a solid line in each of the images G1016 and G1026 represents the scale of each unique coordinate system, the center of the circle represents the origin of the unique coordinate system, and an arrow in the circle represents the axis of the unique coordinate system.

The normalized image generation unit 834 generates normalized images by rotating the images G1016 and G1026 around each origin, and also by enlarging or reducing the images in such a way that the axis of each unique coordinate system matches the axis of each normalized coordinate system and also the scale of each unique coordinate system matches the scale of each normalized coordinate system. In FIG. 10A, images G1017 and G1027 illustrate thus generated normalized images of the images G1016 and G1026, respectively. A circle described in each of the images G1017 and G1027 represents the scale of each normalized coordinate system, and an arrow in the circle represents the axis of the normalized coordinate system.

Fixed Region Determination Unit

The fixed region determination unit 836 defines a fixed region in a normalized image by use of a normalized coordinate system. For example, the fixed region determination unit 836 determines a square having the origin of the normalized coordinate system as the barycenter, having the scale of the normalized coordinate system as a size of a side, and having two sides parallel to the axis of the normalized coordinate system to be a fixed region. It is a matter of course that the shape of the fixed region is not limited to a square and may be another shape such as a rectangle. Further, the size of a side does not need to match the scale of the normalized coordinate system and may be any fixed value.

Figure 10B:
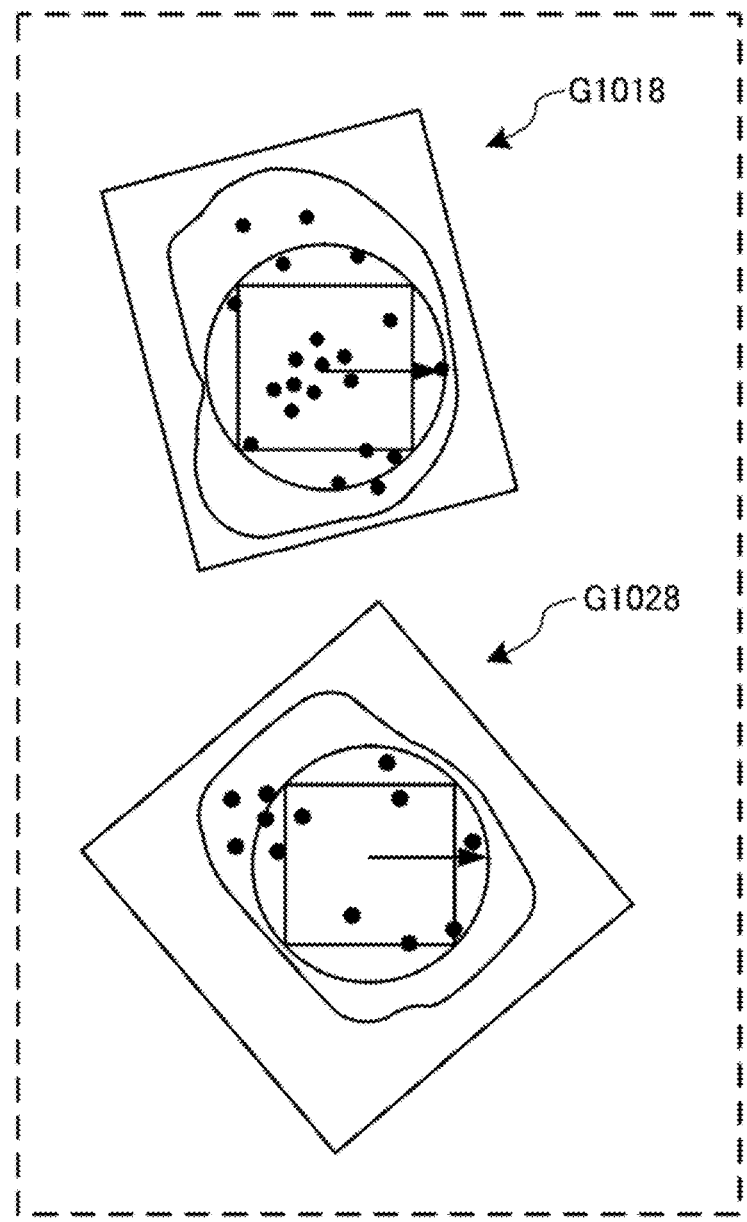
FIG. 10B is a schematic diagram for illustrating an operation of a fixed region determination unit according to the second example embodiment.

FIG. 10B is a schematic diagram for illustrating an operation of the fixed region determination unit 836 according to the present example embodiment. In FIG. 10B, images G1018 and G1028 are examples of images acquired by adding feature value extraction regions to the images G1017 and G1027 illustrated in FIG. 10A. Specifically, a circle described in each of the images G1018 and G1028 represents the scale of each normalized coordinate system, the center of the circle represents the origin of the normalized coordinate system, and an arrow in the circle represents the axis of the normalized coordinate system. Then, a square described in a solid line in each of the images G1018 and G1028 represents a fixed region being a region from which a feature value is extracted.

Feature Value Extraction Unit

The feature value extraction unit 837 has a function of extracting and outputting, as a dot identifier, a feature value dependent on the distribution of the grains 256 in the aforementioned feature value extraction region in the normalized image of the dot 253 stored in the normalized image storage unit 835.

For example, the following vectors each of which having a fixed number of dimensions may be considered as feature values extracted by the feature value extraction unit 837.

Feature Value Example 1

The feature value extraction unit 837 divides the feature value extraction region in the normalized image of the dot 253 into (n×m) blocks by dividing the feature value extraction region into n equal parts in a direction parallel to the axis of the normalized coordinate system and dividing the feature value extraction region into m equal parts in a direction perpendicular to the axis. Next, the feature value extraction unit 837 extracts a luminance of each block. Next, the feature value extraction unit 837 compares a luminance of each block with a threshold value and quantizes a luminance of each block into a binary value by, for example, setting a value 1 to a luminance when the luminance is equal to or more than the threshold value and setting a value 0 otherwise. Then, the feature value extraction unit 837 outputs a bit string in which the quantized values of the blocks are arranged in a predetermined order as an (n×m)-dimensional feature value constituting a dot identifier.

Feature Value Example 2

The feature value extraction unit 837 extracts binary robust independent elementary features (BRIEF) having a fixed bit length from the feature value extraction region in the normalized image of the dot 253 and outputs the BRIEF as a feature value having a fixed number of dimensions and constituting an individual identifier.

However, feature values extracted by the feature value extraction unit 837 are not limited to the examples described above. For example, the feature value extraction unit 837 may extract a SIFT feature value from the feature value extraction region in the normalized image of the dot 253 as a dot identifier. In this case, when a SIFT feature value is directly extracted from an image of the feature value extraction region, one of the grains 256 becomes the minimum scale and the direction cannot be determined, and the descriptor becomes unstable. Accordingly, it is desirable to generate an image having a gradation pattern by reducing resolution of the image of the feature value extraction region in accordance with a predetermined criterion and extract a SIFT feature value from the image having the aforementioned gradation pattern. However, it is more preferable to extract the aforementioned feature value having a fixed number of dimensions rather than the SIFT feature value from viewpoints of identifying power and acceleration of identification and checking.

Another Example of Dot Identifier Extraction Unit

Figure 11A:
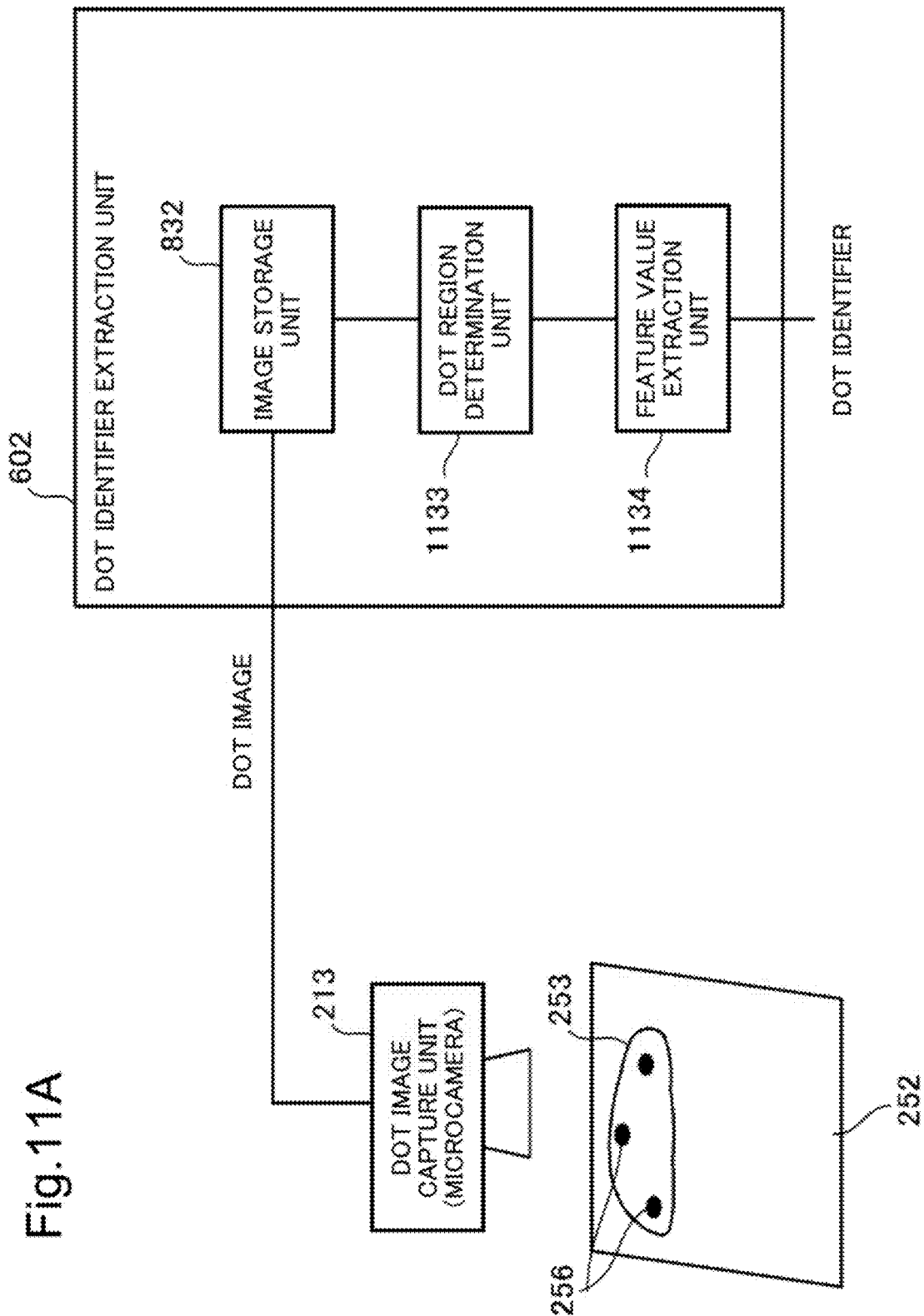
FIG. 11A is a block diagram illustrating another example of the functional configuration of the dot identifier extraction unit according to the second example embodiment.

FIG. 11A is a block diagram illustrating another example of the functional configuration of the dot identifier extraction unit 602 according to the present example embodiment. FIG. 11A illustrates part of the sound recording device 210 including the dot identifier extraction unit 602. Referring to FIG. 11A, the dot identifier extraction unit 602 according to the present example embodiment has a function of extracting a dot identifier of a printed matter or a prototype 251. In FIG. 11A, a component similar to that in FIG. 8A is given the same reference numeral, and redundant description is omitted.

The dot identifier extraction unit 602 has a function of extracting a dot identifier from a dot image. The dot identifier extraction unit 602 in this example includes a dot region determination unit 1133 and a feature value extraction unit 1134 as main function units. A program for the dot identifier extraction unit 602 is read into a memory from an external computer-readable recording medium at startup of an information processing unit or the like, and provides, on an arithmetic processing unit, function configuration units, such as the dot region determination unit 1133 and the feature value extraction unit 1134, by controlling an operation of the arithmetic processing unit.

The dot region determination unit 1133 has a function of determining an entire plane shape of a dot 253 stored in the image storage unit 832 to be a feature value extraction region.

The feature value extraction unit 1134 has a function of extracting a feature value dependent on a distribution of grains 256 from the aforementioned feature value extraction region in an image of the dot 253 stored in the image storage unit 832 and outputting the feature value as a dot identifier.

FIG. 11B is a flowchart illustrating a procedure of another example of the dot identifier extraction processing according to the present example embodiment. An operation of the dot identifier extraction unit 602 will be described below with reference to FIG. 11A and FIG. 11B. In FIG. 11B, a step similar to that in FIG. 8B is given the same step numeral, and redundant description is omitted.

The dot region determination unit 1133 in the dot identifier extraction unit 602 determines an entire plane shape of the dot 253 to be a feature value extraction region (Step S1102). The dot region determination unit 1133 may extract the entire plane shape of the dot 253 by, for example, binarizing the image of the dot 253 and performing a morphological operation on the binarized image.

Next, the feature value extraction unit 1134 in the dot identifier extraction unit 602 extracts a feature value dependent on the distribution of the grains 256 from the aforementioned feature value extraction region in the image of the dot 253 stored in the image storage unit 832 and outputs the feature value as a dot identifier (Step S1103).

Since normalization of a coordinate system is not performed in the present example embodiment, the feature value extraction unit 1134 extracts a feature value robust to rotation of an image or the like, such as a SIFT feature value. However, a feature value extracted by the feature value extraction unit 1134 is not limited to a SIFT feature value. When a SIFT feature value is directly extracted from an image, one of the grains 256 becomes the minimum scale and the direction cannot be determined, and the descriptor becomes unstable and an inlier ratio decreases, thus making matching difficult. Then, a SIFT feature value is extracted as follows in this example.

First, the feature value extraction unit 1134 reduces resolution of an image of the feature value extraction region in the dot 253 in accordance with a predetermined criterion. Consequently, an image having a gradation pattern dependent on the density of the grains 256 in the dot 253 is generated. Next, the feature value extraction unit 1134 extracts a SIFT feature value from the image having the aforementioned gradation pattern.

Yet another Example of Dot Identifier Extraction Unit

Figure 12A:
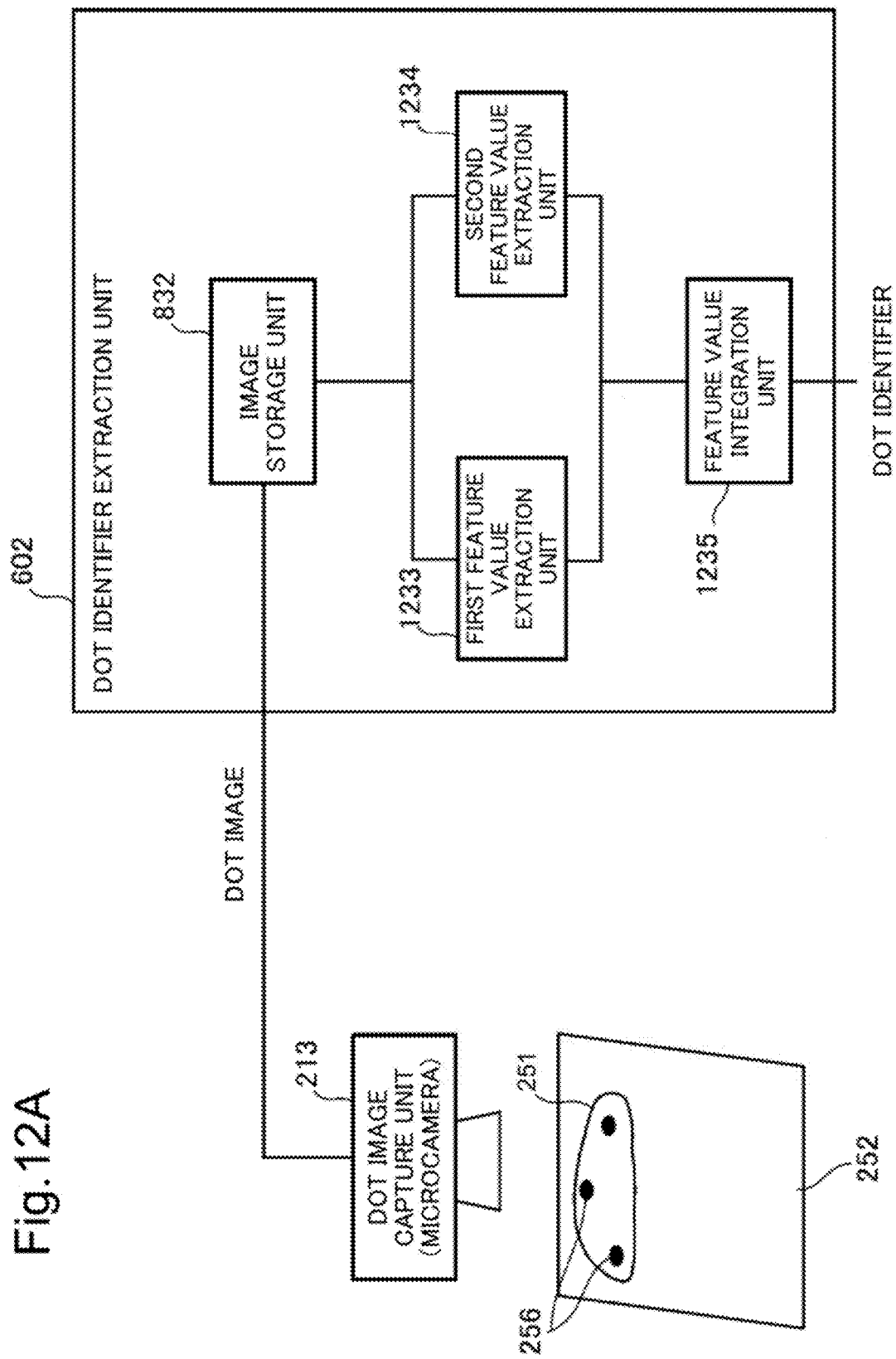
FIG. 12A is a block diagram illustrating yet another example of the functional configuration of the dot identifier extraction unit according to the second example embodiment.

FIG. 12A is a block diagram illustrating yet another example of the functional configuration of the dot identifier extraction unit 602 according to the present example embodiment. FIG. 12A illustrates part of the sound recording device 210 including the dot identifier extraction unit 602. Referring to FIG. 12A, the dot identifier extraction unit 602 according to the present example embodiment has a function of extracting a dot identifier of a printed matter or a prototype 251. In FIG. 12A, a component similar to that in FIG. 8A or FIG. 11A is given the same reference numeral, and redundant description is omitted.

The dot identifier extraction unit 602 has a function of extracting a dot identifier from a dot image. The dot identifier extraction unit 602 in this example includes an image storage unit 832, a first feature value extraction unit 1233, a second feature value extraction unit 1234, and a feature value integration unit 1235 as main function units. A program for the dot identifier extraction unit 602 is read into a memory from an external computer-readable recording medium at startup of an information processing unit or the like, and provides, on an arithmetic processing unit, function configuration units such as the first feature value extraction unit 1233, the second feature value extraction unit 1234, and the feature value integration unit 1235 by controlling an operation of the arithmetic processing unit.

The first feature value extraction unit 1233 has a function of extracting a plane shape of a dot 253 and a feature value dependent on a distribution of grains 256 from an image of the dot 253, as a first feature value. For example, the first feature value extraction unit 1233 may be provided by the coordinate system determination unit 833, the normalized image generation unit 834, the normalized image storage unit 835, the fixed region determination unit 836, and the feature value extraction unit 837 that are described with reference to FIG. 8A. Alternatively, for example, the first feature value extraction unit 1233 may be provided by the dot region determination unit 1133 and the feature value extraction unit 1134 that are described with reference to FIG. 11A.

The second feature value extraction unit 1234 has a function of extracting a feature value dependent on the plane shape of the dot 253 from the image of the dot 253, as a second feature value. For example, the second feature value extraction unit 1234 has a function of extracting a feature value dependent on the plane shape of the dot 253 but not dependent on the distribution of the grains 256 from the image of the dot 253, as a second feature value. For example, the minimum or the maximum secondary moment calculated in a process of determining the axis of the unique coordinate system by the coordinate system determination unit 833 described with reference to FIG. 9C may be used as a feature value extracted by the second feature value extraction unit 1234. However, a feature value extracted by the second feature value extraction unit 1234 is not limited to the above, and another feature value such as the area or the perimeter of the plane shape of the dot 253 may be used.

The feature value integration unit 1235 has a function of generating a dot identifier from a first feature value extracted by the first feature value extraction unit 1233 and a second feature value extracted by the second feature value extraction unit 1234. For example, the feature value integration unit 1235 determines a feature value acquired by linking the first feature value and the second feature value as a dot identifier.

Figure 12B:
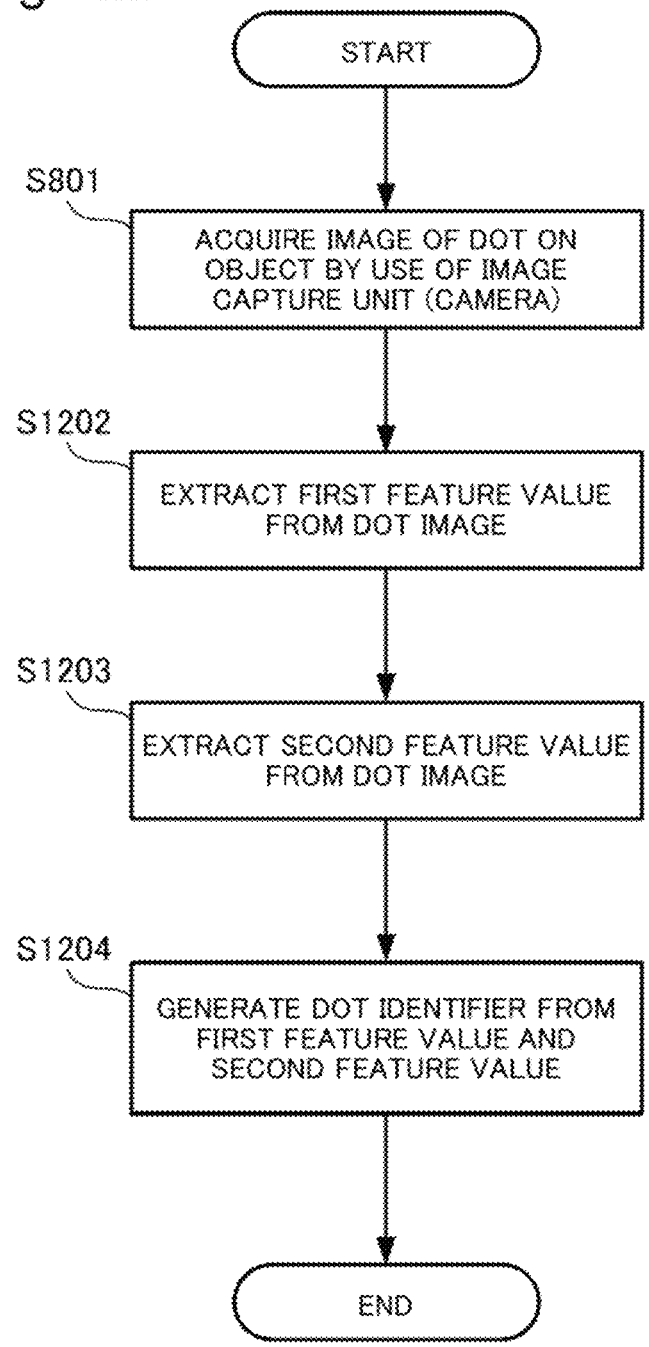
FIG. 12B is a flowchart illustrating a procedure of yet another example of the dot identifier extraction processing according to the second example embodiment.

FIG. 12B is a flowchart illustrating a procedure of yet another example of the dot identifier extraction processing according to the present example embodiment. An operation of the dot identifier extraction unit 602 will be described below with reference to FIG. 12A and FIG. 12B. In FIG. 12B, a step similar to that in FIG. 8B or FIG. 11B is given the same step numeral, and redundant description is omitted.

The first feature value extraction unit 1233 in the dot identifier extraction unit 602 extracts a first feature value dependent on a plane shape of the dot 253 and the distribution of the grains 256 from an image of the dot 253 (Step S1202).

Next, the second feature value extraction unit 1234 in the dot identifier extraction unit 602 extracts a second feature value dependent on the plane shape of the dot 253 from the image of the dot 253 (Step S1203).

Next, the feature value integration unit 1235 in the dot identifier extraction unit 602 generates a dot identifier by integrating the first feature value and the second feature value, and outputs the dot identifier (Step S1204).

Thus, a dot identifier includes a first feature value and a second feature value in this example. Accordingly, in checking and identification using a dot identifier extracted in this example, a comparison between dot identifiers may be performed with a combination of one of, two of, or all of three patterns being a comparison between first feature values, a comparison between second feature values, and a comparison between the entireties putting the first feature value and the second feature value together. Accordingly, for example, a form of first comparing second feature values and excluding candidates that are not the same nor similar, and then comparing first feature values for the remaining candidates as final identification and checking can be provided.

Hardware Configuration of Sound Recording Device

FIG. 13 is a block diagram illustrating a hardware configuration of the sound recording device 210 according to the present example embodiment. While a case of associating recorded sound data with a dot image or a dot identifier with a time stamp will be described in FIG. 13, the configuration is not limited to the case. In FIG. 13, a component similar to that in FIG. 2A, FIG. 2B, or FIG. 4 is given the same reference numeral, and redundant description is omitted.

In FIG. 13, a central processing unit (CPU) 1310 is a processor for arithmetic control and provides the function configuration units in FIG. 4 or FIG. 6 by executing a program. There may be one or a plurality of CPUs 1310. A read only memory (ROM) 1320 stores initial data, fixed data for a program and the like, and a program.

A random access memory (RAM) 1340 is a random access memory used by the CPU 1310 as a work area for temporary storage. A region for storing data required for providing the present example embodiment is secured in the RAM 1340. Voice input data 1341 are data input from a voice input unit (microphone) 215 and include a time stamp indicating a sound recording time and a voice frame. Captured image data 1342 are image data captured by a dot image capture unit (microcamera) 213 and includes dot image data and a time stamp indicating an image capture time. Operation input data 1343 are input data from an operation unit (such as a switch) 406. Display output data 1344 are output data to a display unit (such as a lamp) 405.

A storage 1350 stores a database, various parameters, or the following data or a program required for providing the present example embodiment that are used by the CPU 1310. A dot identifier extraction algorithm 1351 is an algorithm to be used for dot identifier extraction when the sound recording device 210 assigns an index with a dot identifier. The storage 1350 stores the following programs. A sound recording device control program 1352 is a program controlling the entire sound recording device 210. A sound recording control module 1353 is a module for recording a voice input from the voice input unit (microphone) 215 into a sound recording unit 441. An index generation module 1354 is a module for setting a dot image captured by the dot image capture unit (microcamera) 213 as an index and includes an image capture module and a dot identifier extraction module used when an index is assigned with a dot identifier. An index assignment module 1355 is a module assigning a dot image or a dot identifier generated by the index generation module 1354 as an index in association with recorded sound data.

An input-output interface 1360 is an interface for controlling data input and output from and to an input-output device. The input-output interface 1360 according to the present example embodiment is connected to the voice input unit (microphone) 215, the dot image capture unit (microcamera) 213, the display unit (such as a lamp) 405, the operation unit (such as a switch) 406, and the like.

A program and data related to a general-purpose function and other executable functions of the sound recording device 210 are not illustrated in the RAM 1340 and the storage 1350 in FIG. 13.

Processing Procedure of Sound Recording Device

Figure 14:
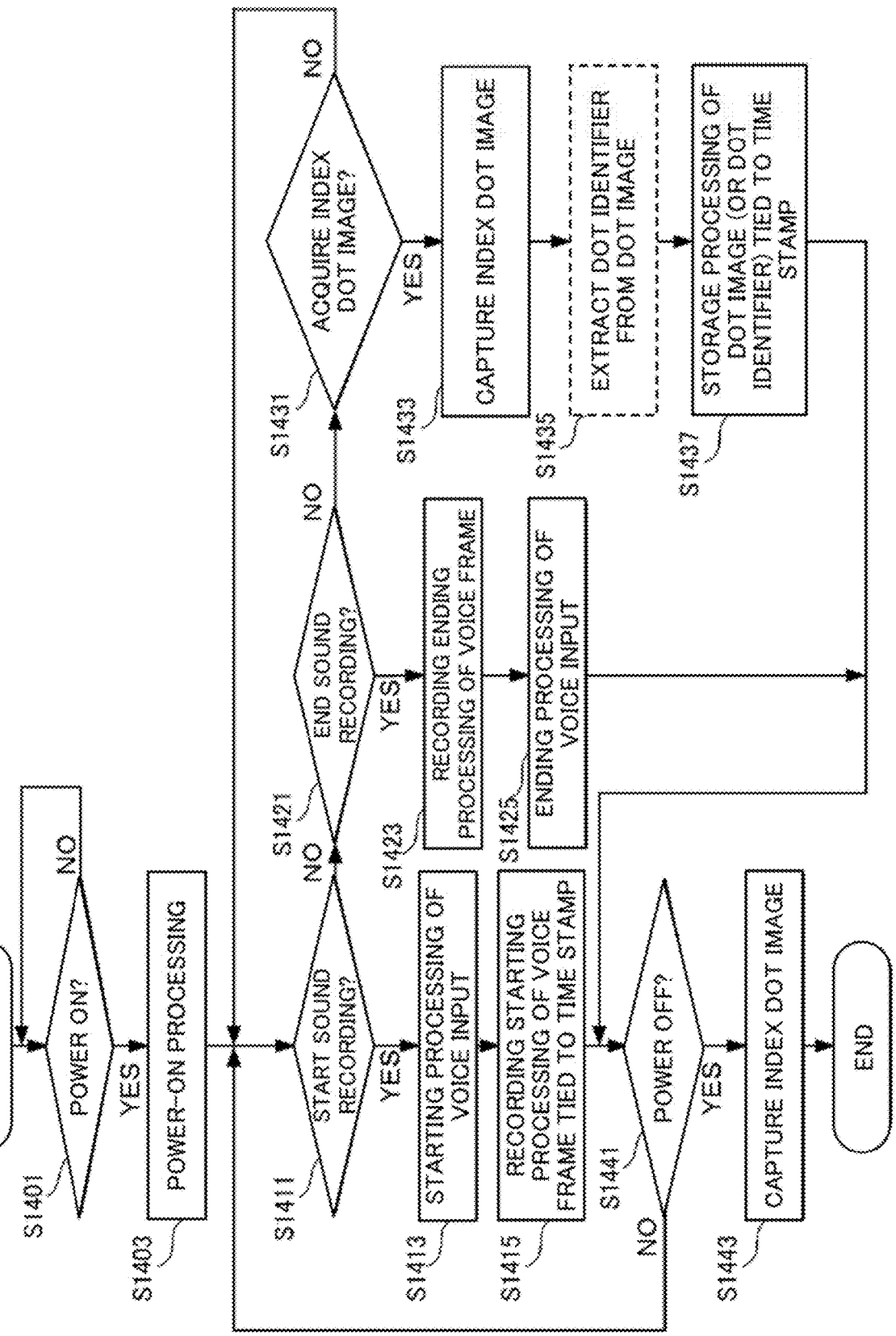
FIG. 14 is a flowchart illustrating a processing procedure of the sound recording device according to the second example embodiment.

FIG. 14 is a flowchart illustrating a processing procedure of the sound recording device 210 according to the present example embodiment. The flowchart is executed by the CPU 1310 in FIG. 13 by use of the RAM 1340 and provides the function configuration units in FIG. 4 or FIG. 6.

In Step S1401, the sound recording device 210 determines whether a switching operation for power-on is to be performed. When determining that the switching operation for power-on is to be performed, the sound recording device 210 executes power-on processing such as initialization in Step S1403.

In Step S1411, the sound recording device 210 determines whether a switching operation for starting sound recording is to be performed. When determining that the switching operation for starting sound recording is to be performed, the sound recording device 210 performs starting processing of voice input from the voice input unit (microphone) in Step S1413. Then, in Step S1415, the sound recording device 210 performs starting processing of recording of a voice frame tied to a time stamp.

When determining that the switching operation for starting sound recording is not to be performed, the sound recording device 210 determines whether a switching operation for ending sound recording is to be performed, in Step S1421. When determining that the switching operation for ending sound recording is to be performed, the sound recording device 210 performs ending processing of recording of a voice frame into a recording unit, in Step S1423. Then, in Step S1425, the sound recording device 210 performs ending processing of voice input from a voice input unit (microphone).

When determining that neither the switching operation for starting sound recording nor the switching operation for ending sound recording is to be performed, the sound recording device 210 determines whether capture of an index dot image is to be performed, in Step S1431. When determining that capture of an index dot image is to be performed, the sound recording device 210 captures an index dot image in Step S1433. When an index is assigned with a dot identifier, the sound recording device 210 extracts a dot identifier from the captured dot image, in Step S1435. Then, in Step S1437, the sound recording device 210 performs processing of storing a dot image (or a dot identifier) tied to a time stamp into a storage unit.

When any type of processing of sound recording start, sound recording end, and index assignment ends, the sound recording device 210 determines whether a switching operation for power-off is to be performed, in Step S1441. When determining that the switching operation for power-off is not to be performed, the sound recording device 210 repeats the processing from Step S1411. On the other hand, when determining that the switching operation for power-off is to be performed, the sound recording device 210 performs power-off processing in Step S1443 and ends the processing.

While a relation between dot description processing and dot image capture processing is not described in the present example embodiment, for example, more accurate and efficient index assignment can be achieved by association such as detecting dot description processing and setting a dot description time as a time stamp or detecting dot description processing and then starting preparation for dot image capture processing.

According to the present example embodiment, a captured dot image or a dot identifier extracted from a dot image is assigned as an index in association with a voice being recorded, and therefore a cueing index used at reproduction can be assigned on site to recorded sound data by a simple operation at any timing preferred by a user during recording.

Recorded sound data associated with a target object that cannot be specified by a voice in a conversation, such as a pronoun (in Japanese grammar) "here" or an attribute (in Japanese grammar) "this," in particular can be cued, and therefore specification of a reproduction position of recorded sound data and understanding of a reproduced content are easily achieved by a simple operation.

Third Example Embodiment

Next, a sound recording device according to a third example embodiment will be described. Compared with the aforementioned second example embodiment, the sound recording device according to the present example embodiment differs in that a recording unit recording recorded sound data, and a dot image or a dot identifier associated with the recorded sound data as an index is externally provided. The remaining configuration and operation are similar to those of the second example embodiment, and therefore the same configurations and the same operations are given the same reference signs, respectively, and detailed description thereof is omitted.

Outline of Recording-Reproduction System

Figure 15:
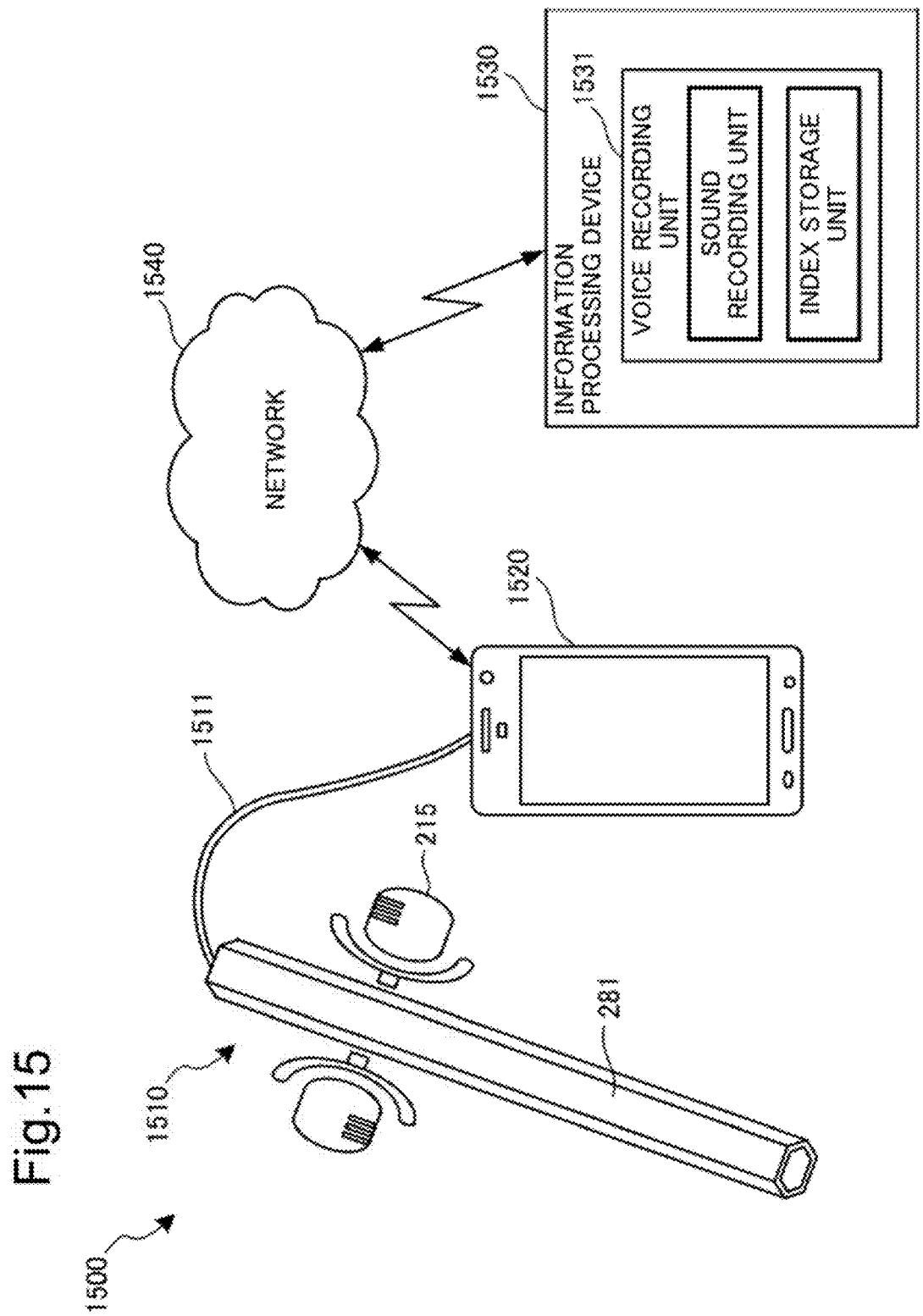
FIG. 15 is a diagram illustrating an outline of a recording-reproduction system including a sound recording device according to a third example embodiment.

FIG. 15 is a diagram illustrating an outline of a recording-reproduction system 1500 including a sound recording device 1510 according to the present example embodiment. In FIG. 15, a component similar to that in FIG. 2A is given the same reference numeral, and redundant description is omitted.

The recording-reproduction system 1500 in FIG. 15 includes a sound recording device 1510, a mobile terminal 1520 such as a smartphone, an information processing device 1530 as a server or a personal computer, and a network 1540 wirelessly connecting the mobile terminal 1520 and the information processing device 1530.

The sound recording device 1510 includes an interface cable 1511 connectable to the mobile terminal 1520, such as a USB cable. A voice input from a voice input unit (microphone) 215 in the sound recording device 1510 is assigned with, as an index, a dot image or a dot identifier acquired by a stamp-style pen 281 including a dot description unit and a dot image capture unit and is output to the mobile terminal 1520 through the interface cable 1511. Recorded sound data and index data are transmitted in association with each other from the mobile terminal 1520 to the information processing device 1530 through the network 1540. Recorded sound data and index data are recorded in association with each other in a voice recording unit 1531 in the information processing device 1530.

Acquisition of a dot image may be performed by a dot image capture unit 213 instead of the stamp-style pen 281.

Functional Configuration of Sound Recording Device

Figure 16:
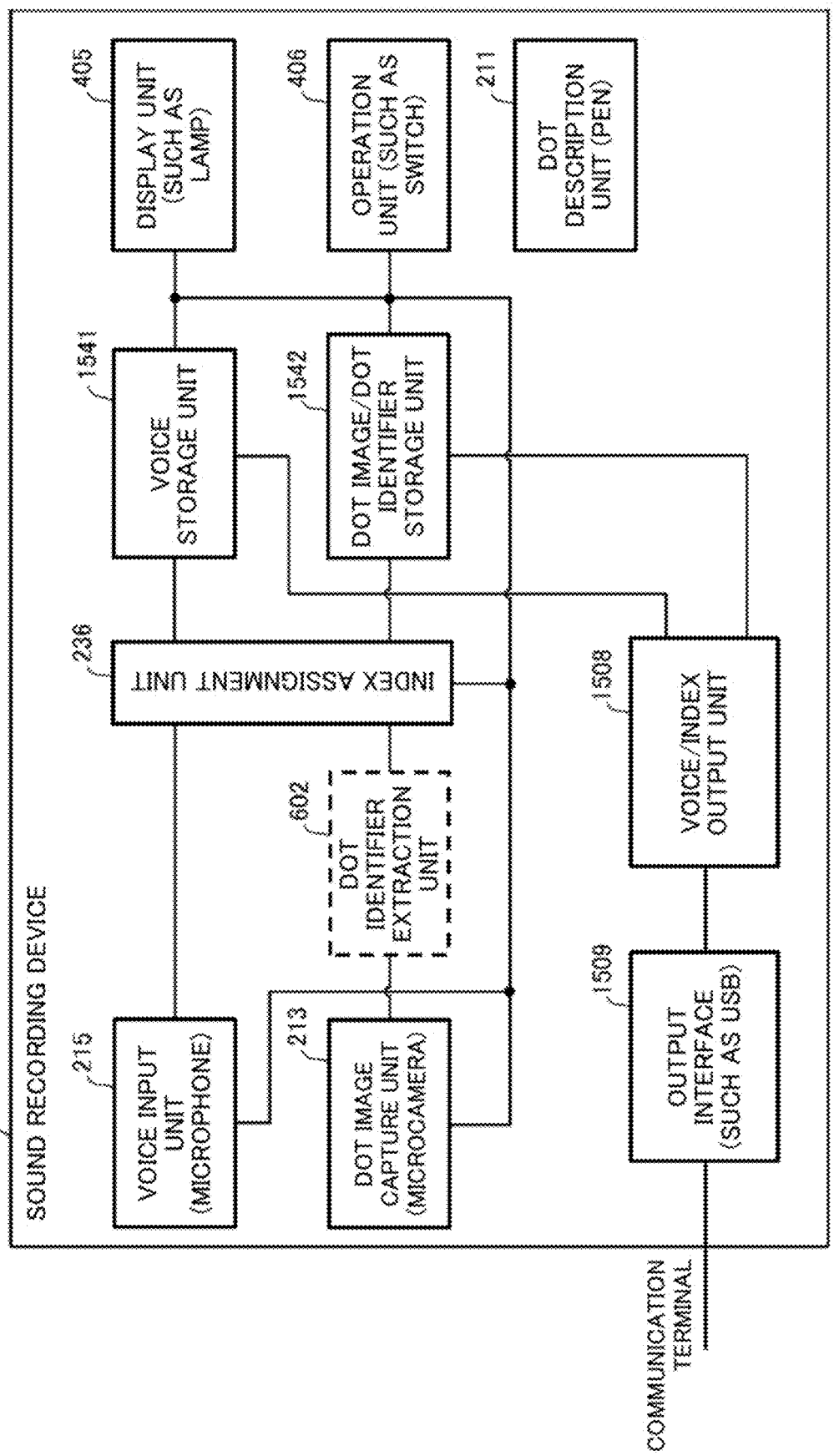
FIG. 16 is a block diagram illustrating a functional configuration of the sound recording device according to the third example embodiment.

FIG. 16 is a block diagram illustrating a functional configuration of the sound recording device 1510 according to the present example embodiment. In FIG. 16, a component similar to that in FIG. 4 or FIG. 6 is given the same reference numeral, and redundant description is omitted.

A voice storage unit 1541 and a dot image/dot identifier storage unit 1542 may be temporary storage units, and recorded sound data and a dot image/dot identifier as index data are output from a voice/index output unit 1508 to the mobile terminal 1520 through an output interface 1509 such as USB.

Outline of Another Recording-Reproduction System

Figure 17:
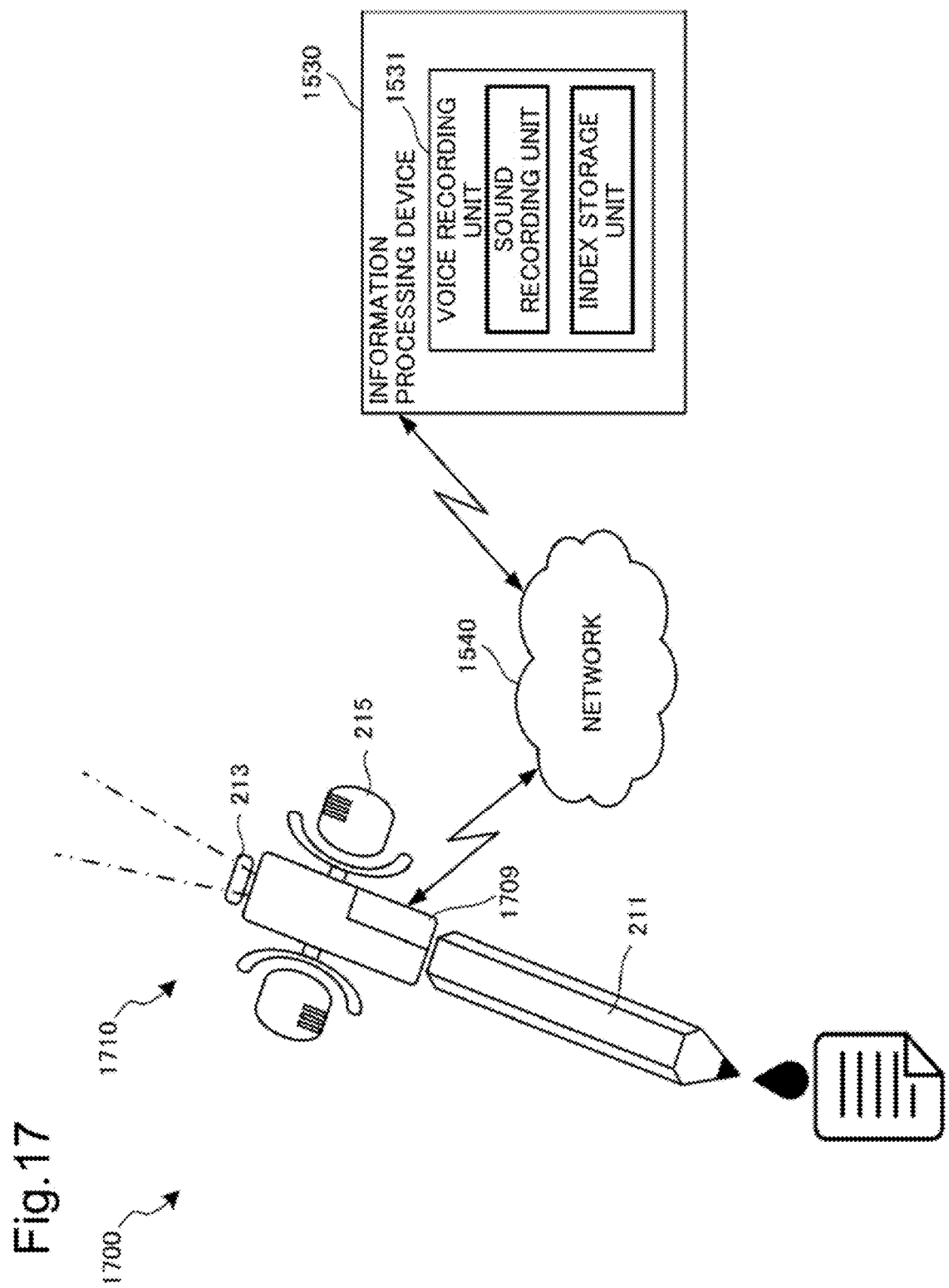
FIG. 17 is a diagram illustrating an outline of another recording-reproduction system including the sound recording device according to the third example embodiment.

FIG. 17 is a diagram illustrating an outline of another recording-reproduction system 1700 including a sound recording device 1710 according to the present example embodiment. In FIG. 17, a component similar to that in FIG. 2A or FIG. 15 is given the same reference numeral, and redundant description is omitted.

The recording-reproduction system 1700 in FIG. 17 includes the sound recording device 1710, an information processing device 1530 as a server or a personal computer, and a network 1540 wirelessly connecting the sound recording device 1710 and the information processing device 1530.

The sound recording device 1710 includes a communication control unit 1709 connectable to the network 1540. A voice input from a voice input unit (microphone) 215 in the sound recording device 1710 is assigned with, as an index, a dot image or a dot identifier acquired from a dot image capture unit 213, is transmitted to the information processing device 1530 through the communication control unit 1709, and is recorded in a voice recording unit 1531.

Functional Configuration of Another Sound Recording Device

Figure 18:
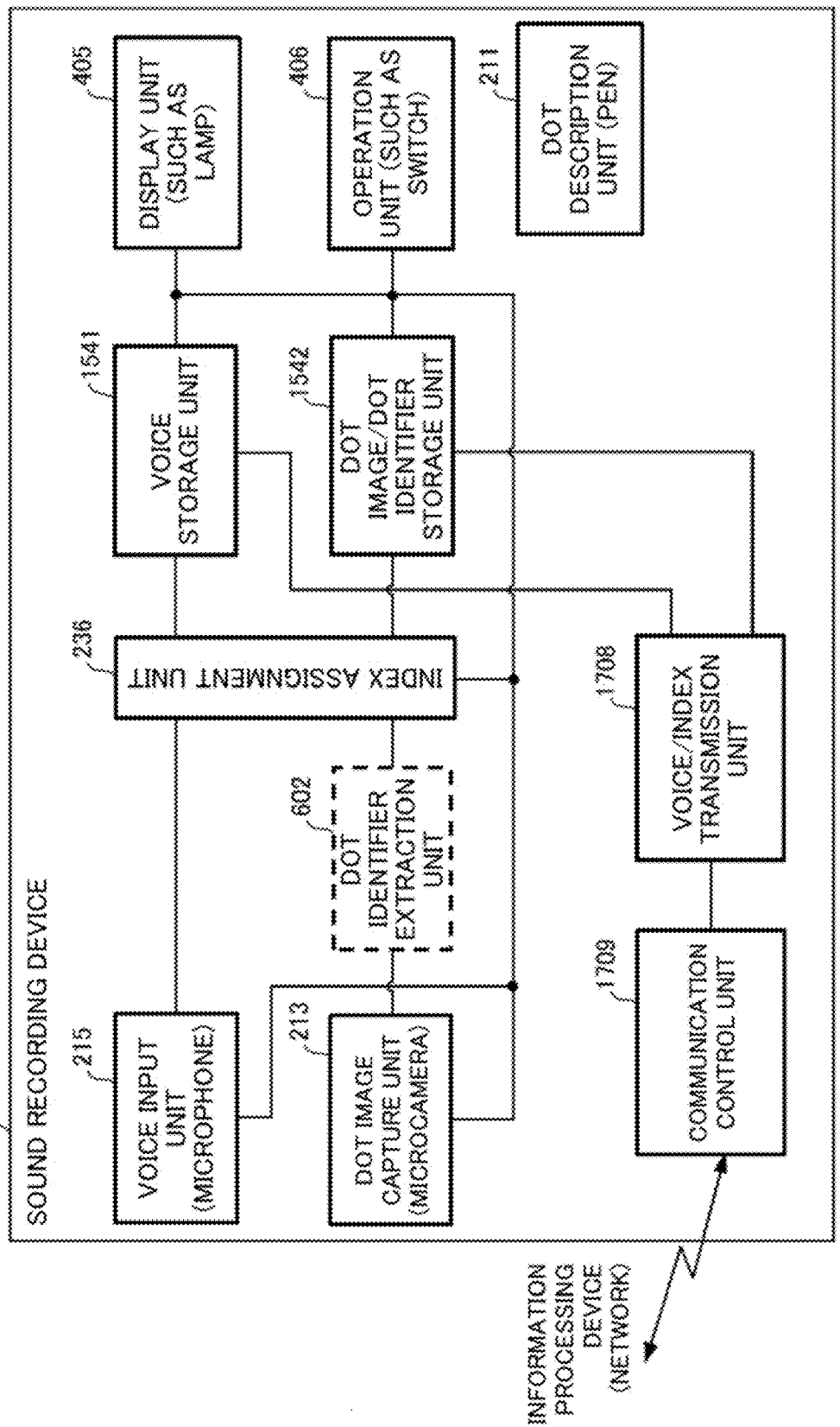
FIG. 18 is a block diagram illustrating a functional configuration of another sound recording device according to the third example embodiment.

FIG. 18 is a block diagram illustrating a functional configuration of the another sound recording device 1710 according to the present example embodiment. In FIG. 18, a component similar to that in FIG. 4, FIG. 6, or FIG. 16 is given the same reference numeral, and redundant description is omitted.

A voice storage unit 1541 and a dot image/dot identifier storage unit 1542 may be temporary storage units, and recorded sound data and a dot image/dot identifier as index data are transmitted from a voice/index transmission unit 1708 to the information processing device 1530 through the communication control unit 1709.

In addition to the effects of the aforementioned example embodiments, a sound recording device with a simpler configuration is provided, and power consumption can be minimized, according to the present example embodiment.

Fourth Example Embodiment

Next, a sound recording device according to a fourth example embodiment will be described. Compared with the aforementioned second example embodiment and third example embodiment, the sound recording device according to the present example embodiment differs in that a microphone as a voice input unit is externally provided. The remaining configuration and operation are similar to those of the second example embodiment and the third example embodiment, and therefore the same configurations and the same operations are given the same reference signs, respectively, and detailed description thereof is omitted.

Outline of Recording-Reproduction System

Figure 19:
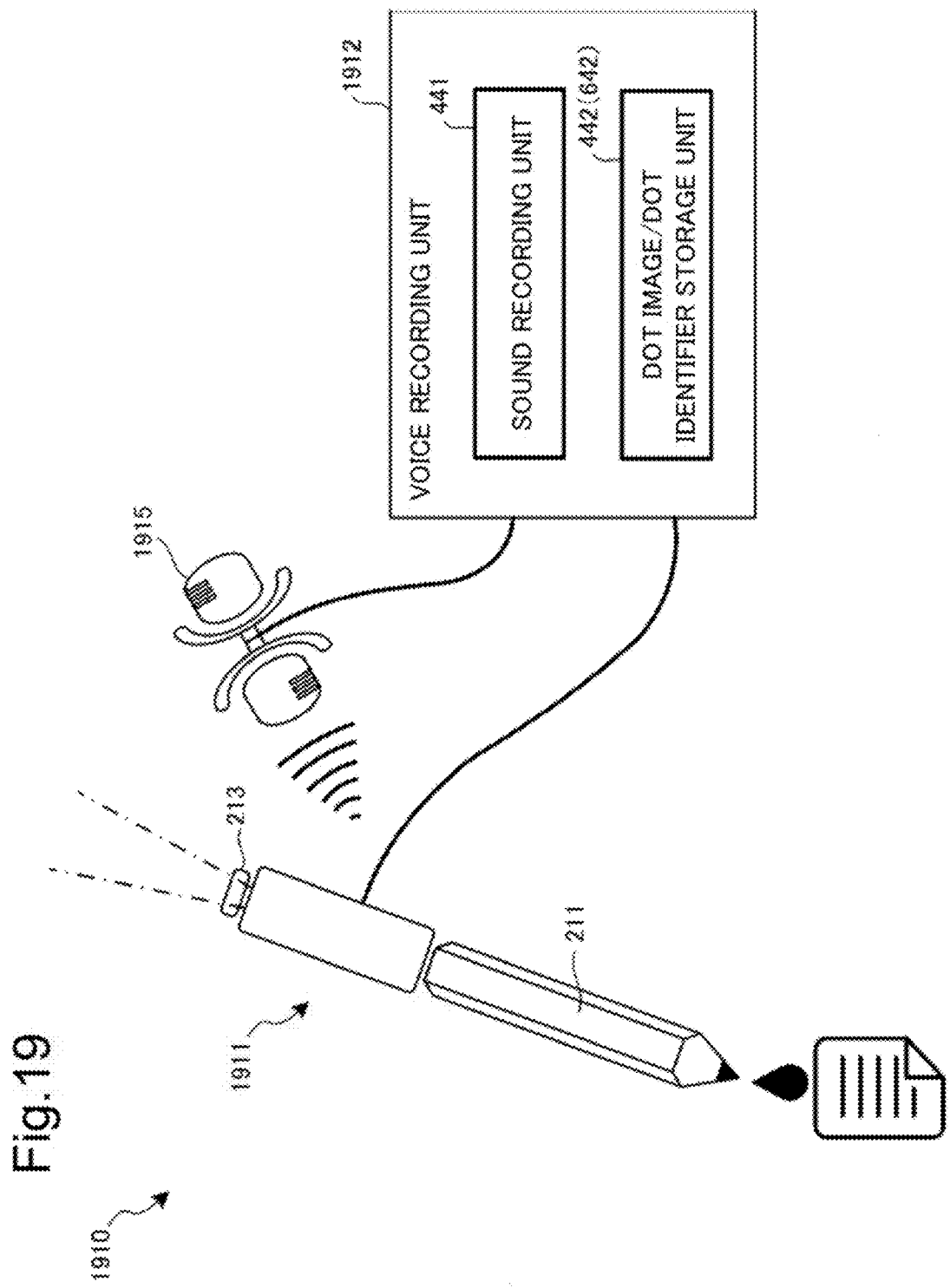
FIG. 19 is a diagram illustrating an outline of a sound recording device according to a fourth example embodiment.

FIG. 19 is a diagram illustrating an outline of a sound recording device 1910 according to the present example embodiment. In FIG. 19, a component similar to that in FIG. 2A, FIG. 4, or FIG. 6 is given the same reference numeral, and redundant description is omitted.

The sound recording device 1910 in FIG. 19 includes a pen-type index acquisition unit 1911, a voice input unit (microphone) 1915, and a voice recording unit 1912 recording voice data assigned with an index and being connected to the index acquisition unit 1911 and the voice input unit (microphone) 1915.

Functional Configuration of Sound Recording Device

Figure 20:
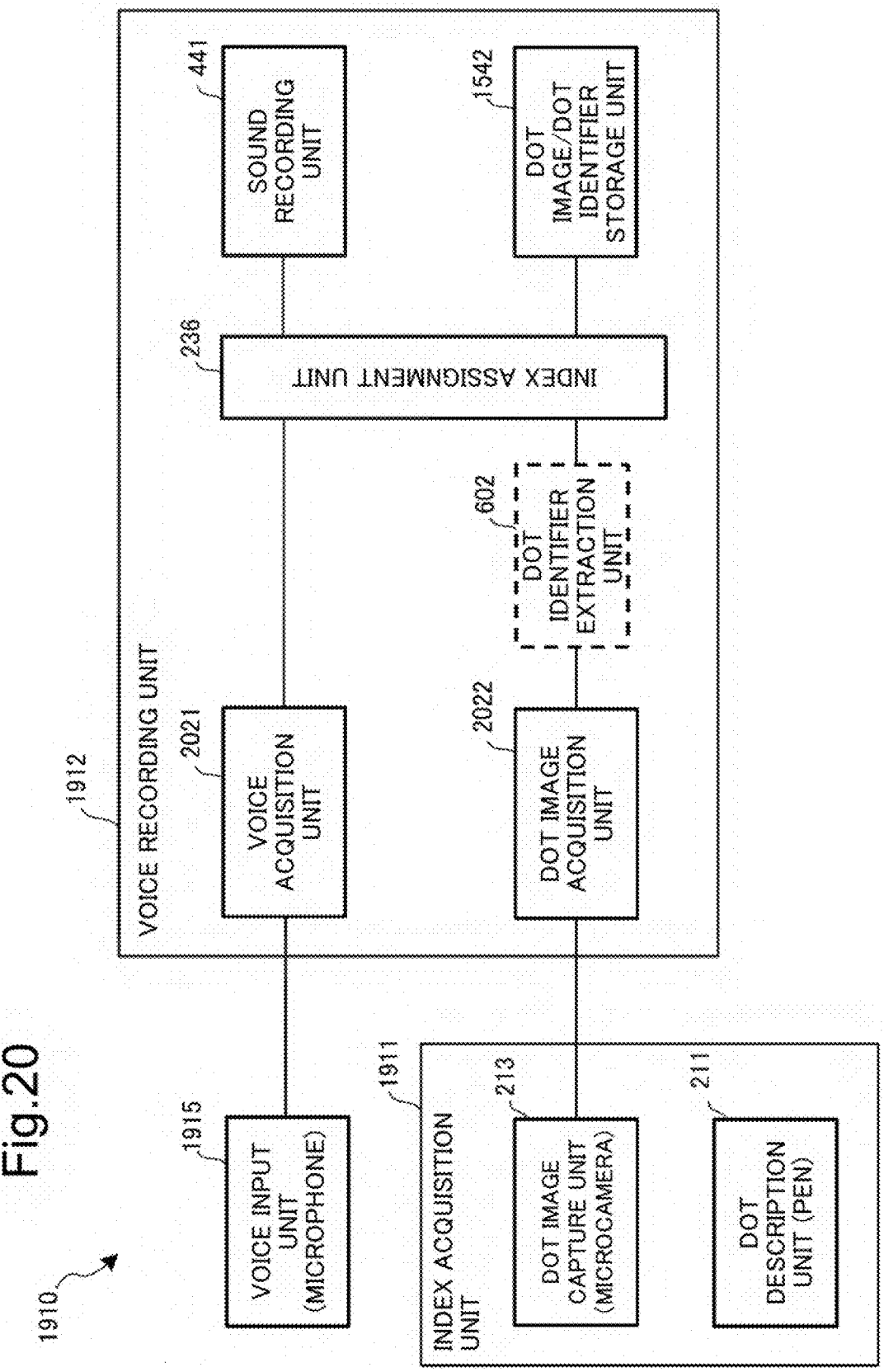
FIG. 20 is a block diagram illustrating a functional configuration of the sound recording device according to the fourth example embodiment.

FIG. 20 is a block diagram illustrating a functional configuration of the sound recording device 1910 according to the present example embodiment. In FIG. 19, a component similar to that in FIG. 2A, FIG. 4, FIG. 6, FIG. 15, or FIG. 17 is given the same reference numeral, and redundant description is omitted.

The sound recording device 1910 includes the index acquisition unit 1911, the voice input unit (microphone) 1915, and the voice recording unit 1912. The voice recording unit 1912 includes a voice acquisition unit 2021 acquiring an input voice from the voice input unit (microphone) 1915 and a dot image acquisition unit 2022 acquiring a dot image from the index acquisition unit 1911.

In addition to the effects of the aforementioned example embodiments, a sound recording device with a yet simple configuration is provided, and power consumption can be further minimized, according to the present example embodiment.

Fifth Example Embodiment

Next, a sound recording device according to a fifth example embodiment will be described. Compared with the aforementioned second example embodiment to fourth example embodiment, the sound recording device according to the present example embodiment differs in that the sound recording device has a reproduction function. The remaining configuration and operation are similar to the second example embodiment to the fourth example embodiment, and therefore the same configurations and the same operations are given the same reference signs, respectively, and detailed description thereof is omitted.

Outline of Recording-Reproduction System

Figure 21:
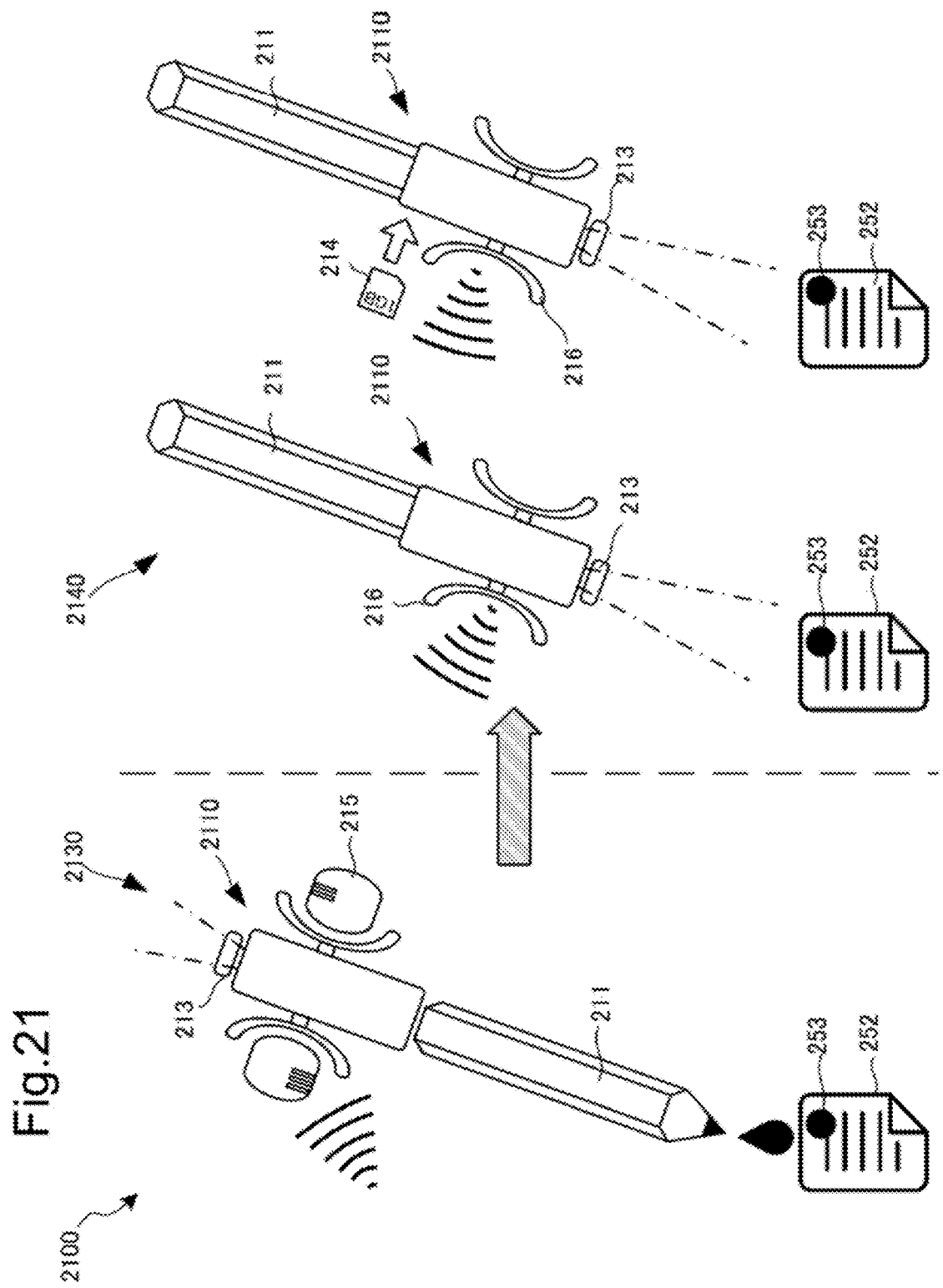
FIG. 21 is a diagram illustrating an outline of a recording-reproduction system with a sound recording device according to a fifth example embodiment.

FIG. 21 is a diagram illustrating an outline of a recording-reproduction system 2100 with a sound recording device 2110 according to the present example embodiment. The sound recording device 2110 in FIG. 21 has a sound recording function and a reproduction function, and achieves both functions of the recording-reproduction system 2100 according to the present example embodiment. In FIG. 21, a component similar to that in FIG. 2A is given the same reference numeral, and redundant description is omitted.

At recording 2130 in FIG. 21, the sound recording function of the sound recording device 2110 is operated, and a voice is input from a voice input unit 215. Then, a dot 253 is described on a printed matter 252 by a dot description unit 211, an image of the dot 253 is captured by the dot image capture unit 213, a dot image or a dot identifier is assigned to recorded sound data as an index, and the resulting data are recorded into an internal memory or a memory card.

At reproduction 2140 in FIG. 21, an image of the dot 253 is captured by the dot image capture unit 213, the image is checked against a dot image or a dot identifier recorded, as an index, in the internal memory, and recorded sound data in the internal memory associated with a matching index are reproduced, as illustrated on the left side. Further, an image of the dot 253 is captured by the dot image capture unit 213, the image is checked against a dot image or a dot identifier recorded in a memory card as an index, and recorded sound data in the memory card associated with a matching index are reproduced, as illustrated on the right side.

Reproduction from a memory card illustrated on the right side is not limited to reproduction of recorded sound data recorded by the sound recording device 2110 itself, and recorded sound data recorded by another sound recording device may be cued and reproduced by inserting the memory card.

Operational Sequence

Figure 22:
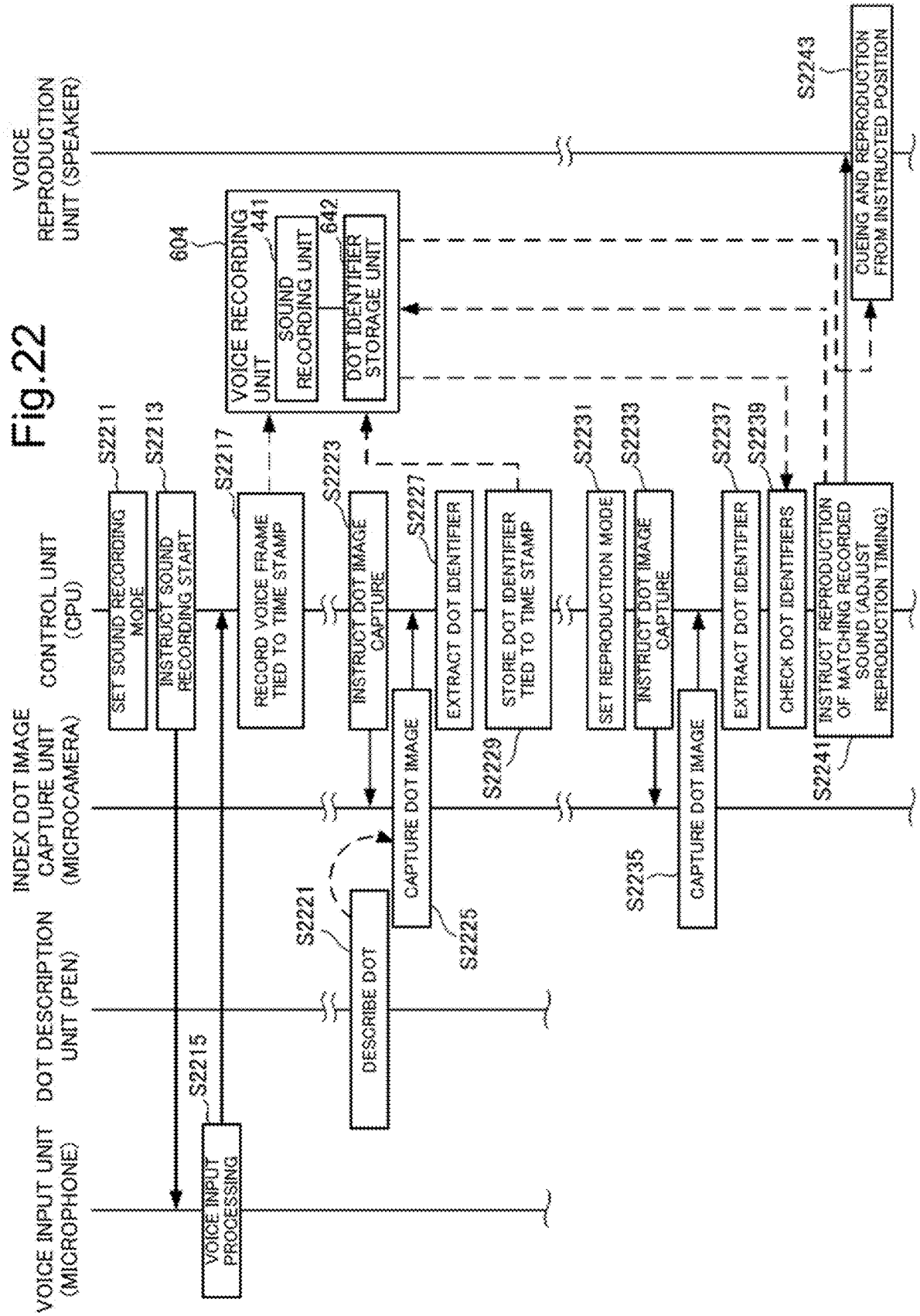
FIG. 22 is a sequence diagram illustrating an operation procedure of the recording-reproduction system with the sound recording device according to the fifth example embodiment.

FIG. 22 is a sequence diagram illustrating an operation procedure of the recording-reproduction system 2100 with the sound recording device 2110 according to the present example embodiment. While an example of index assignment with a sound recording time being associated with an image capture time is illustrated in FIG. 22, another indexing method may be used.

In Step S2211, a control unit in the sound recording device 2110 sets the device to a sound recording mode with a mode switch or the like. Then, in Step S2213, the control unit gives an instruction to start sound recording with a sound recording start switch or the like. In Step S2215, the voice input unit (microphone) starts voice input processing. The input voice is transmitted to the control unit in the sound recording device 2110, and the control unit records a voice frame tied to a time stamp into a sound recording unit 441 in a voice recording unit 604, in Step S2217.

When a user prefers index assignment by the sound recording device 2110, a dot is described at a target position on a printed matter or a prototype with the dot description unit (pen), in Step S2221. Then, in Step S2223, the control unit instructs the dot image capture unit to capture a dot image. In Step S2225, the dot image capture unit (microcamera) captures an image of the described dot. When the dot description unit and the dot image capture unit constitute an integrated stamp-type pen 281, the processing advances from Step S2221 to Step S2225, skipping Step S2223. In Step S2227, the control unit extracts a dot identifier from the dot image. In Step S2229, the control unit stores the dot identifier tied to a time stamp into a dot identifier storage unit 642 in the voice recording unit 604.

In Step S2231, the control unit in the sound recording device 2110 sets the device to a reproduction mode with a mode switch or the like. When a user prefers cueing in reproduction from the sound recording device 2110 with an assigned index, the control unit instructs the dot image capture unit to capture an image of a dot described at a desired position on the printed matter or the prototype, in Step S2233. In Step S2235, the dot image capture unit (microcamera) captures an image of the described dot. In Step S2237, the control unit extracts a dot identifier from the dot image. In Step S2239, the control unit reads a recorded dot identifier from the dot identifier storage unit 642 in the voice recording unit 604 and checks the dot identifier against the extracted dot identifier. Then, when the dot identifiers match, the control unit cues reproduction of a recorded sound with a matching dot identifier as an index, in Step S2241. Reproduction timing adjustment for adjusting the difference between an index assignment time (position) and a sound recording time (position) may be performed in Step S2241. The adjustment time may be fixed, or variable according to an actual difference.

In Step S2243, a voice reproduction unit (speaker) starts cueing and reproduction from the index time (position) in the sound recording unit 441.

While a dot identifier is recorded as an index in FIG. 22 in order to reduce a recording capacity, a dot image may be recorded and a dot identifier may be extracted at checking.

Functional Configuration of Sound Recording Device

Figure 23:
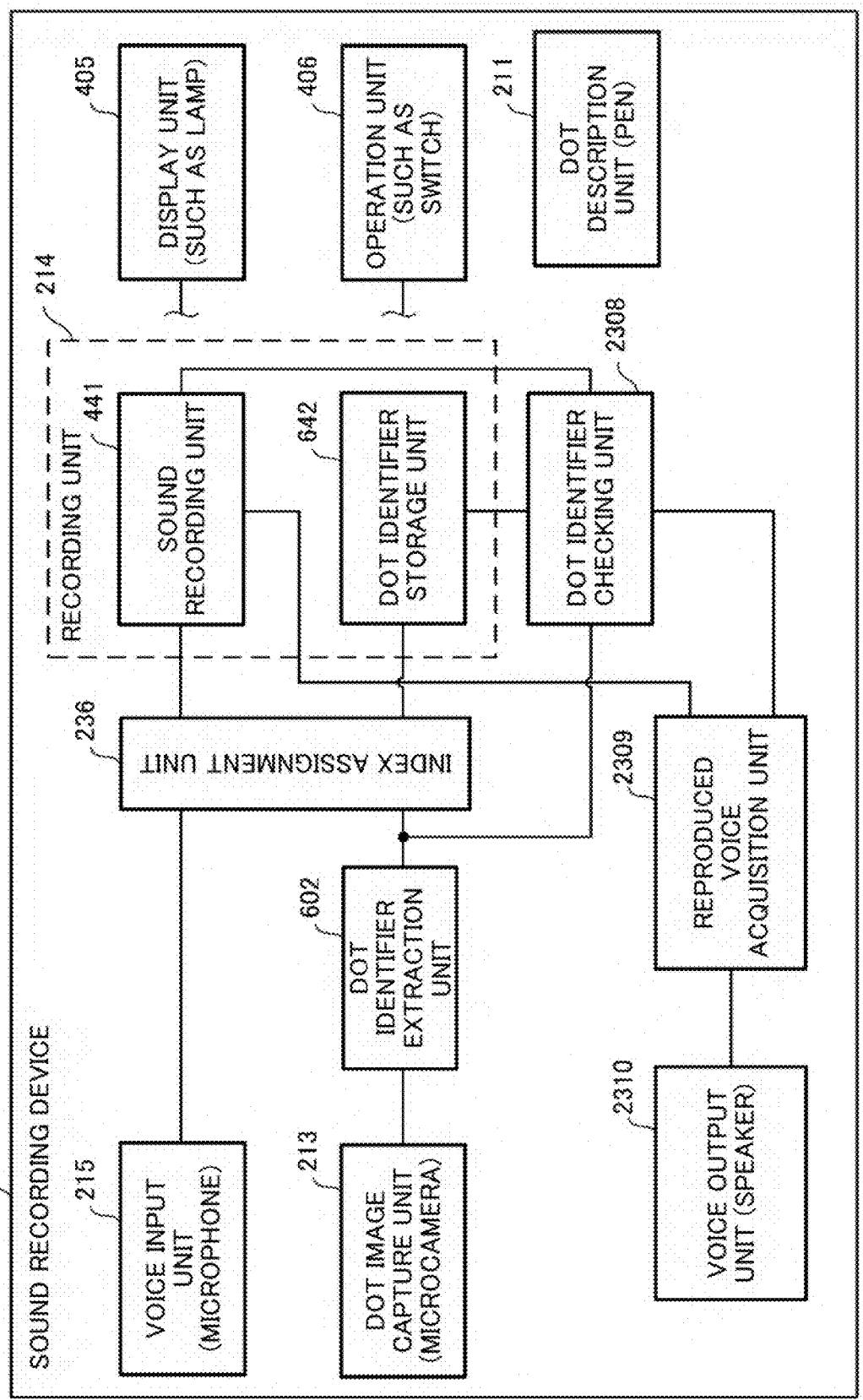
FIG. 23 is a block diagram illustrating a functional configuration of the sound recording device according to the fifth example embodiment.

FIG. 23 is a block diagram illustrating a functional configuration of the sound recording device 2110 according to the present example embodiment. In FIG. 23, a component similar to that in FIG. 2A, FIG. 4, or FIG. 6 is given the same reference numeral, and redundant description is omitted.

A dot identifier checking unit 2308 checks a dot identifier stored in the dot identifier storage unit 642 while in the sound recording mode against a dot identifier extracted from a dot image captured while in the reproduction mode. When the difference between the dot identifiers is equal to or less than a predetermined threshold value, the dot identifiers are determined to match. A reproduced voice acquisition unit 2309 acquires voice data from the sound recording unit 441 with the dot identifier determined to match as an index and transmits the voice data to a voice output unit (speaker) 2310. The voice output unit (speaker) 2310 performs cueing and output from a voice associated with a target position on a printed matter, a prototype, or the like on which a dot is described.

Hardware Configuration of Sound Recording Device

Figure 24:
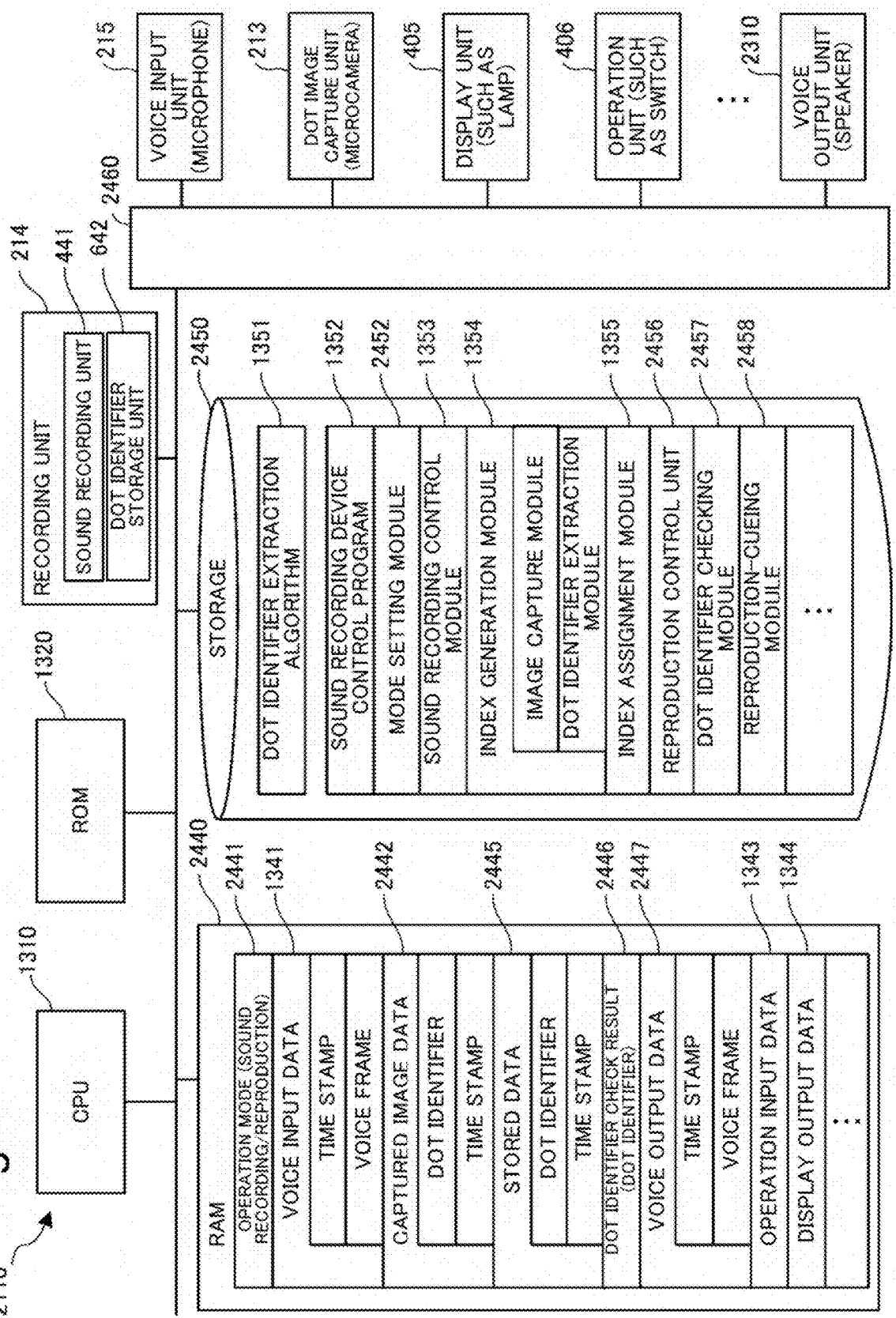
FIG. 24 is a block diagram illustrating a hardware configuration of the sound recording device according to the fifth example embodiment.

FIG. 24 is a block diagram illustrating a hardware configuration of the sound recording device 2110 according to the present example embodiment. In FIG. 24, a component similar to that in FIG. 13 is given the same reference numeral, and redundant description is omitted.

A RAM 2440 is a random access memory used by a CPU 1310 as a work area for temporary storage. A region for storing data required for providing the present example embodiment is secured in the RAM 2440. An operation mode 2441 is a flag indicating whether an operation mode of the sound recording device 2110 is the sound recording mode or the reproduction mode. Captured image data 2442 are data captured by the dot image capture unit (microcamera) 213 and include a dot identifier and a time stamp indicating an image capture time. Stored data 2445 are data stored as an index in the dot identifier storage unit 642 in a recording unit 214 and include a dot identifier and a time stamp indicating an image capture time. A dot identifier check result 2446 is a dot identifier when a check result indicates a match. Voice output data 2447 are data for outputting a voice from the voice output unit (speaker) 2310 and includes a time stamp and a voice frame.

A storage 2450 stores a database, various parameters, or the following data or programs required for providing the present example embodiment that are used by the CPU 1310. The storage 2450 stores the following programs. A mode setting module 2452 is a module setting an operation mode of the sound recording device 2110 to either the sound recording mode or the reproduction mode. A reproduction control module 2456 is a module for acquiring voice output data 2447 from the sound recording unit 441 in the recording unit 214 and outputting the voice output data as a voice from the voice output unit (speaker) 2310. A dot identifier checking module 2457 is a module checking, while in the reproduction mode, a dot identifier extracted from a captured dot image against a dot identifier stored in the dot identifier storage unit 642 as an index. A reproduction-cueing module 2458 is a module for, when the dot identifier checking module 2457 determines a match between dot identifiers, reading recorded sound data associated with the dot identifier as an index from the sound recording unit 441 and outputting the sound data from the voice output unit (speaker) 2310.

An input-output interface 2460 serves as an interface for controlling data input and output from and to an input-output device. The input-output interface 2460 according to the present example embodiment is connected to the voice output unit (speaker) 2310.

A program and data related to a general-purpose function and other executable functions of the sound recording device 2110 are not illustrated in the RAM 2440 and the storage 2450 in FIG. 24.

Processing Procedure of Sound Recording Device

Figure 25A:
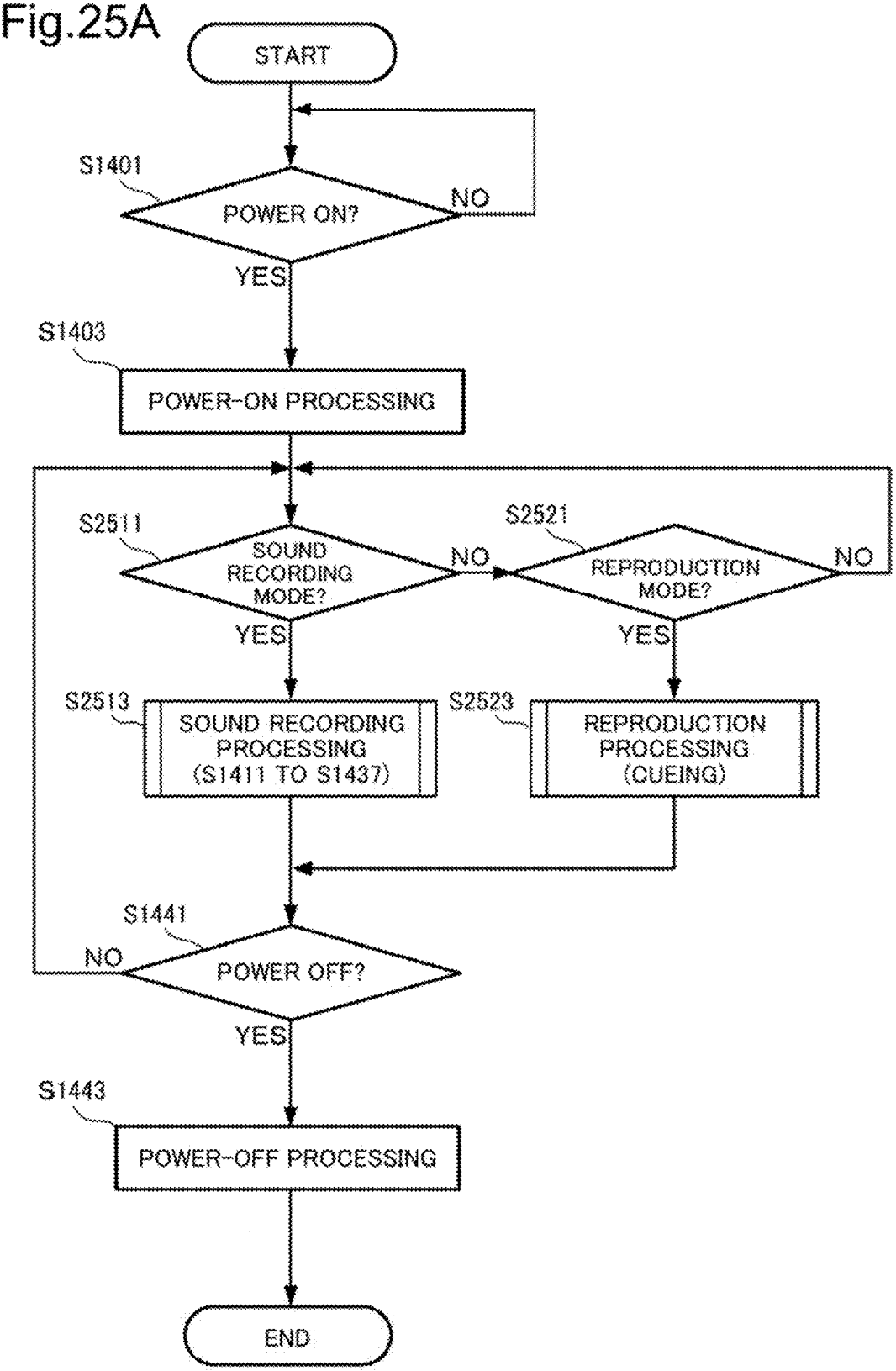
FIG. 25A is a flowchart illustrating a processing procedure of the sound recording device according to the fifth example embodiment.

FIG. 25A is a flowchart illustrating a processing procedure of the sound recording device 2110 according to the present example embodiment. The flowchart is executed by the CPU 1310 in FIG. 24 by use of the RAM 2440 and provides the function configuration units in FIG. 23. In FIG. 25A, a step similar to that in FIG. 14 is given the same step numeral, and redundant description is omitted.

In Step S2511, the sound recording device 2110 determines whether the device operates in the sound recording mode. When the device is determined to operate in the sound recording mode, the sound recording device 2110 executes sound recording processing allowing index assignment with a dot image or a dot identifier, in Step S2513. The sound recording processing in Step S2513 is similar to that in Steps S1411 to S1437 in FIG. 14, and therefore redundant description is omitted.

When the device is determined not to operate in the sound recording mode, the sound recording device 2110 determines whether the device operates in the reproduction mode, in Step S2521. When the device is determined to operate in the reproduction mode, the sound recording device 2110 executes reproduction processing including cueing and reproduction using index assignment with a dot image or a dot identifier, in Step S2523.

Reproduction Processing

Figure 25B:
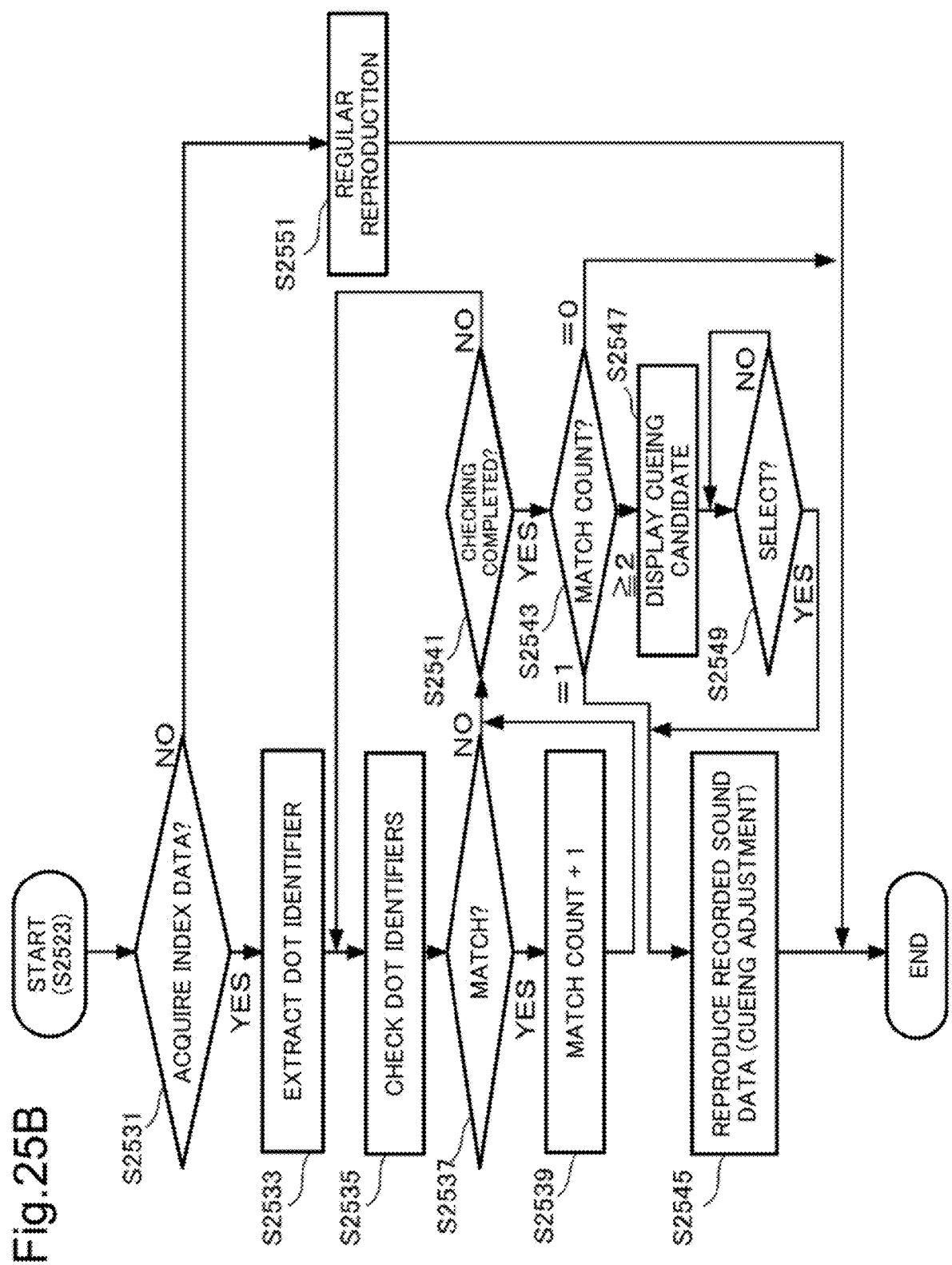
FIG. 25B is a flowchart illustrating a procedure of reproduction processing according to the fifth example embodiment.

FIG. 25B is a flowchart illustrating a procedure of the reproduction processing (S2523) according to the present example embodiment.

In Step S2531, the sound recording device 2110 determines whether index data acquired by capturing a dot image is to be acquired. When index data are not to be acquired, the sound recording device 2110 performs regular reproduction processing without cueing, in Step S2551.

When index data are to be acquired, the sound recording device 2110 extracts a dot identifier from the captured dot image, in Step S2533. In Step S2535, the sound recording device 2110 checks the dot identifier extracted from the dot image against a dot identifier recorded at recording as an index. In Step S2537, the sound recording device 2110 determines whether the dot identifiers match. As for determination of a match between dot identifiers, the dot identifiers are determined to match when the difference between the dot identifiers are equal to or less than a predetermined threshold value. When the dot identifiers match, the sound recording device 2110 increment a match count by one in Step S2539. The initial match count is "0." After the match count is incremented by one or when the dot identifiers do not match, the sound recording device 2110 determines whether checking against every dot identifier associated with the recorded sound data is completed, in Step S2541. When checking against every dot identifier is not completed, the sound recording device 2110 repeats checking against the remaining dot identifiers from Step S2535 until checking against every dot identifier is completed.

When checking against every dot identifier is completed, the sound recording device 2110 branches into three, based on the match count in Step S2543. When the match count is "1," the sound recording device 2110 adjusts a cueing timing as needed and starts reproduction of recorded sound data, in Step S2545. When the match count is "2 or more," the sound recording device 2110 displays a plurality of cueing candidates on a display screen in Step S2547. Then, in Step S2549, the sound recording device 2110 awaits a cueing selection instruction by a user, and when the instruction is given, the sound recording device 2110 starts reproduction of recorded sound data, in Step S2545. The device may be configured to sequentially skip cueing candidates with a skip switch when a plurality of cueing candidates cannot be displayed. When the match count is "0," reproduction of recorded sound data is not performed (or an error notification may be made).

In a case of a dot identifier as an index appearing once during recording, that is, a case of image capture of the same dot being limited to once, upon determination of a match in Step S2537, the cueing and reproduction in Step S2545 may be immediately performed.

In addition to the effects of the aforementioned example embodiments, sound recording, and cueing and reproduction can be independently achieved with a portable sound recording device, according to the present example embodiment. For example, reproduction from a memory card is not limited to reproduction of sound data recorded by the sound recording device itself, and cueing and reproduction of sound data recorded by another sound recording device can be performed by inserting the memory card.

Sixth Example Embodiment

Next, a sound recording device according to a sixth example embodiment will be described. Compared with the aforementioned fifth example embodiment, the sound recording device according to the present example embodiment differs in leaving reproduction to an advanced terminal or a computer. The remaining configuration and operation are similar to those of the fifth example embodiment, and therefore the same configurations and the same operations are given the same reference signs, respectively, and detailed description thereof is omitted.

Outline of Recording-Reproduction System

FIG. 26 is a diagram illustrating an outline of a recording-reproduction system 2600 including a sound recording device 210 according to the present example embodiment. In the recording-reproduction system 2600, a pen-type sound recording device 210 performs only sound recording and a cueing instruction at reproduction, and load-intensive reproduction processing is executed by an information processing device as a server or a computer, or a mobile terminal such as a smartphone. In FIG. 26, a component similar to that in FIG. 2A is given the same reference numeral, and redundant description is omitted.

The recording-reproduction system 2600 includes the sound recording device 210 performing only sound recording and a cueing instruction at reproduction, an information processing device 2620, and a mobile terminal 2630. The information processing device 2620 acquires recorded sound data, and a dot image or a dot identifier as an index from the sound recording device 210 through a memory card or communication, and performs reproduction processing including cueing and reproduction by use of a dot image or a dot identifier from the sound recording device 210 at reproduction. The information processing device 2620 includes a voice recording unit 2621 including a recording unit and a dot identifier storage unit, a dot identifier checking unit 2622, and a voice reproduction unit 2623. The dot identifier checking unit 2622 checks a dot identifier stored in the dot identifier storage unit as an index against a dot identifier of a dot image acquired from the sound recording device 210 at reproduction. The voice reproduction unit 2623 cues and reproduces a voice indexed with a dot identifier from a voice output unit (speaker) 2624.

The mobile terminal 2630 includes a voice output unit (speaker) 2634 and outputs a cued and reproduced voice in accordance with a reproduction instruction from the information processing device 2620.

Operational Sequence

Figure 27A:
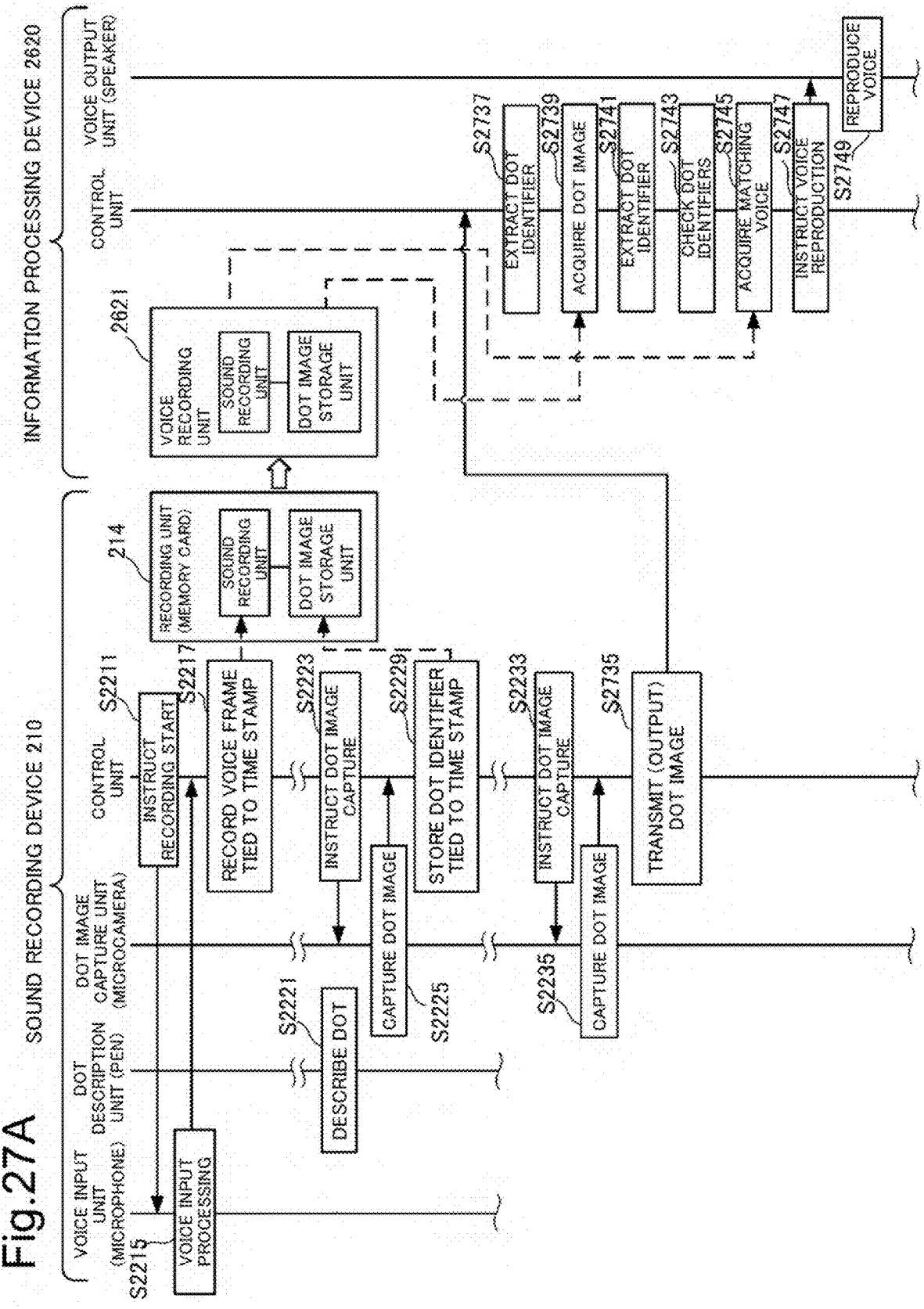
FIG. 27A is a sequence diagram illustrating an operation procedure of the recording-reproduction system including the sound recording device according to the sixth example embodiment.

FIG. 27A is a sequence diagram illustrating an operation procedure of the recording-reproduction system 2600 including the sound recording device 210 according to the present example embodiment. FIG. 27A is a sequence diagram in a case of the sound recording device 210 not having a dot identifier extraction function of extracting a dot identifier from a dot image. In FIG. 27A, a step similar to that in FIG. 22 is given the same step numeral, and redundant description is omitted.

A content of a voice recording unit (memory card) 214 in the sound recording device 210 is copied to the voice recording unit 2621 in the information processing device 2620. In this example, a dot image is stored in a dot image storage unit as an index.

In a reproduction mode, a control unit in the sound recording device 210 outputs (transmits) a captured dot image to a control unit in the information processing device 2620 in Step S2735.

In Step S2737, the control unit in the information processing device 2620 extracts a dot identifier from the captured dot image. In Step S2739, the control unit acquires a dot image from the dot image storage unit in the voice recording unit 2621. In Step S2741, the control unit extracts a dot identifier from the acquired dot image. In Step S2743, the control unit checks the dot identifier of the captured dot image against the dot identifier of the dot image acquired from the dot image storage unit. In Step S2745, the control unit in the information processing device 2620 acquires recorded sound data associated with the dot identifier a check result of which indicating a match, from a sound recording unit.

In Step S2747, the control unit instructs the voice output unit (speaker) to reproduce the recorded sound data acquired from the sound recording unit. In Step S2747, the voice output unit (speaker) starts cueing and reproduction of the recorded sound with the dot image as an index.

Figure 27B:
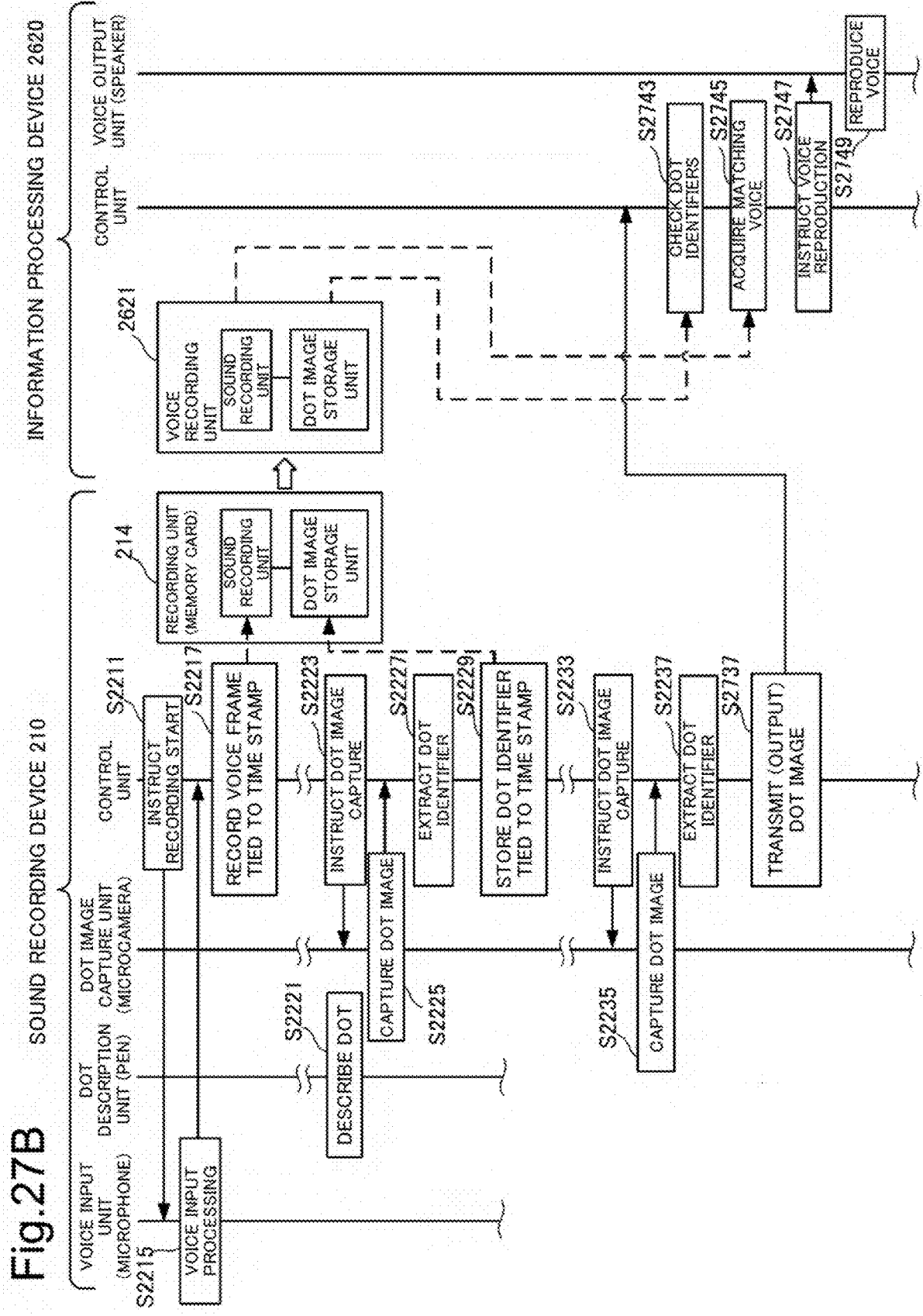
FIG. 27B is a sequence diagram illustrating another operation procedure of the recording-reproduction system including the sound recording device according to the sixth example embodiment.

FIG. 27B is a sequence diagram illustrating another operation procedure of the recording-reproduction system 2600 including the sound recording device 210 according to the present example embodiment. In FIG. 27B, a step similar to that in FIG. 22 or FIG. 27A is given the same step numeral, and redundant description is omitted.

In FIG. 27B, dot identifier extraction processing (S2227 and S2237) is added to FIG. 27A, and the dot identifier extraction processing (S2737 and S2741) in the control unit in the information processing device 2620 is deleted from FIG. 27A. The remaining steps are similar, and therefore redundant description is omitted.

Functional Configuration of Information Processing Device

Figure 28:
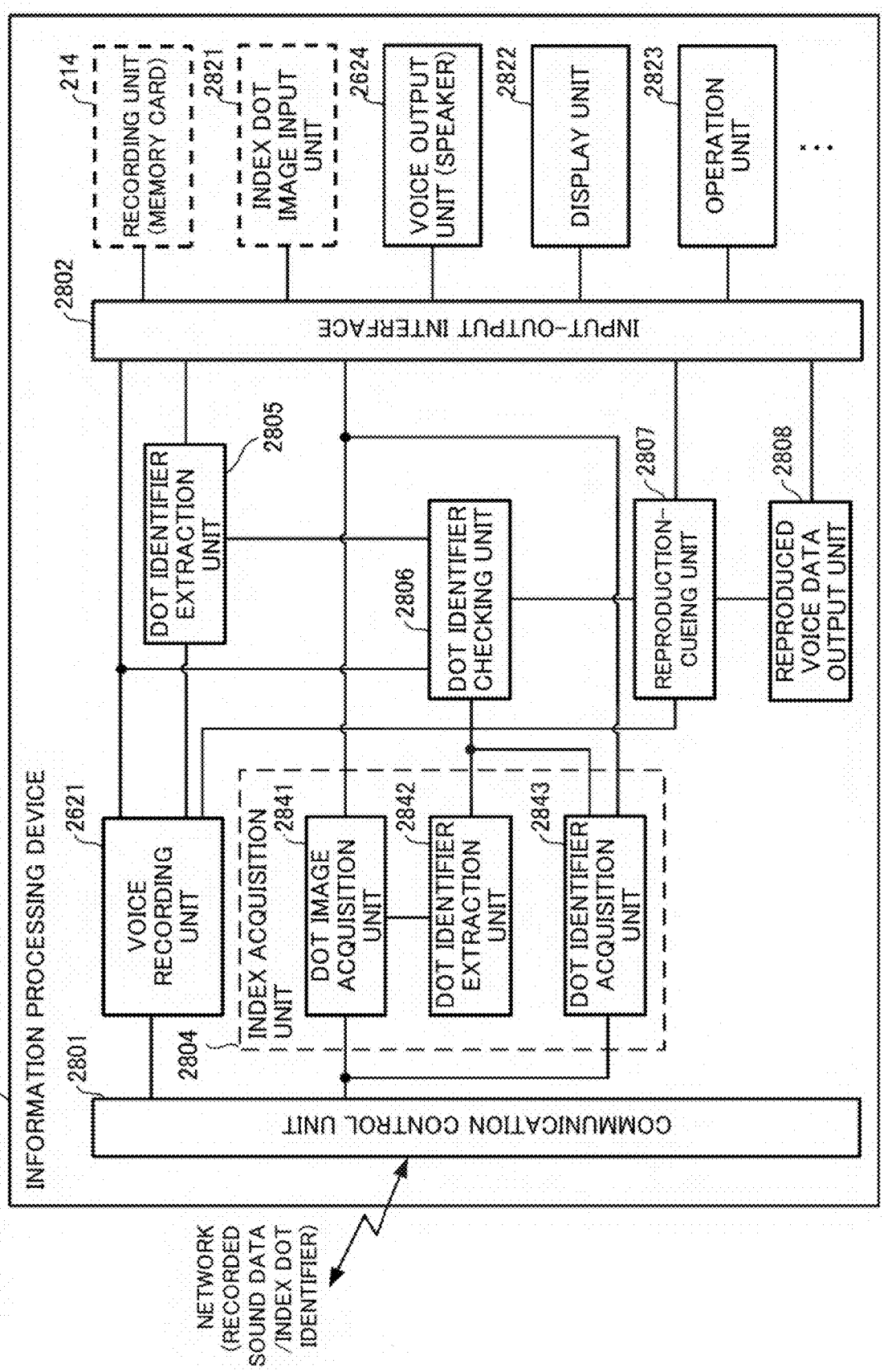
FIG. 28 is a block diagram illustrating a functional configuration of an information processing device as a terminal or a computer according to the sixth example embodiment.

FIG. 28 is a block diagram illustrating a functional configuration of the information processing device 2620 as a terminal or a computer according to the present example embodiment. In FIG. 28, a component similar to that in FIG. 26 is given the same reference numeral, and redundant description is omitted.

The information processing device 2620 includes a communication control unit 2801, an input-output interface 2802, the voice recording unit 2621, an index acquisition unit 2804, a dot identifier extraction unit 2805, a dot identifier checking unit 2806, a reproduction-cueing unit 2807, and a reproduced voice data output unit 2808. Further, the information processing device 2620 includes the voice storage unit (memory card) 214, an index dot image input unit 2821, the voice output unit (speaker) 2624, a display unit 2822, and an operation unit 2823 that are connected to the input-output interface 2802. The voice storage unit (memory card) 214 and the index dot image input unit 2821 are not required when recorded sound data and an index dot identifier are received from the sound recording device 210 through communication.

The communication control unit 2801 controls communication when recorded sound data and an index dot identifier are received from the sound recording device 210 through communication. The index acquisition unit 2804 includes a dot image acquisition unit 2841, a dot identifier extraction unit 2842, and a dot identifier acquisition unit 2843. Specifically, depending on the configuration of the index acquisition unit 2804, when an index is recorded as a dot image, a dot image is acquired, a dot identifier is extracted by the dot identifier extraction unit, and the dot identifier is checked by the dot identifier checking unit 2806. On the other hand, when an index is recorded as a dot identifier, a dot identifier is acquired and is checked on an as-is basis by the dot identifier checking unit 2806.

The dot identifier checking unit 2806 checks an index of a dot image recorded in the recording unit at recording against an index of a dot image captured at reproduction, by use of dot identifiers. When dot identifiers match in a check by the dot identifier checking unit 2806, the reproduction-cueing unit 2807 acquires recorded sound data associated with the dot identifier from the sound recording unit. The reproduced voice data output unit 2808 outputs a voice from the voice output unit (speaker) 2624, based on recorded sound data retrieved by the reproduction-cueing unit 2807.

Hardware Configuration of Information Processing Device

Figure 29:
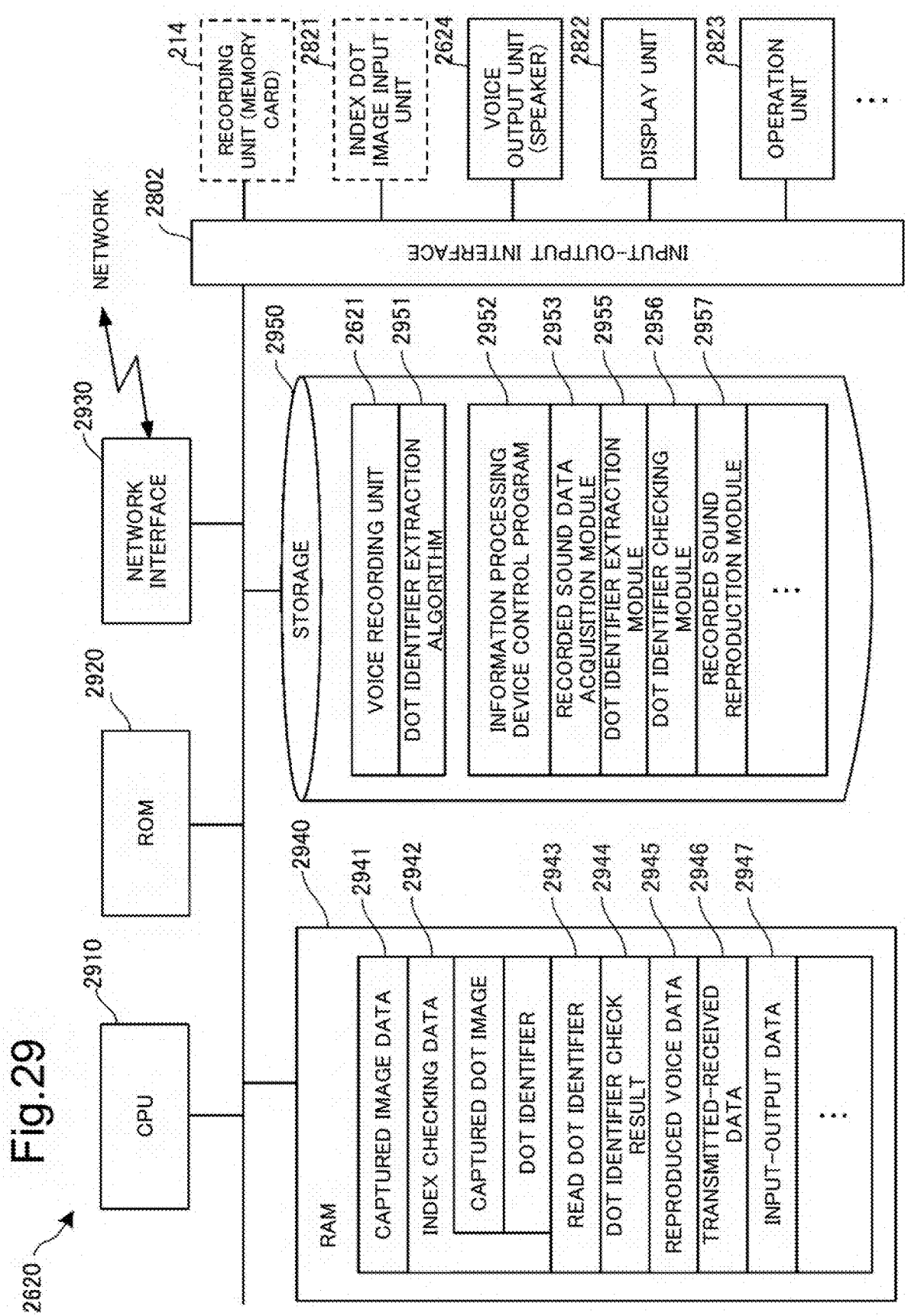
FIG. 29 is a block diagram illustrating a hardware configuration of the information processing device as the terminal or the computer according to the sixth example embodiment.

FIG. 29 is a block diagram illustrating a hardware configuration of the information processing device 2620 as the terminal or the computer according to the present example embodiment. In FIG. 29, a component similar to that in FIG. 26 or FIG. 28 is given the same reference numeral, and redundant description is omitted.

In FIG. 29, a CPU 2910 is a processor for arithmetic control and provides the function configuration units in FIG. 28 by executing a program. There may be one or a plurality of CPUs 2910. A ROM 2920 stores initial data, fixed data for a program and the like, and a program. A network interface 2930 communicates with an external device through a network.

A RAM 2940 is a random access memory used by the CPU 2910 as a work area for temporary storage. A region for storing data required for providing the present example embodiment is secured in the RAM 2940. Captured image data 2941 are captured image data of a dot acquired from the sound recording device 210. Index checking data 2942 are data for index checking for cueing and include a captured dot image and a dot identifier extracted from a dot image. A read dot identifier 2943 is data of a dot identifier as an index read from the voice recording unit 2621. A dot identifier check result 2944 is data of a check result between a dot identifier extracted from a captured dot image and a dot identifier read from the voice recording unit 2621 and is a matching dot identifier. Reproduced voice data 2945 are voice data reproduced from the sound recording unit in the voice recording unit 2621 with a matching dot identifier as an index. Transmitted-received data 2946 are data transmitted and received through the network interface 2930. Input-output data 2947 are data input and output from and to input-output equipment connected to the input-output interface 2802.

A storage 2950 stores a database, various parameters, or the following data or a program required for providing the present example embodiment that are used by the CPU 2910. The voice recording unit 2621 stores recorded sound data, and a dot image or a dot identifier as an index. A dot identifier extraction algorithm 2951 is an algorithm for extracting a dot identifier from a dot image. The storage 2950 stores the following programs. An information processing device control program 2952 is a program controlling the entire information processing device 2620. A recorded sound data acquisition module 2953 is a module acquiring recorded sound data from the sound recording device 210. A dot identifier extraction module 2955 is a module extracting a dot identifier from a dot image. A dot identifier checking module 2956 is a module checking a dot identifier extracted from a captured dot image against a dot identifier read from the voice recording unit 2621. A recorded sound reproduction module 2957 is a module cueing and reproducing recorded sound data with a matching dot identifier as an index. An input-output interface 2802 serves as an interface for controlling data input and output from and to an input-output device. As illustrated in FIG. 28, the input-output interface 2802 according to the present example embodiment is connected to the voice storage unit (memory card) 214, the index dot image input unit 2821, the voice output unit (speaker) 2624, the display unit 2822, and the operation unit 2823.

A program and data related to a general-purpose function and other executable functions of the information processing device 2620 are not illustrated in the RAM 2940 and the storage 2950 in FIG. 29.

Processing Procedure of Information Processing Device

Figure 30:
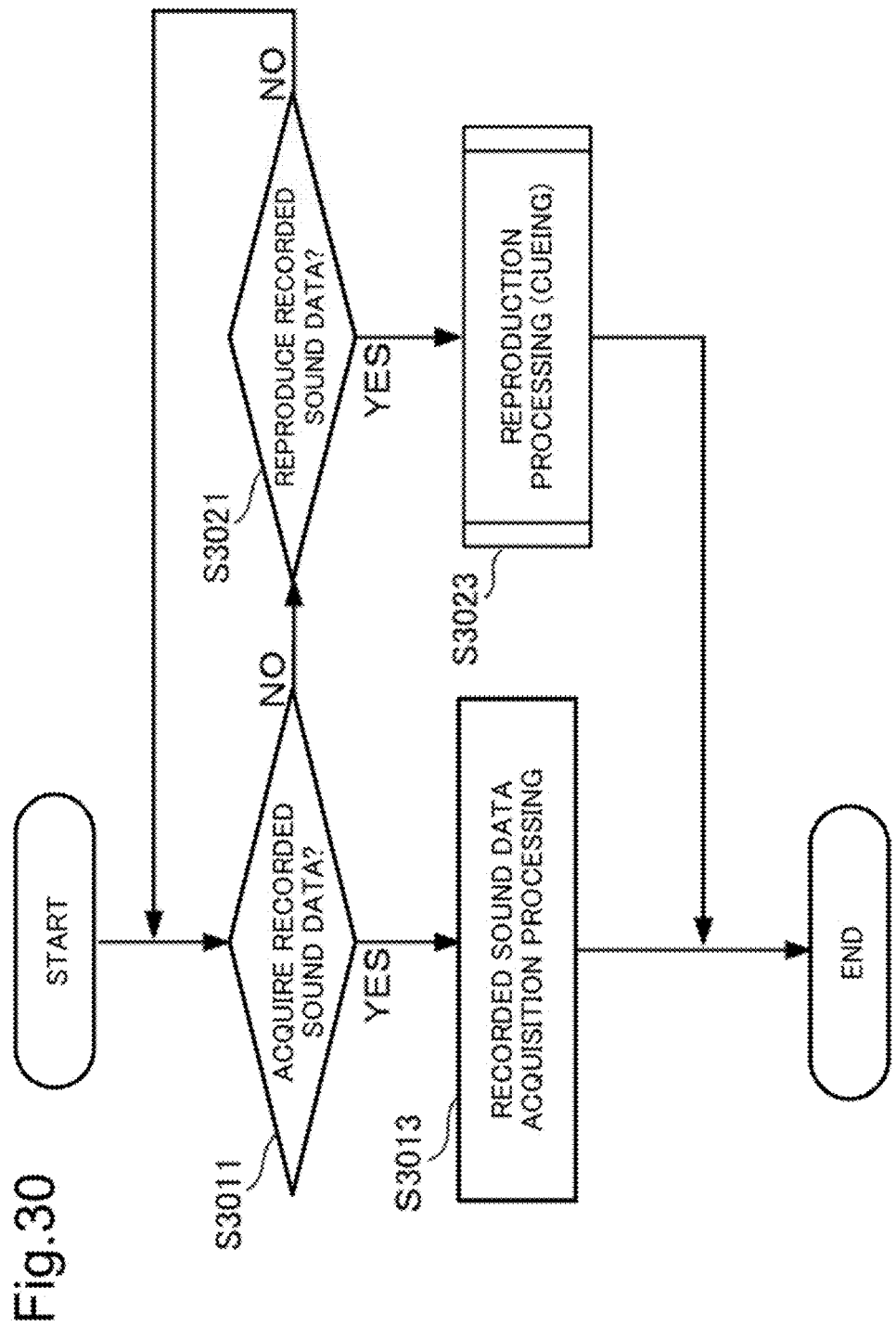
FIG. 30 is a flowchart illustrating a processing procedure of the information processing device as the terminal or the computer according to the sixth example embodiment.

FIG. 30 is a flowchart illustrating a processing procedure of the information processing device 2620 as the terminal or the computer according to the present example embodiment. The flowchart is executed by the CPU 2910 in FIG. 29 by use of the RAM 2940 and provides the function configuration units in FIG. 28.

In Step S3011, the information processing device 2620 determines whether recorded sound data are to be acquired. When determining that recorded sound data are to be acquired, the information processing device 2620 executes acquisition processing of recorded sound data in Step S3013. Acquisition of recorded sound data also includes acquisition of a dot image or a dot identifier as an index.

When determining that recorded sound data are not to be acquired, the information processing device 2620 determines whether reproduction of recorded sound data is to be performed, in Step S3021. When determining that reproduction of recorded sound data is to be performed, the information processing device 2620 executes reproduction processing of recorded sound data including cueing and reproduction indexed by a captured dot image or a dot identifier, in Step S3023.

Reproduction Processing

The reproduction processing in Step S3023 in FIG. 30 is similar to the reproduction processing (S2523) in FIG. 25B by the sound recording device 2110 except that the processing is instead performed by the information processing device 2620, and therefore illustration and description are omitted. When a dot identifier is acquired at acquisition of index data, Step S2533 is deleted.

In addition to the effects of the aforementioned example embodiments, cueing processing of recorded sound data can be more rapidly performed by an easier operation, according to the present example embodiment.

Seventh Example Embodiment

Next, an image recording device according to a seventh example embodiment will be described. Compared with the aforementioned second example embodiment to sixth example embodiment, the image recording device according to the present example embodiment differs in assigning a cueing index in image recording. The remaining configuration and operation are similar to those of the second example embodiment to the sixth example embodiment, and therefore the same configurations and the same operations are given the same reference signs, respectively, and detailed description thereof is omitted.

Outline of Recording-Reproduction System

Figure 31:
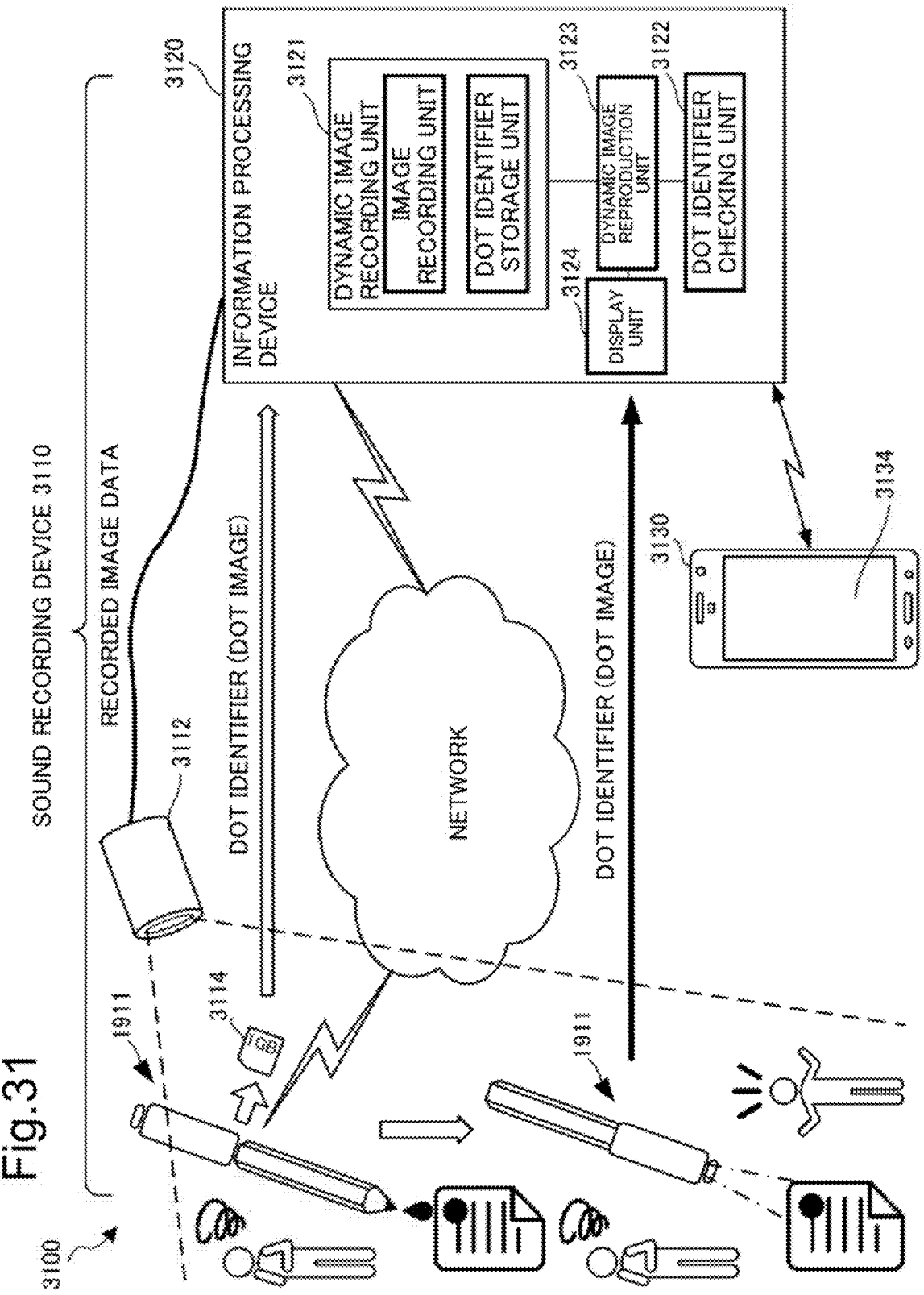
FIG. 31 is a diagram illustrating an outline of a recording-reproduction system including an image recording device according to a seventh example embodiment.

FIG. 31 is a diagram illustrating an outline of a recording-reproduction system 3100 including an image recording device 3110 according to the present example embodiment. In FIG. 31, a component similar to that in FIG. 19 is given the same reference numeral, and redundant description is omitted.

The recording-reproduction system 3100 includes a pen-type index acquisition unit 1911, a recording unit (memory card) 3114 recording only a dot image or a dot identifier, a video camera 3112 for image recording, an information processing device 3120, and a mobile terminal 3130.

The video camera 3112 acquires a dynamic image and a voice. The information processing device 3120 records a dynamic image and a voice received from the video camera 3112, and a dot image or a dot identifier acquired as an index from the index acquisition unit 1911 through a memory card or communication, and performs image recording-reproduction processing including cueing and reproduction, by use of a dot image or a dot identifier from the index acquisition unit 1911 at reproduction. The information processing device 3120 includes a dynamic image recording unit 3121 including an image recording unit and a dot identifier storage unit, a dot identifier checking unit 3122, a dynamic image reproduction unit 3123, and a display unit 3124. The dot identifier checking unit 3122 checks a dot identifier stored in the dot identifier storage unit as an index against a dot identifier of a dot image acquired from the index acquisition unit 1911 at reproduction. The dynamic image reproduction unit 3123 cues and reproduces a dynamic image indexed with a dot identifier, from the display unit 3124.

The mobile terminal 3130 includes a display screen 3134 and outputs a cued and reproduced dynamic image in accordance with a reproduction instruction from the information processing device 3120.

In FIG. 31, the index acquisition unit 1911, the video camera 3112, and the dynamic image recording unit 3121 may be considered as the image recording device 3110.

The pen-type index acquisition unit 1911 may be substituted by a sound recording device 210 or the like. Alternatively, the system may be configured to acquire only a dynamic image by the video camera 3112 and record a voice by the sound recording device 210 or the like.

Functional Configuration of Image Recording Device

Figure 32:
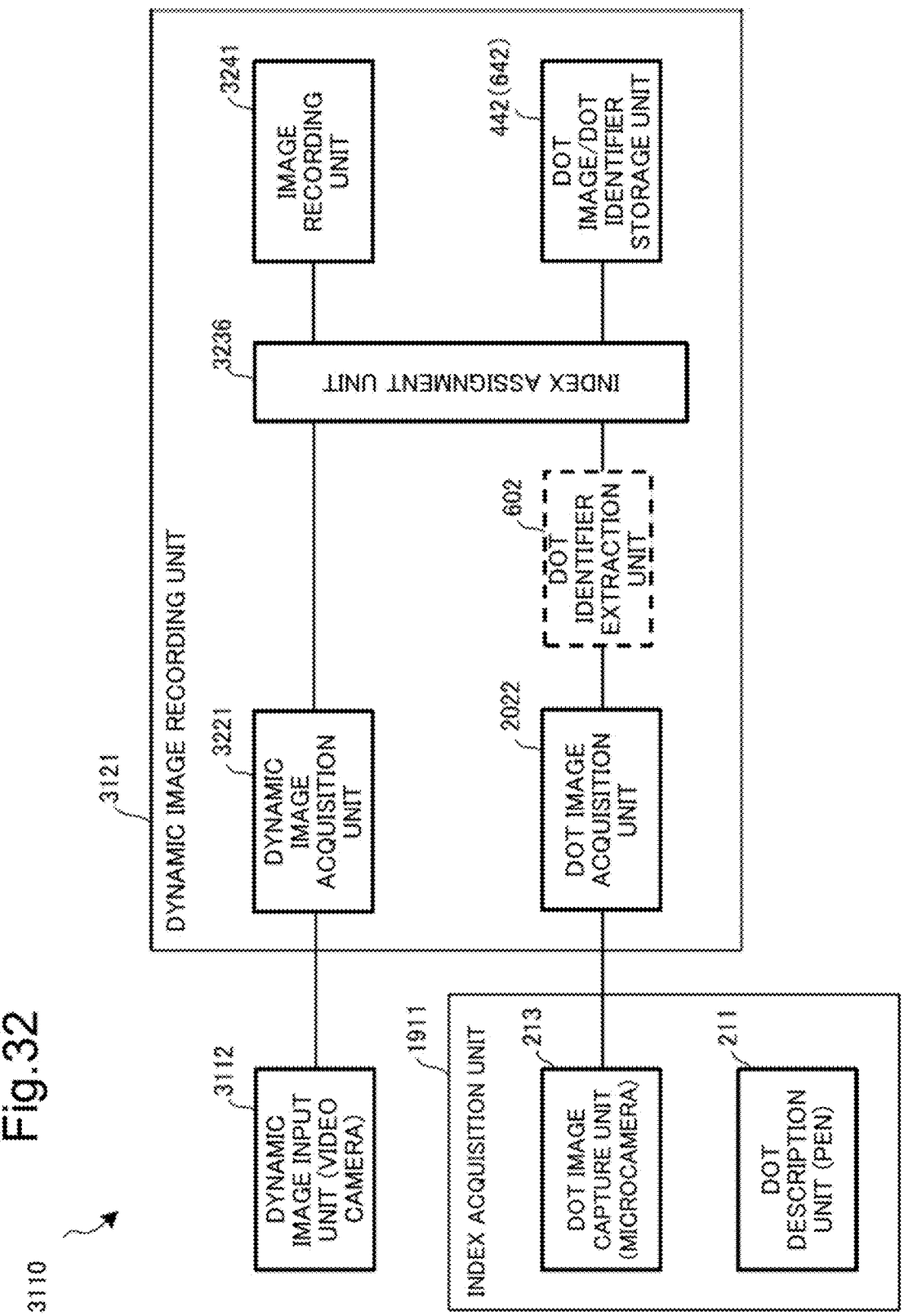
FIG. 32 is a block diagram illustrating a functional configuration of the image recording device according to the seventh example embodiment.

FIG. 32 is a block diagram illustrating a functional configuration of the image recording device 3110 according to the present example embodiment. In FIG. 32, a component similar to that in FIG. 2A, FIG. 19, or FIG. 31 is given the same reference numeral, and redundant description is omitted.

The image recording device 3110 includes the index acquisition unit 1911, a dynamic image input unit (video camera) 3112, and a dynamic image recording unit 3121. The dynamic image recording unit 3121 includes a dynamic image acquisition unit 3221 acquiring an input dynamic image from the dynamic image input unit (video camera) 3112 and a dot image acquisition unit 2022 acquiring a dot image from the index acquisition unit 1911. Furthermore, the dynamic image recording unit 3121 includes an index assignment unit 3236 associating a dynamic image with a dot image or a dot identifier, and an image recording unit 3241 recording dynamic image data.

Functional Configuration of Information Processing Device

Figure 33:
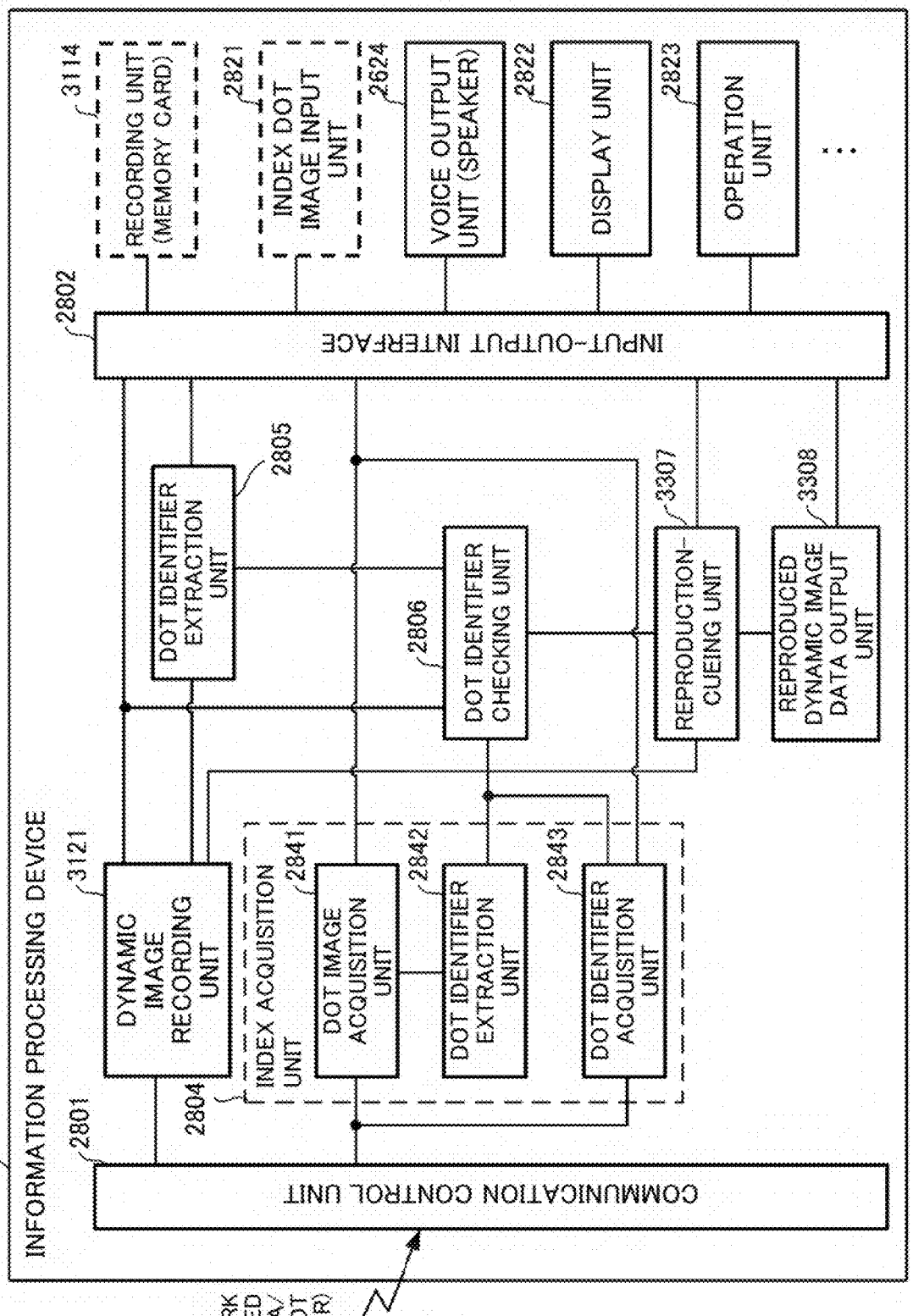
FIG. 33 is a block diagram illustrating a functional configuration of an information processing device as a server according to the seventh example embodiment.

FIG. 33 is a block diagram illustrating a functional configuration of the information processing device 3120 as a terminal or a computer according to the present example embodiment. In FIG. 33, a component similar to that in FIG. 26 or FIG. 28 is given the same reference numeral, and redundant description is omitted.

The information processing device 3120 includes the dynamic image recording unit 3121, a reproduction-cueing unit 3307 for a recorded image, and a reproduced dynamic image data output unit 3308. When dot identifiers match in a check by a dot identifier checking unit 2806, the reproduction-cueing unit 3307 acquires recorded image data associated with the dot identifier from the dynamic image recording unit. The reproduced dynamic image data output unit 3308 causes a display unit 2822 to output a dynamic image, based on recorded image data retrieved by the reproduction-cueing unit 3307, and causes a voice output unit (speaker) 2624 to output a voice.

According to the present example embodiment, a captured image is assigned as an index in association with a dynamic image being recorded, and therefore a cueing index used at reproduction can be assigned to recorded image data by a simple operation at any timing preferred by a user during image recording.

Other Example Embodiments

Recording of a sound, an image, and the like with a dot image or a dot identifier as an index, and cueing and reproduction of a recorded sound and a recorded image based on a dot image or a dot identifier has been described in the aforementioned example embodiments. On the other hand, statistical information processing based on on-site sound recording and image recording with a dot image or a dot identifier as an index is also easily achievable.

FIG. 34 is a diagram illustrating a structure of a recorded sound data analysis table 3400 for statistical processing based on a dot according to another example embodiment. The recorded sound data analysis table 3400 stores a dot identifier group 3401 in which dots determined to be the same (match) are included and a reference count 3402 of an assigned dot. Time stamps 3403 sorted in a chronological order, dot identifiers 3404, and voice frames 3405 at a plurality of dot references are stored in association with a dot identifier group 3401. Then, a target evaluation/analysis 3406 as a result of analysis of a reference count 3402 and a content of a voice frame 3405 is stored. In this case, it is more preferable that an end of a voice frame related to a dot image or a dot identifier can be set. Thus, recorded sound data assigned with indices by on-site dot description are classified by dot identifiers and are sorted in an order of time stamps. Consequently, a point receiving attention on site, a type of the attention, a relation between a raised issue and a proposed solution, and the like can be evaluated and analyzed.

Figure 35:
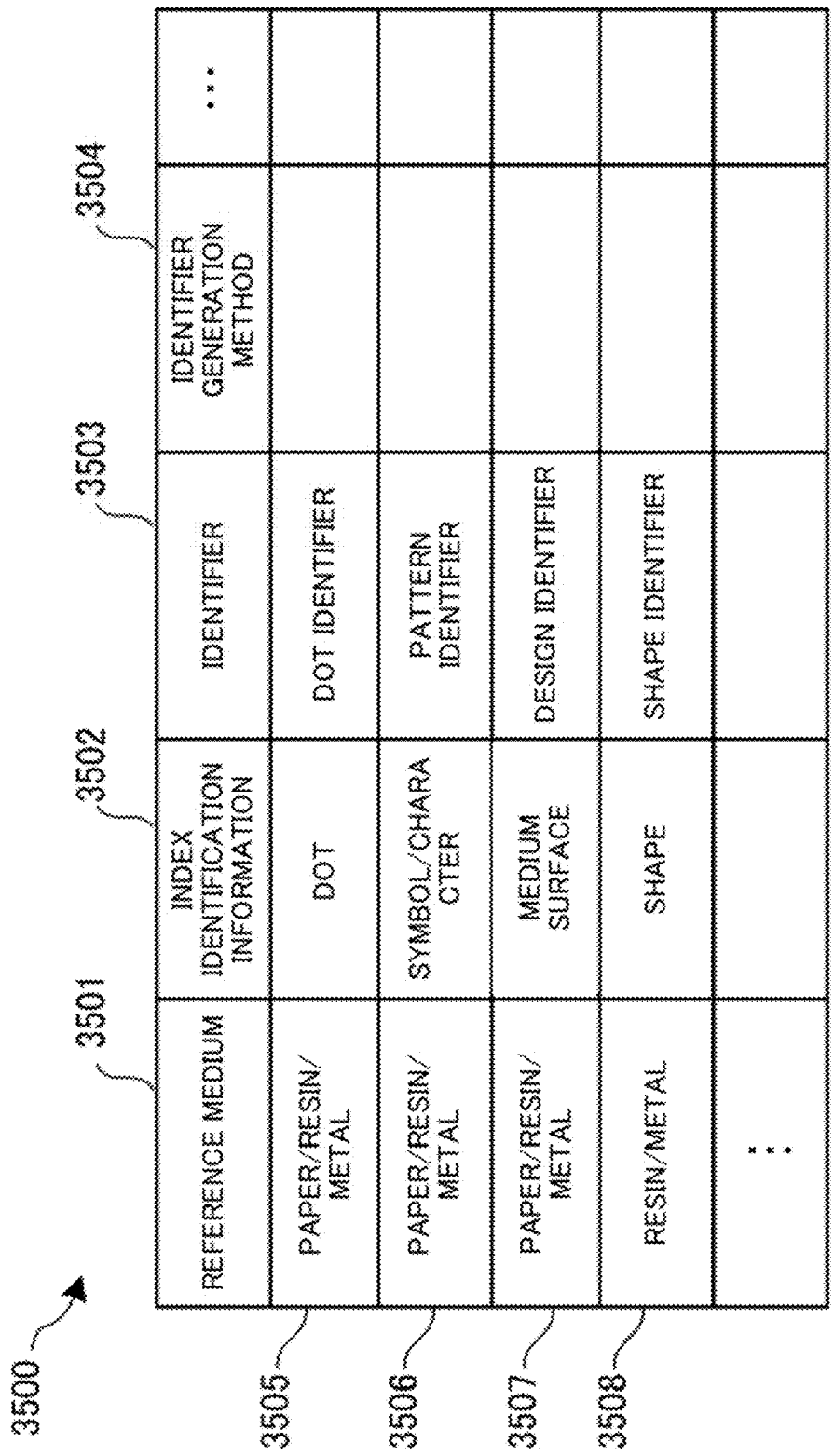
FIG. 35 is a diagram illustrating an example of index identification information according to another example embodiment.

While index assignment with a dot image or a dot identifier has been described in the aforementioned example embodiments, the index assignment is not limited to the above. For example, as illustrated in Table 3500 in FIG. 35, other index identification information can be used and provides similar effects.

In FIG. 35A, a reference medium 3501, index identification information 3502, an identifier 3503, and an identifier generation method 3504 are stored in association with one another. For example, a row 3505 indicates that a dot is used as an index for paper/resin/metal and a dot identifier is used as an identifier. A row 3506 indicates that a symbol or a character is used as an index for paper/resin/metal and a pattern identifier is used as an identifier. A row 3507 indicates that a medium surface is used as an index for paper/resin/metal and a design identifier is used as an identifier. A row 3508 indicates that a shape is used as an index for resin/metal and a shape identifier is used as an identifier. Index identification information usable in the present disclosure is not limited to the above. The information has only to be information by which a user can generate a highly identifiable cueing index by a simple on-site operation. Highly identifiable refers to a state in which the same identifier or a similar identifier is less likely to appear and a distance between identifiers is remote.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims. Further, a system or a device in which different features included in the respective example embodiments are appropriately combined is also included in the scope of the present disclosure.

The present example embodiment may be applied to a system configured with a plurality of pieces of equipment or may be applied to a single device. Furthermore, the present disclosure is also applicable when an information processing program or a sound recording control program achieving the functions of the example embodiments is directly or remotely supplied to a system or a device. Accordingly, a program installed on a computer for achieving the functions of the present disclosure with the computer, a medium storing the program, or a world wide web (WWW) server from which the program is downloaded are also included in the scope of the present disclosure. At least, a non-transitory computer-readable medium storing a program causing a computer to execute the processing steps included in the aforementioned example embodiments is particularly included in the scope of the present disclosure.

Other Expressions of Example Embodiments

The aforementioned example embodiments may also be described in part or in whole as the following Supplementary Notes but are not limited thereto.

Supplementary Note 1

A sound recording device including:
a sound recording means for recording a voice;
an image capture means for capturing an image being an index for indexing the recorded voice; and
an index assignment means for assigning the captured image to recorded voice data as an index during recording.

Supplementary Note 2

The sound recording device according to Supplementary Note 1, wherein
the image is a dot image described with a writing tool.

Supplementary Note 3

The sound recording device according to Supplementary Note 1 or 2, further including
a dot description means for describing a dot.

Supplementary Note 4

The sound recording device according to Supplementary Note 2 or 3, further including
a ganging means for ganging description processing of the dot by the dot description means and image capture of the dot by the index generation image capture means.

Supplementary Note 5

The sound recording device according to any one of Supplementary Notes 2 to 4, further including
a dot identifier extraction means for extracting a dot feature value from the dot image and setting the dot feature value as a dot identifier, wherein
the index assignment means assigns, as an index, a dot identifier of the captured dot image to the voice being recorded.

Supplementary Note 6

The sound recording device according to any one of Supplementary Notes 1 to 5, wherein
the index assignment means assigns the index to the voice being recorded, at a position related to a time when the image is captured.

Supplementary Note 7

The sound recording device according to any one of Supplementary Notes 1 to 5, wherein
the index assignment means assigns the index in such a way that a sound recording position of the voice being recorded is pointed from the image.

Supplementary Note 8

The sound recording device according to Supplementary Notes 1 to 7, further including:
an interface means connectable to a communication terminal; and
an output means for outputting a voice recorded in the sound recording means and an image assigned by the index assignment means to the communication terminal through the interface means.

Supplementary Note 9

The sound recording device according to Supplementary Notes 1 to 7, further including
a transmission means for transmitting a voice recorded in the sound recording means and an image assigned by the index assignment means in association with each other to an information processing device assigning an index to the voice with the image.

Supplementary Note 10

The sound recording device according to any one of Supplementary Notes 1 to 9, further including:
a reproduction means for reproducing a voice recorded in the sound recording means;
an acquisition means for acquiring, at reproduction, an image captured by the index generation image capture means as an index for a start of reproduction;
a checking means for checking an image acquired by the acquisition means against an image assigned by the index assignment means; and
a reproduction control means for, when a check result by the checking means indicates that an image acquired by the acquisition means matches an image assigned by the index assignment means, controlling the reproduction means in such a way as to perform reproduction, with an image assigned by the index assignment means as an index, from a voice recorded in the sound recording means.

Supplementary Note 11

The sound recording device according to Supplementary Note 10, wherein,
when a plurality of images matching an image acquired by the acquisition means and being assigned by the index assignment means exist, the reproduction control means controls the reproduction means in such a way as to select and reproduce a plurality of voices recorded in the sound recording means with a plurality of the images as indices.

Supplementary Note 12

The sound recording device according to any one of Supplementary Notes 1 to 11, wherein
the sound recording device has a pen-type stationery shape.

Supplementary Note 13

A sound recording control program causing a computer to execute:
recording a voice;
capturing a dot image for generating an index for indexing the recorded voice by an index generation image capture means, the dot image being described with a writing tool;
extracting a dot feature value from the dot image and setting the dot feature value as a dot identifier; and
assigning the dot identifier to the recorded voice as an index during recording.

Supplementary Note 14

An image recording device including:
an image recording means for recording a dynamic image;
an index generation image capture means for capturing an image being an index for indexing the recorded dynamic image; and an index assignment means for assigning the captured image to the recorded dynamic image as an index during recording.

Supplementary Note 15

A recording-reproduction system including:

a recording means for recording a recorded voice or a recorded dynamic image;

an index generation image capture means for capturing a first image being an index for indexing the recorded voice or the recorded dynamic image;

an index assignment means for assigning the captured first image to the recorded voice or the recorded dynamic image as an index during recording;

a reproduction means for reproducing a voice or a dynamic image recorded in the recording means;

an acquisition means for acquiring, at reproduction, a second image captured by the index generation image capture means as an index for a start of reproduction;

a checking means for checking the second image against the first image; and a reproduction control means for, when a check result by the checking means indicates that the second image matches the first image, controlling the reproduction means in such a way as to perform reproduction, with the first image as an index, from a voice or a dynamic image recorded in the recording means.

Supplementary Note 16

A recording-reproduction method including:

recording a recorded voice or a recorded dynamic image into a recording means;

capturing a first image being an index for indexing the recorded voice or the recorded dynamic image by an index generation image capture means;

assigning the captured first image to the recorded voice or a recorded dynamic image as an index during recording;

acquiring, at reproduction, a second image captured by the index generation image capture means as an index for a start of reproduction;

checking the second image against the first image; and, when a check result indicates that the second image matches the first image, performing reproduction, with the first image as an index, from a voice or a dynamic image recorded in the recording means.

Supplementary Note 17

An information processing device including:

a first reception means for receiving, at recording, a voice being recorded or a dynamic image being recorded, and a first image being an index for indexing the voice being recorded or the dynamic image being recorded;

a recording means for recording the received voice or dynamic image;

an index assignment means for assigning the received first image to the received voice or dynamic image as an index;

a reproduction means for reproducing a voice or a dynamic image recorded in the recording means;

a second reception means for receiving, at reproduction, a second image as an index for a start of reproduction;

a checking means for checking the second image against the first image; and a reproduction control means for, when a check result by the checking means indicates that the second image matches the first image, controlling the reproduction means in such a way as to perform reproduction, with the first image as an index, from a voice or a dynamic image recorded in the recording means.

Supplementary Note 18

An information processing method causing a computer to execute:

receiving, at recording, a voice being recorded or a dynamic image being recorded, and a first image being an index for indexing the voice being recorded or the dynamic image being recorded;

recording the received voice or dynamic image into a recording means;

assigning the received first image to the received voice or dynamic image as an index;

receiving, at reproduction, a second image as an index for a start of reproduction;

checking the second image against the first image; and, when a check result indicates that the second image matches the first image, performing reproduction, with the first image as an index, from a voice or a dynamic image recorded in the recording means.

This application is based upon and claims the benefit of priority from Japanese patent application No. 2017-187492, filed on Sep. 28, 2017, the disclosure of which is incorporated herein in its entirety by reference.

The invention claimed is:

1. A sound recording device comprising:
at least one memory configured to store instructions; and
at least one processor configured to execute the instructions to:
record a voice;
capture an image being an index for indexing the recorded voice, wherein the image is a dot image described with a writing tool;
extract a dot feature value from the dot image;
set the dot feature value as a dot identifier; and
assign the dot identifier to the recorded voice as an index during recording.

2. The sound recording device according to claim 1, further comprising
a writing tool to describe a dot.

3. The sound recording device according to claim 1, wherein
the at least one processor is further configured to execute the instructions to gang description processing of the dot and image capture of the dot.

4. The sound recording device according to claim 1, wherein
the at least one processor is further configured to execute the instructions to assign the index to the voice being recorded, at a position related to a time when the image is captured.

5. The sound recording device according to claim 1, wherein
the at least one processor is further configured to execute the instructions to:
reproduce a voice recorded;
acquire, at reproduction, a dot identifier extracted from an image captured as an index for a start of reproduction;
check a dot identifier acquired against a dot identifier assigned; and
when a check result indicates that a dot identifier acquired matches a dot identifier assigned, control in such a way as to perform reproduction, with a dot identifier assigned as an index, from a voice recorded.

6. The sound recording device according to claim 1, wherein
the sound recording device has a pen-type stationery shape.

7. A non-transitory computer readable recording medium having a sound recording control program stored thereon, the sound recording control program causing a computer to execute:
- recording a voice;
- capturing a dot image being an index for indexing the recorded voice and being described with a writing tool;
- extracting a dot feature value from the dot image;
- setting the dot feature value as a dot identifier; and
- assigning the dot identifier to the recorded voice as an index during recording.

8. An image recording device comprising:
- at least one memory configured to store instructions; and
- at least one processor configured to execute the instructions to:
- record a dynamic image;
- capture an image being an index for indexing the recorded dynamic image, wherein the image is a dot image described with a writing tool;
- extract a dot feature value from the dot image;
- set the dot feature value as a dot identifier; and
- assign the dot identifier to the recorded dynamic image as an index during recording.

9. The sound recording device according to claim 1, wherein
- the at least one processor configured to execute the instructions to
- assign the index in such a way that a sound recording position of the voice being recorded is pointed from the image.

10. The sound recording device according to claim 1, further comprising interface connectable to a communication terminal, wherein
- the at least one processor configured to execute the instructions to output a voice recorded and an image assigned to the communication terminal.

11. The sound recording device according to claim 1, wherein
- the at least one processor further configured to execute the instructions to:
- and an image assigned in association with each other to an information processing device assigning an index to the voice with the image.

12. The sound recording device according to claim 5, wherein,
- the at least one processor configured to execute the instructions to
- when a plurality of dot identifiers matching a dot identifier acquired and being assigned exist, control in such a way as to select and reproduce a plurality of voices recorded with the plurality of dot identifiers as indices.

* * * * *